(12) United States Patent
Cohen et al.

(10) Patent No.: US 8,819,170 B2
(45) Date of Patent: Aug. 26, 2014

(54) COMMUNICATION PROTOCOLS

(75) Inventors: Daniel C. Cohen, Newtonville, MA (US); James S. Spitaels, Shrewsbury, MA (US); Mark R. Melanson, Chelmsford, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 171 days.

(21) Appl. No.: 13/182,723

(22) Filed: Jul. 14, 2011

(65) Prior Publication Data

US 2013/0018979 A1    Jan. 17, 2013

(51) Int. Cl.
G06F 15/16    (2006.01)

(52) U.S. Cl.
USPC ........................................ 709/217

(58) Field of Classification Search
None
See application file for complete search history.

(56) References Cited

U.S. PATENT DOCUMENTS

| | | | |
|---|---|---|---|
| 4,506,324 A | 3/1985 | Healy | |
| 5,142,528 A | 8/1992 | Kobayashi et al. | |
| 5,323,149 A | 6/1994 | Hoult et al. | |
| 5,361,260 A | 11/1994 | Mito | |
| 5,968,136 A | 10/1999 | Saulpaugh et al. | |
| 7,003,676 B1 | 2/2006 | Weber et al. | |
| 7,054,332 B2 | 5/2006 | Favichia et al. | |
| 7,111,050 B2 | 9/2006 | McAdams | |
| 7,418,477 B2 * | 8/2008 | McCarthy | 709/206 |
| 7,418,520 B2 * | 8/2008 | Cooper | 709/246 |
| 7,526,534 B2 * | 4/2009 | Henseler | 709/220 |
| 7,536,450 B2 * | 5/2009 | Motoyama et al. | 709/223 |
| 7,551,631 B1 * | 6/2009 | Shapiro | 370/401 |
| 7,644,185 B2 * | 1/2010 | Cooper | 709/246 |
| 7,796,589 B2 | 9/2010 | Cohen et al. | |
| 8,352,548 B2 * | 1/2013 | McCarthy | 709/203 |
| 2003/0126442 A1 | 7/2003 | Glew et al. | |
| 2003/0133574 A1 | 7/2003 | Caronni et al. | |
| 2004/0059815 A1 | 3/2004 | Buckingham et al. | |
| 2004/0088541 A1 | 5/2004 | Messerges et al. | |
| 2005/0071444 A1 | 3/2005 | Motoyama | |
| 2005/0071568 A1 | 3/2005 | Yamamoto et al. | |
| 2006/0036748 A1 * | 2/2006 | Nusbaum et al. | 709/228 |
| 2006/0288121 A1 * | 12/2006 | McCarthy | 709/238 |
| 2006/0294202 A1 * | 12/2006 | Cooper | 709/217 |

(Continued)

FOREIGN PATENT DOCUMENTS

EP    1124351 A2    8/2001

OTHER PUBLICATIONS

Dierks et al. "The TLS Protocol", RFC 2246, Jan. 1999.

(Continued)

*Primary Examiner* — Brian P Whipple
(74) *Attorney, Agent, or Firm* — Lando & Anastasi, LLP

(57) ABSTRACT

A system for exchanging information is provided. The system includes a memory, a first communication link, and at least one processor implementing a first protocol. The at least one processor is coupled to the memory and the first communication link. The at least one processor is configured to receive, via the first communication link, a first request message including a first globally unique identifier (GUID); start, responsive to receipt of the first request message, a communication session over the first communication link; provide a first response message including the first GUID; receive, via the first communication link, a second request message including data and a second GUID; write the data to a location indicated by the second GUID; read information stored at the indicated location; and provide a second response message including the second GUID and the information.

17 Claims, 37 Drawing Sheets

(56) References Cited

U.S. PATENT DOCUMENTS

| | | | |
|---|---|---|---|
| 2007/0025347 A1 | 2/2007 | Cohen et al. | |
| 2007/0028104 A1 | 2/2007 | Cohen et al. | |
| 2007/0064718 A1 | 3/2007 | Ekl et al. | |
| 2007/0189207 A1 | 8/2007 | Sammour et al. | |
| 2008/0031177 A1 | 2/2008 | Lee et al. | |
| 2008/0313354 A1* | 12/2008 | Cooper | 709/246 |
| 2009/0144471 A1 | 6/2009 | Lin | |
| 2009/0313349 A1* | 12/2009 | Jeong et al. | 709/217 |
| 2010/0124189 A1 | 5/2010 | Guguen et al. | |
| 2011/0054644 A1 | 3/2011 | Baek et al. | |
| 2012/0179747 A1* | 7/2012 | McCarthy | 709/203 |

OTHER PUBLICATIONS

Intel Corporation, Preboot Execution Environment (PXE) Specification, Version 2.1, Sep. 1999.

International Search Report and Written Opinion for PCT/US2012/042216 dated Oct. 18, 2012.

Moyer et al. "A Protocol for Wide-Area Secure Networked Applicance Communication". IEEE Communications Magazine. Oct. 2001.

Postel et al. "Transmission Control Protocol", RFC 793, Sep. 1981.

* cited by examiner

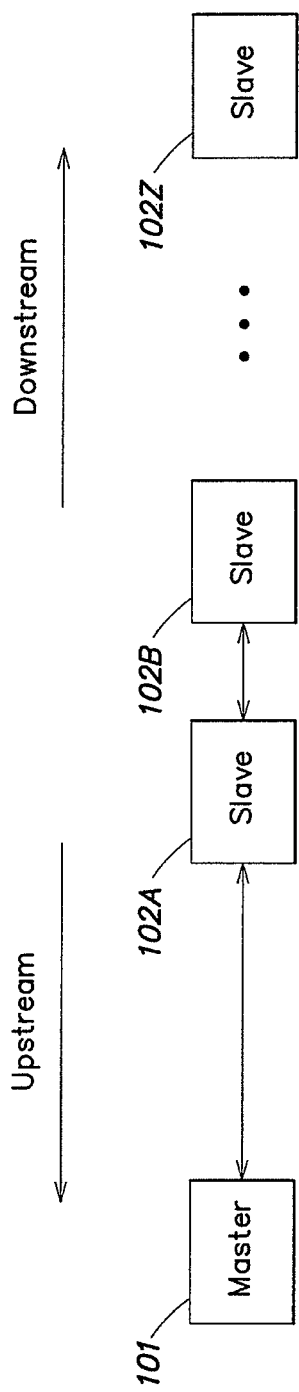

| FIG. 10A |
| FIG. 10B |

| Row | Byte 0 | Byte 1 | Byte 2 | Byte 3 | Byte 4 | Byte 5 | Byte 6 | Byte 7 |
|---|---|---|---|---|---|---|---|---|
| | | | | Data | | | | |
| 0 | 0x0000 | 0x0001 | 0x0002 | 0x0003 | 0x0004 | 0x0005 | 0x0006 | 0x0007 |
| 1 | 0x0008 | 0x0009 | 0x000A | | | | | |
| 2 | | | | | | | | |

FIG. 18

| Offset | Description | Notes |
|---|---|---|
| 0x00 | Micro-Link Version | Identifies the version of the protocol being used |
| 0x01 | Row Length | The transmission packet size for communications to this device |
| 0x02 | Number of Rows | The number of rows contained in the memory map |
| 0x03 | Unique Model Number (MSB) | A unique identifier for each model. |
| 0x04 | Unique Model Number (LSB) | |
| 0x05 | Unique data table configuration | Identifies the version of the configuration of the Micro-Link memory |
| 0x06 | MicroLink Protocols Implemented | Bit 0 – MicroLink Open Protocol<br>Bit 1 – Microlink Proxy Protocol<br>Bit 2 – MicroLink Private Protocol<br>Bit 3 – Microlink Self Describing Record is appended after header (Proxy Header is included before the self describing record)<br>Bit 4 – Microlink Bootload Protocol |
| 0x07 | Future Use | |

FIG. 20

COMMUNICATION PROTOCOLS

FIELD OF THE INVENTION

The invention relates generally to communications, and more specifically to communication protocols for communicating between network entities.

BACKGROUND OF THE RELATED ART

There are many different types of protocols for communicating between network entities, such as computer systems coupled to a communications network. Such networks may be, for example, point-to-point networks, shared networks such as busses, or any other media or network configuration type. To communicate, two entities (e.g., computer systems, devices, hardware, and/or software) need to use and support the same or similar communication protocol. As communicating entities change and grow in features and complexity, there is an ever-present need to support additional protocols between them to accommodate changes of the communicating devices, user interfaces and of the communication media between them.

Advances in technology have brought a proliferation of devices which can read and gather data from many different sources. Devices can remotely monitor parameters including temperature, traffic, weather, bridge stress, power problems, water leaks, alarm conditions, stock quotes, and others. These devices generally exist as stand-alone sensors or as small elements within a larger system.

Similar advances in technology have produced a myriad of choices to present data gathered by such devices to users. Users can read gathered data on computer terminal screens, handheld computers, wireless telephones, portable sound players, luminescent orbs, highway signs and others. These devices all have attributes that lend themselves uniquely to one or more, but not all communication methods for sending and/or receiving data. Some communication methods involve some type of communication medium, including wireless, wired busses, wired point-to-point, optical, optical cable, and others. Such communication methods also involve some data transmission method or modulation referred to in the art as a communication protocol. Protocols used to send data across such media are even more plentiful. Examples include the well-known communication protocols such as Ethernet, RS232, RS485, USB, Wi-Fi, and IrDA protocols, among others. There are many different communication methods involving different media and protocols, depending on the application.

According to one aspect of the present invention, it is appreciated that in many applications where many devices gather and send data to a much smaller group of listeners or users of data, there is a need to make the data gatherer smaller, less complex, to reduce overall system cost, while on the user's end there is a need to retain or increase the computing power in order to process and display the received data in a way that increases overall system usefulness.

Higher-level protocols typically used to transmit data, such as HTTP, are commonly used in today's network and computing environments to transmit data. The advantage to using these methods for groups of many devices is that low-cost widely available software can read data in a common format and the data is made available to anyone with a personal computer or other widely available compatible hardware. However, one disadvantage of these higher-level protocols is that they require significant microprocessor resources, which increase the cost of the many devices deployed to gather data.

Current state of the art systems have subsystems gathering data, which either present their data to users in higher level protocols or present data to an intermediary system (proxy) using an extremely low level method (such as an analog signal). The disadvantages of the former subsystems are that they are expensive, having to support a higher-level protocol and they may become outdated as the high-level means and methods connecting them to their users changes. Also, because there may be real-time data acquisition and/or control requirements, there may not be enough processor bandwidth to support such high-level protocols. The disadvantages of the low level subsystems are that the information is subject to external interference and low performance rendering such systems useful for no more than simple sensors located close to the user of data or its proxy.

SUMMARY

In today's networked and connected world it is becoming more important that all forms of communications from a device be able to present consistent data between interfaces. It is appreciated that devices (or systems) such as Uninterruptible Power Supply (UPS) devices historically have had significant problems in presenting the same data on multiple interfaces and generating common log files among devices that monitor such UPS devices. Conventional devices such as UPSs use a serial-based point-to-point protocol (e.g., a question/response-based ASCII protocol such as the well-known UPS-link protocol), which, if used with multiple devices, has a significant data delay between the multiple devices causing log files on those devices to be different. Although there are improved forms of these types of protocols, there are several problems in that these scaled-down protocols do not allow for multiple devices to communicate over the same connection. Also, it is appreciated that there is a problem with log file data being different among multiple monitoring devices.

In at least one embodiment, a system for exchanging information is provided. The system includes a memory, a first communication link, and at least one processor implementing a first protocol. The at least one processor is coupled to the memory and the first communication link. The at least one processor is configured to receive, via the first communication link, a first request message including a first globally unique identifier (GUID); start, responsive to receipt of the first request message, a communication session over the first communication link; provide a first response message including the first GUID; receive, via the first communication link, a second request message including data and a second GUID; write the data to a location indicated by the second GUID; read information stored at the indicated location; and provide a second response message including the second GUID and the information.

In the system, the first request message may includes a start of frame field storing a value that indicates a type of the first request message, a framelength field storing a value that indicates a length of the first request message, a datalength field storing a value that indicates a length of a data field, and a GUID field storing a value that identifies a first usage that when executed by the at least one processor will start a communication session. The second request message may include a start of frame field storing a value that indicates a type of the second request message, a framelength field storing a value that indicates a length of the second request message, a datalength field storing a value that indicates a length of a data field, a GUID field storing a value that identifies a second usage and the data field storing the data. The data may include an array index and other data and the second request message may includes a start of frame field storing a value that indicates a type of the second request message, a framelength field storing a value that indicates a length of the second request message, a datalength field storing a value that indicates a length of a data field, a GUID field storing a value that identifies a second usage, an index field storing the array index and the data field storing the other data.

In the system the at least one processor may be further configured to receive, via the first communication link, a third request message including a third GUID and a fourth GUID, determine whether the first protocol supports a fourth usage identified by the fourth GUID and provide a third response message including the third GUID, the fourth GUID, information describing the fourth usage and a sixth GUID that identifies another usage supported by the first protocol. The third request message may include a start of frame field storing a value that indicates a type of the third request message, a framelength field storing a value that indicates a length of the third request message, a DiscoveryGUID field storing a value that identifies the third usage and a RequestedGUID field storing a value that identifies the fourth usage.

The system may further comprise a memory map disposed within the memory. The memory map may store operational and configuration information. The system may further comprise a second communication link coupled to the at least one processor. The at least one processor may further implement a second protocol different from the first protocol and may be further configured to receive a message, via the second communication link, including an update to a location of the memory map; store the update at the location and provide a third response message including the update and a third GUID that identifies a usage that utilizes data stored at the location. The first communication link may include a universal serial bus (USB) link and the second communication link may include a serial link. The first protocol may be a request-response protocol and the second protocol may be a streaming protocol.

According to another embodiment, a system for exchanging information is provided. The system includes a memory, a first communication link, and at least one first processor coupled to the memory and the first communication link. The at least one first processor is configured to generate a first request message including a first globally unique identifier (GUID) that identifies a first usage that when executed by at least one second processor will start a communication session, transmit the first request message on the first communication link, receive a first response message including the first GUID, generate a second request message including data and a second GUID that identifies a second usage supported by a protocol implemented by the at least one second processor, transmit the second request message on the first communication link and receive a second response message including the second GUID and information having the same value as the data.

In the system, the first request message may include a start of frame field storing a value that indicates a type of the first request message, a framelength field storing a value that indicates a length of the first request message, a datalength field storing a value that indicates a length of a data field and a GUID field storing a value that identifies the first usage. The second request message may include a start of frame field storing a value that indicates a type of the second request message, a framelength field storing a value that indicates a length of the second request message, a datalength field storing a value that indicates a length of a data field, a GUID field storing a value that identifies the second usage and the data field storing the data. The data may include an array index and other data. The second request message may include a start of frame field storing a value that indicates a type of the second request message, a framelength field storing a value that indicates a length of the second request message, a datalength field storing a value that indicates a length of a data field, a GUID field storing a value that identifies the second usage, an index field storing the array index and the data field storing the other data.

According to another embodiment, a method for exchanging information using a first computer is provided. The method includes acts of generating, by the first computer, a first request message including a first globally unique identifier (GUID) that identifies a first usage that when executed by a second computer will start a communication session on a link shared by the first computer and the second computer; transmitting the first request message on the link; receiving a first response message including the first GUID; generating a second request message including data and a second GUID that identifies a second usage supported by the second computer; transmitting the second request message on the link and receiving a second response message including the second GUID and information having the same value as the data.

In the method, the act of generating the first request message may include acts of storing a value that indicates a type of the first request message within a start of frame field, storing a value that indicates a length of the first request message within a framelength field, storing a value that indicates a length of a data field within a datalength field and storing a value that identifies the first usage within a GUID field. The act of generating the second request message may include acts of storing a value that indicates a type of the second request message within a start of frame field, storing a value that indicates a length of the second request message within a framelength field, storing a value that indicates a length of a data field within a datalength field, storing a value that identifies the second usage within a GUID field and storing the data within a data field. The data may include an array index and other data. The act of generating the second request message may include acts of storing a value that indicates a type of the second request message within a start of frame field, storing a value that indicates a length of the second request message within a framelength field, storing a value that indicates a length of a data field within a datalength field, storing a value that identifies the second usage within a GUID field, storing the array index within a index field and storing the other data within a data field.

The method may further comprise acts of generating a third request message including a third GUID that identifies a third usage that when executed by the second computer will determine whether the second computer supports a fourth usage identified by a fourth GUID; transmitting the third request message on the link and receiving a third response message including the third GUID, the fourth GUID, information describing the fourth usage and a sixth GUID that identifies another usage supported by the second computer. The act of generating the third request message may include acts of storing a value that indicates a type of the third request message within a start of frame field, storing a value that indicates a length of the third request message within a framelength field, storing a value that identifies the third usage within a DiscoveryGUID field and storing a value that identifies the fourth usage within a RequestedGUID field.

The method may further comprise acts of receiving, via the link, the first request message; starting, responsive to receipt of the first request message, the communication session; providing, responsive to receipt of the first request message, the first response message; receiving, via the link, the second request message; writing, responsive to receipt of the second request message including the data, the data to a location indicated by the second GUID; reading, responsive to receipt of the second message, information stored at the location; and providing, responsive to receipt of the second request message, the second response message.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings,

FIGS. 1A-1C show block diagrams of several embodiments of communication systems consistent with various aspects of the present invention;

FIG. 18 is a table showing an example memory map according to one embodiment of the present invention;

FIG. 20 is a table showing an example header format according to one embodiment of the present invention;

DETAILED DESCRIPTION

Figure 1B:
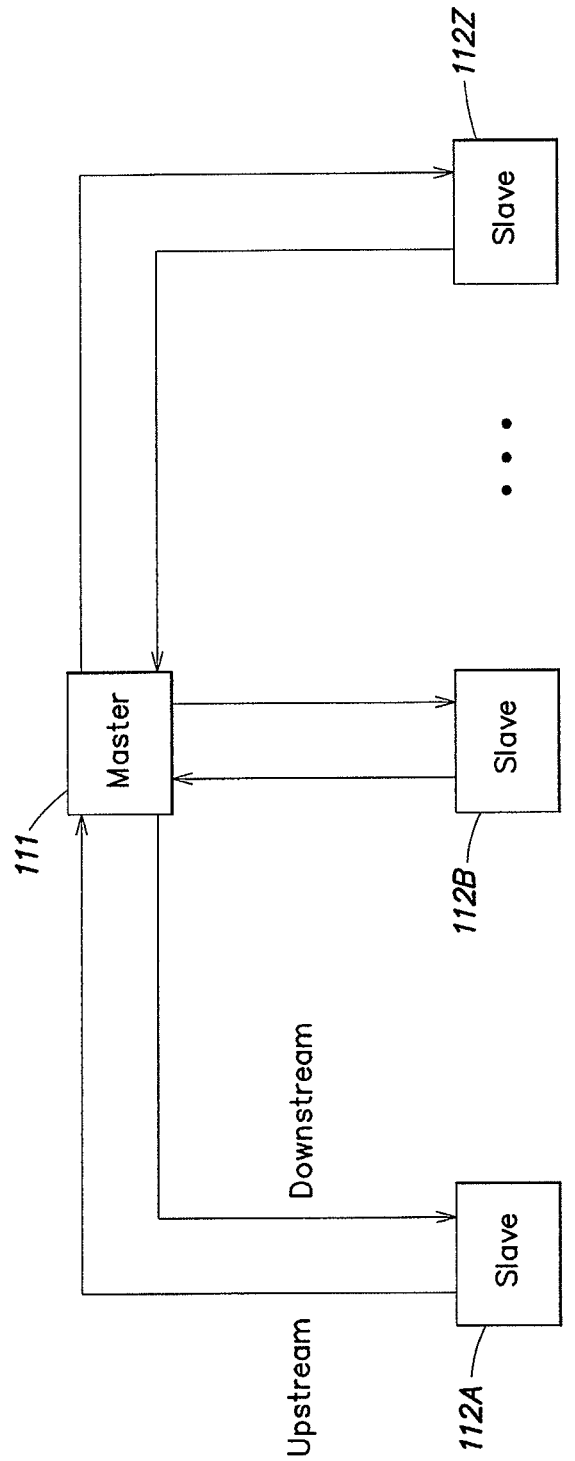

One aspect of the present invention relates to a communication protocol for communicating between one or more entities, such as devices, hosts or any other system capable of communicating over a network. According to one aspect of the present invention, it is appreciated that a protocol is desired for use in communicating information from many entities such as devices (e.g., a UPS) to a small number of users of data. According to specific aspects of the present invention, it is appreciated that there is a need for a communication subsystem that subsystem types that can operate in an application having the following attributes:

In the particular application, there are many entities that gather data and control simple functions (e.g., devices that manage a power or cooling device). Such entities send data to a much smaller group of entities that process, manage and display this data to users or other systems.

The simple data gatherers generate most of data, and most consumers of data have relatively small amounts of data to send back to the data generators. For example, in a typical control system, there are multiple inputs and a small number of outputs.

Consumers of data generally prefer to use the same rules to communicate to multiple different sources of data, such as a web browser application loading web pages from different websites, or a building management interface that monitors a status of different types of systems in its domain such as HVAC, water and electrical distribution subsystems.

A subsystem architecture ideal for this application may have the following features and advantages:

Where data is generated, a lower-cost device can be used to conduct the control functions, and send relevant data, using a simpler protocol, to other devices that can handle higher-level end-user communication protocols.

Changes to the higher-level protocols, or the addition of new user-interfaces that employ new protocols do not require changing the many low-cost control processors' operating instructions and/or hardware.

Information transmitted to and from the data sources reliably and securely support moderate control, management and monitoring of those remote subsystems.

According to various aspects of the present invention, protocols are provided that allow communication between multiple entities using low-level protocols. In one configuration, slave devices are able to be connected to, and communicate with, a master device using a serial link, such as a USB link, or links for other networking standards, such as Ethernet link. Some configurations may include a pass-through slave device is provided having at least two links, one of which is connected to a master device and another which is connected to a downstream slave device. In another embodiment, the system may be capable of chaining additional slave devices downstream from the master, and a protocol is provided that permits communication by all chained devices to the master in a coordinated manner. According to one aspect of such a protocol, devices on the chain, once authenticated, are permitted to observe, control and share information stored in the master device. As discussed, this may be useful for multiple devices to manage a single master device.

According to another aspect, an authentication method is provided that permits a slave in a pass-through mode, once authenticated, to communicate with other devices. In such a configuration, downstream slave devices authenticate to the master, and once authenticated, are permitted to communicate with the master or pass on communications from other downstream devices.

Another aspect of the present invention relates to another configuration between a master and multiple slave devices using a star configuration. In such a configuration, a master device is configured with more than one link, and those links are coupled to more than one slave device. A protocol is provided that permits coordinated control and observation of the master device. In one aspect, the protocol enables communication between devices in a coordinated manner without the need for device addressing.

According to another aspect of the present invention, it is appreciated that it is difficult to use conventional low-level serial communications among more that one device. In systems with more than two devices, more complex protocols are generally used, but more overhead is required to coordinate communication among multiple devices. According to one embodiment, a serial-based communication method is extended to multiple devices, without the necessity and overhead of addressed communications. In particular, a serial protocol is used among multiple devices wherein devices need not maintain unique addresses, and messages are not required to be addressed or otherwise directed towards a particular destination device. Further, it is appreciated that conventional serial protocols that natively do not include addressing need not have addressing to permit communication among more than two devices.

Further, according to yet another aspect of the present invention, a protocol is provided that allows communication between entities without a priori knowledge of data content and format being transmitted using the protocol. In such a protocol, for example, information describing a data structure of the communication protocol is transferred between communicating entities. This type of operation contrasts to conventional systems that need to know the protocols, commands and data structures of the devices with which they communicate before they begin to communicate.

In one example system according to one embodiment of the present invention, the data structure of a communication protocol is stored in a memory of a receiving entity, and the stored data structure is updated based on information received from a sending entity. According to one embodiment, the data structure is stored in both the sending and receiving entities. In a specific example, elements of the data structure may be modified by either entity.

In one embodiment, the data structure is described within a header of the received information. According to one example, the received information includes header information and device data. Such device data may include, for example, entity configuration and status data.

In a specific example, the header information includes version information that indicates a version of the data structure. The header information may also include dimension information indicating a dimension (e.g., a size) of a memory area of the transmitting entity.

In one embodiment, the receiving entity is referred to as a "slave" (or slave device) because the slave learns the protocol used by a transmitting entity referred to as the "master" (or master device). In particular, the slave may update its use of the protocol to match the use of the protocol of the master. Also, the receiving entity is referred to as a "slave" as the protocol is designed generally for data to flow from the master entity to the slave entity. In one example, the slave accesses a shared memory of the master to determine a data structure used by the master. According to one embodiment, the slave is capable of storing the data structure used by the master in a memory associated with the slave. The slave may then access the master using the received data structure information. For instance, the master may access other data stored in the master using previously-received data structure information. The data structure may define, as discussed, the version of the protocol and dimension information.

The dimension information may include, for example, a number of rows and a length of data within rows contained in the memory. In one example, the length of each row may correspond to a transmission packet size of data packets being sent. In one embodiment, a transmission packet size used to communicate information between two entities (e.g., the slave and the master) may be determined by the length information stored in the memory of the master. In one embodiment of the present invention, a slave may automatically determine the transmission packet size used to communicate to the master. In one example, at the start of communication between the master and slave, the slave communicates a message to the master and waits a timeout period for a response from the master. The master is adapted to send the data structure information including the transmission packet size to the slave upon receipt of the message. In one example, the message is a message having a fixed length. In another example, the message is a negative acknowledge message, and the master is adapted to send the data structure information upon receipt of a predetermined number of negative acknowledgement messages.

Because the slave can dynamically adapt itself to a number of different master types and versions, the slave is more adaptable to master devices and is more useful as a result. Such a feature may be beneficial, for example, in a management system that manages one or more devices (e.g., master devices). Further, the slave may be part of a proxy system that is capable of communicating with one or more systems, such as a management system. Also, because such a slave need not store multiple protocols to support multiple master types, the slave may be simplified and less costly as a result. More particularly, the cost for creating slave devices may be reduced, as the slave may be adapted to different master devices rather than being specially-manufactured for a single or limited number of master device types.

In one embodiment, a protocol is provided that permits slaves to learn available "features" of a master. If a particular slave supports a particular set of features, and a master supports one of those features, then the slave may be able to support that one master feature. In one example, a slave may be provided that supports features 1-10, and that slave can be used with a master that supports features 1-7 without reprogramming the slave. To support a master that supports features 1-11, a slave would need only to add support for feature 11. In one embodiment, a slave may be capable of determining features supported by a master by inspecting a description of supported data elements provided by the master (e.g., in a descriptor stored within a message communicated from the master). In at least one embodiment described below, the slave uses a Discovery message to request supported features from the master. This embodiment is described further within the Request-Response Protocol section below.

In one specific embodiment, one entity (such as the master) changes its stored version of the data structure more frequently than the other entity. For instance, in a monitoring and/or control system, a device may be adapted to update its copy of the data structure more frequently than systems that monitor the device. For instance, the device may be an uninterruptible Power Supply (UPS), a UPS component, environmental control system (e.g., an air conditioning system or component), or other type of monitoring and/or control device.

The slave may be, for example, a manager of the master (e.g., a device being monitored and/or controlled). In one example, the slave is implemented on a general-purpose computer system such as, for example, a personal computer (PC). For instance, the slave may be part of a PC used to manage the master, such as a monitoring and/or control device. As discussed, the slave may also be part of a system (e.g., a proxy) that acts as a relay that communicates data to/from other systems. To this end, entities communicating with a master may be directly connected to the master (e.g., via a serial link) or may be coupled through one or more intermediate systems and/or networks.

The shared memory of the master may include other information used by the slave to access the master. For example, the dimension information may also include an identifier that indicates a version of a data table format of information stored in memory of the master. A slave may use such an identifier to determine the format of data stored in memory of the master; any slave may therefore learn the format and usage of the master data as a result.

According to one aspect of the present invention, a protocol is provided that supports an unequal (or unbalanced) transfer of data between communicating entities. That is, the amount of data sent by one entity exceeds the amount sent by another entity. In one specific implementation, the protocol may provide the ability to communicate a majority of data from a master to a slave in a reliable manner. In one implementation, the slave is able to send data to the master, but at a reduced data rate as compared to the transmission rate of the master. According to one aspect of the present invention, it is realized that in particular applications such as monitoring of devices, a majority of data is sent by the devices being observed, and therefore, it may be beneficial to optimize a communication protocol maximize such a transmission scenario.

According to another aspect of the present invention, a protocol is provided that permits an entity to relay transmitted information without needing to understand or interpret the transmitted information. The information may be relayed, for example, to another entity such as a client system (e.g., by the proxy system as described above). In one example, the entity may be located on another network, and the intermediate entity (e.g., the proxy) transfers the information between different networks. In the example described above, a slave may be capable of determining communication parameters used for communicating to a master system.

In one aspect of the present invention, the slave system may be capable of relaying requests to the master from other entities. In one example, the slave need not interpret any data transferred between the master and other entity, but may translate requests received from another entity to the communication format required by the master. There may be defined a minimum set of information necessary for the slave system to communicate with the master, and to adapt its communication to permit other entities to access the master through the slave. Because a slave according to one embodiment is capable of communicating with a number of master systems having varying communication capabilities, and the slave is capable of translating requests to other entities, such a slave system may be useful in managing multiple system types. Such a management capability may be beneficial in a UPS having one or more managed components.

In one embodiment, the proxy is capable of supporting access and relating information to/from a master entity by more than one entity. For instance, a proxy having a slave capability may also be coupled to more than one other system (e.g., computer systems (e.g., clients) coupled to a communication network) for the purpose of managing the master entity from more than one system. To this end, the proxy may be capable of receiving multiple requests from different systems, and translate those requests to requests that may be executed on the master.

Also as discussed further below, the slave of the proxy is capable of performing an authentication function so that an authorized slave may communicate with a master. In the situation where multiple entities attempt to access a single master, the proxy may be adapted to support authentications of each of the accessing systems. In such a case, according to one embodiment of the present invention, the proxy system performs a check to determine whether the accessing systems have permission to perform one or more accesses (e.g., one or more read functions, write functions, control functions, etc.) to the master entity. If authenticated, the proxy communicates the access request to the master entity. If not, the access request is denied.

According to one embodiment of the present invention, an improved communication protocol is provided for effecting low-overhead or "lightweight" communication between entities, such as hardware controllers. Such a protocol may be used to communicate information between network entities such as, for example, an Uninterruptible Power Supply (UPS) and/or a UPS component and a host computer system. However, it should be appreciated that such a protocol may be implemented in other types of systems, including, but not limited to, air conditioning systems, home automation systems, field monitoring systems, or other system applications having monitoring and control functions.

In one embodiment, the protocol allows access to a device (e.g., a UPS) by a communicating system (e.g., a computer). Such access may be required, for example, to ensure there is no unauthorized access or control of the device. For instance, an unauthorized personal computer may access a UPS device to shut down or reconfigure the UPS system. In one example, access is performed by way of a bidirectional locking feature. In one embodiment, such a feature allows, for example, a device (e.g., a UPS) to communicate only with authorized software (e.g., an application executing on a host computer), and the software to communicate with an authorized device (e.g., an authorized UPS). In another embodiment, a proxy system may be used to access a device (e.g., a UPS or UPS component). In one example, a management system associated with the UPS is used to communicate information from other systems to the device. The management system may act as a proxy for the purpose of performing management functions or obtaining information from one or more managed devices (e.g., a UPS or UPS component).

Such access may be permitted based upon a bidirectional locking key stored at both the device and the communicating system. In the UPS example above, when the UPS is in a locked mode (e.g., a communicating system that accesses the UPS does not have the proper key), the UPS only allows data to be written to a publicly accessible section of the memory. For instance, the UPS may only allow a communicating system to access public areas of a memory device of the UPS (e.g., an EEPROM, RAM, etc.). Other data write operations to non-public areas of the memory are not permitted. In this manner, operations using configuration and operating parameters may not be performed without a correct key. In one example, the key may be determined using publicly-accessible information stored in one or more public areas of a master device. In yet another embodiment, multiple levels of authentication may be provided that permit certain data elements to be accessed and/or updated by a slave device. For instance, in a "factory" mode of authentication, information such as serial number, manufacture date, etc. may be changed, but in a "user" mode (e.g., a typical slave mode), such information may have a different level of access (e.g., read-only).

In another embodiment of the invention, a method is provided for relaying the access information by an intermediate entity without the need to understand or unlock the transmitted information. That is, an entity, referred to herein as a proxy, is permitted to relay the transmitted information without necessarily understanding the protocol. According to one embodiment, information describing the format of data in the transmitted information is contained within the transmitted information itself. According to another embodiment, a proxy is required to authenticate and unlock the transmitted information to other devices, to provide additional security. In another embodiment, a slave device that participates with other slave devices in communicating with the master device, may "see" communications with the master, be adapted to repeat data communicated by/to other slave devices, yet need not interpret their communications.

In other embodiments, the protocol is a request-response based protocol in which messages include a name, value tuples that indicate individual data elements and values associated with the data elements. In these embodiments, a source device (master or slave) issues a request message to a target device (master or slave) and the target device processes the message according to a method associated with the name, value tuple included in the message. The target device issues a response to the source device that communicates some result of the processing conducted by the source device. Particular processes and data structures implemented by these embodiments are described further within the Request-Response Protocol section below.

Example System

Figure 1C:
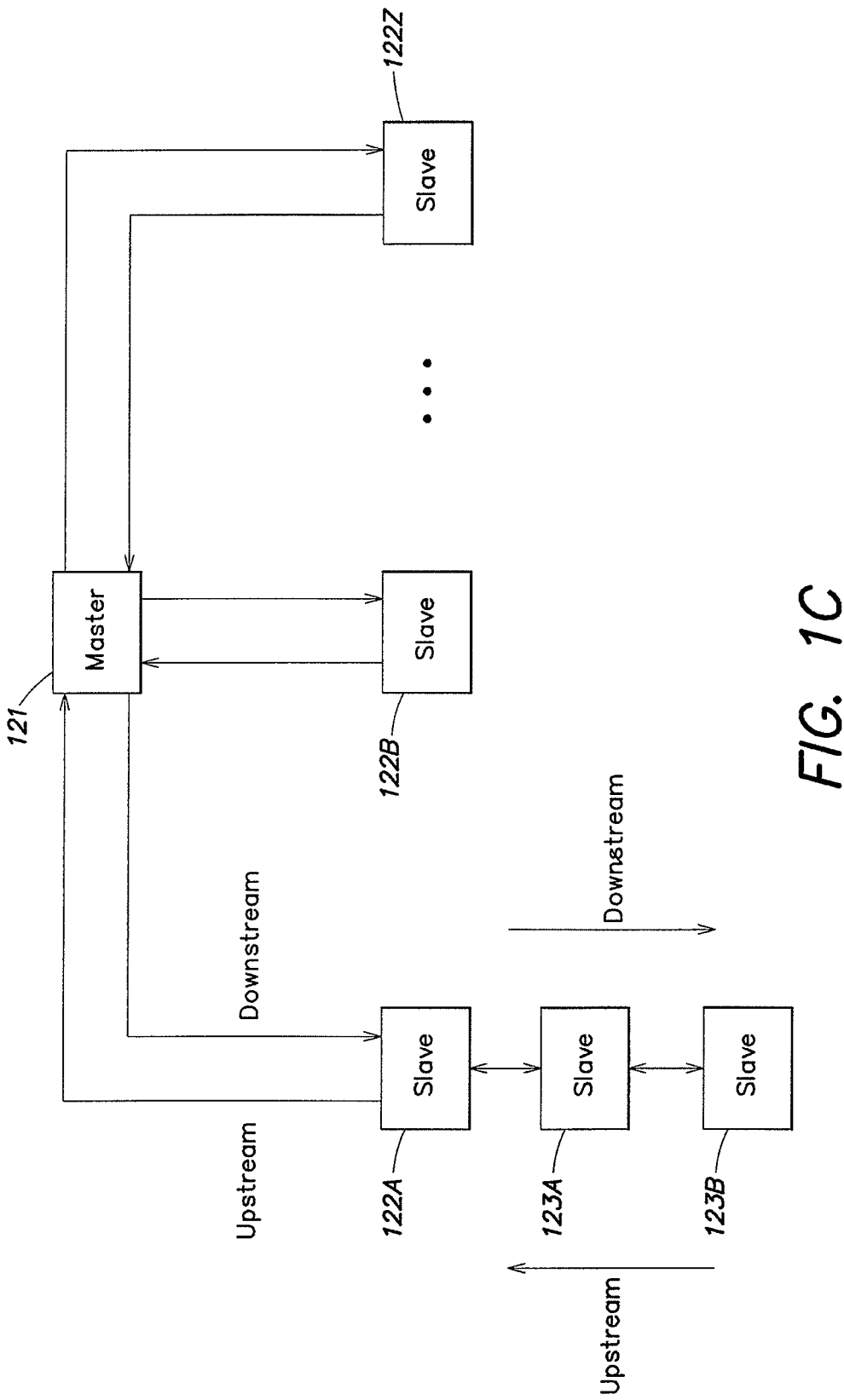

FIGS. 1A-1C show various configurations of communication systems that implement various aspects consistent with principles of the present invention. In particular, FIG. 1A shows a master device 101 coupled to one or more slave devices 102A-102Z in a serial-chain configuration. In this configuration, master 101 includes at least one serial link which is directly coupled to a slave 102A. Slave 102A includes at least one other serial link to which at least one other slave is attached.

According to one embodiment of the present invention, a slave device (e.g., slave device 102A) is configured to operate in a pass-through mode whereby data transmitted by downstream slave devices is passed to the master by the slave operating in a pass-through mode. Further, data produced by the master is passed through the chain and observed by authenticated devices that are attached to the chain. In this way, the same set of data from the master can be observed by all devices on the chain. According to one embodiment, pass-through devices do not repeat information downstream until that particular pass-through device authenticates with the master. In another embodiment, once a pass-through device has authenticated with the master device, the pass-through device allows downstream devices to join the conversation with the master device. For example, a downstream slave with attempt to authenticate with the master device once the pass-through device is authenticated. In this manner, a pass-through device authenticates first, then "opens the door", allowing a next slave device to authenticate with the master. This process is repeated of "opening" downstream pass-through slaves until the end slave device authenticates with the master device.

FIG. 1B shows an alternate configuration that also permits multiple slave devices (e.g., slave devices 112A-112Z) to communicate with a master (e.g., master device 111). In this configuration, master device 111 is provided more than one serial port which may be coupled to more than one corresponding slave device in a star configuration. In this configuration, information communicated to one slave device is repeated to other slave devices by the master. In this way, each slave device receives the same information from the master. For instance, when a change in data is communicated from a slave to the master device, this change in information is repeated to other slave devices.

Further, an authentication method is provided wherein each slave device authenticates with the master device in order to have access to the data stored in the master. As discussed further below, one aspect of the present invention relates to a protocol that operates on a common memory map that is stored in registers of the master device.

In a further configuration as shown in FIG. 1C, both the star-based and serial chain-based configurations may be used together in the same configuration, permitting multiple devices to monitor and control the master device. For instance, as shown in FIG. 1C, slaves 122A-122Z are directly coupled to a master device 121 via serial communication links. Further, in this example configuration, slave 122A includes at least one additional serial link that is coupled to a downstream slave 123A in a serial chain configuration. As shown, slave 123A is serially-connected to a further slave 123B which is located at the end of the chain, off of one of the branches of the star configuration. Because both of these configurations are supported, more flexible configurations for connecting to a master device are possible.

Figure 2A:
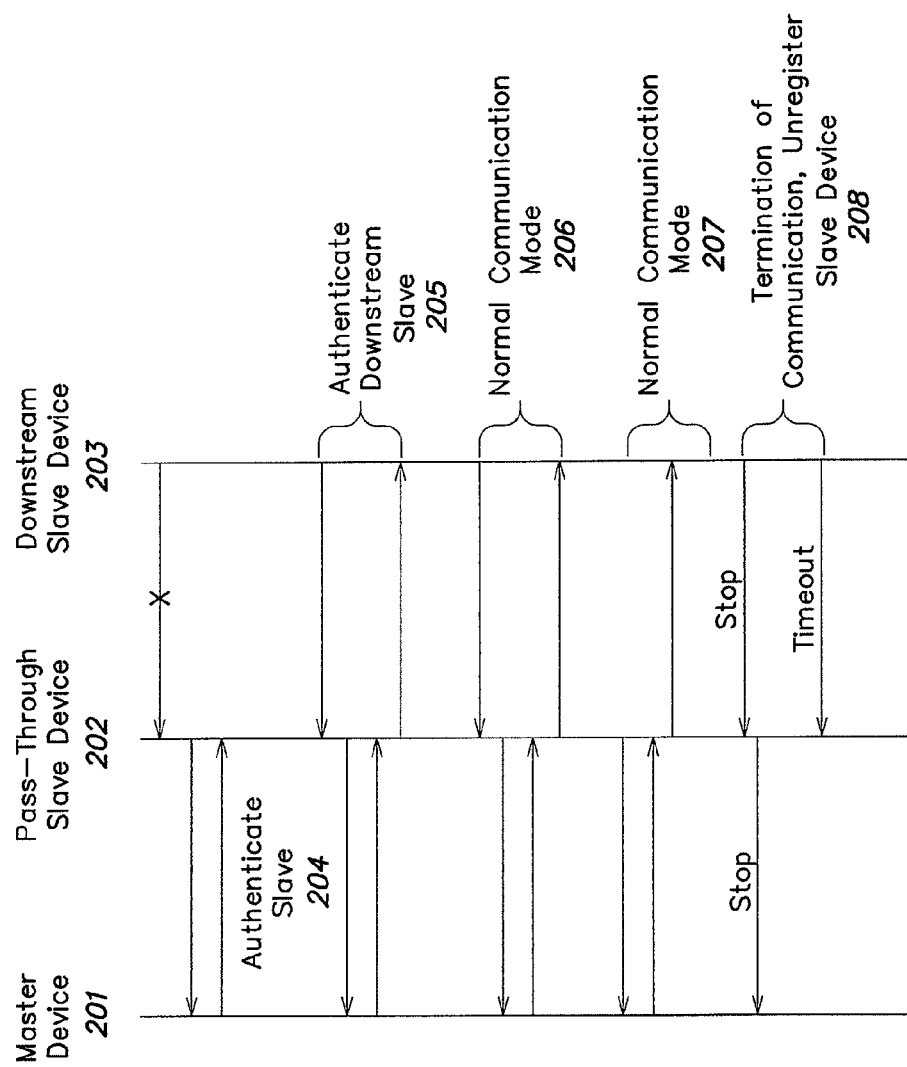
FIGS. 2A-2C show processes for conducting communications according to one embodiment of the present invention.

FIG. 2A shows one example of a communication process according to one embodiment of the present invention. For instance, as shown in FIG. 2A, a master device (e.g., master device 201) may communicate to one or more downstream slave devices (e.g., downstream slave device 203) through one or more pass-through devices (e.g., pass-through device 202). Such a process may occur, for example, using a serial chain configuration as shown in FIG. 1A. In one embodiment, communication may begin with the downstream slave device requesting to communicate with the master. In one embodiment, if a downstream slave requests communications to a master device that is not authenticated with the master, that communication is blocked by the pass through device (e.g., device 202).

The pass-through slave device is permitted to authenticate with the master device (e.g., at 204), and once authenticated, the pass-through slave may be permitted to pass information to other downstream slave devices under certain conditions (e.g., once they have authenticated with the master device).

For instance, after a pass-through device to which a downstream slave device is directly connected has authenticated with the master device, the downstream slave device may then authenticate with the master device (e.g., at 205). In one embodiment, the authentication may involve a bidirectional authentication between a slave and a master device as discussed further below.

Once authenticated, the downstream slave (e.g., downstream slave device 203) may communicate with a master device (e.g., master device 201) in a normal communication mode (e.g., mode 206). Normal communication may involve, for example, the downstream slave device requesting data from the master (e.g., a request to read a portion of a memory map, register, or other data), transmit commands to be executed on the master, and/or to control the use of the protocol (e.g., stop communications). In one embodiment, when data is communicated from a downstream slave, the pass-through slave device passes such data bytes upstream toward the master device. The master device generally responds to the data (e.g., by verifying that a command has been executed, returning a memory map portion of the data, etc.) and that response is received by the pass-through device and transferred to one or more downstream slave devices away from the master device. In one embodiment, additional pass-through devices may be positioned between the master device and a downstream slave device at an end of a serial chain of devices. In this case, each slave device repeats data received either toward the master or end slave device as appropriate.

Further, in another normal communication mode, an upstream slave device (e.g., pass-through device 202) may send its own data (e.g., commands, requests for data, etc.) to the master device 201 (e.g., as shown by normal communication mode 207). Because this data is sent unidirectionally toward the master device, downstream slave devices may be unaware of the communication by upstream slave devices. According to one embodiment, downstream slave devices are kept current by transmitting the response from the master to the upstream slave request to any downstream slave devices. In this way, the "view" of the current state of the master device is consistent among multiple slave devices.

Further, according to other embodiments, the normal communication mode along the serial chain may be interrupted, such as in the case where a device is removed from the chain, a slave device halts communication or otherwise fails. According to one embodiment, when a change in configuration occurs, each device along the chain may be required to re-authenticate with the master device. Termination of communication of communication (e.g., element 218) may occur when any slave device issues a command that halts the protocol (e.g., a "STOP" command) or the communication exceeds a timeout or otherwise fails. In one embodiment, the failed device(s) are unregistered from the master device, and need to re-authenticate to resume normal communications.

In yet another operation mode, when a downstream slave device times out, issues a STOP command, or otherwise fails, the slave device to which the downstream slave device is directly connected continues communication with the master device. In such a mode, any remaining slave device may not need to re-authenticate themselves with the master device. In such a case, for example, the last remaining slave may be responsible for detecting the loss of the downstream slave device and continuing communication with the master device (or any upstream slave devices).

According to one embodiment, a pass-through device may implement a timer that observes the timing of upstream and downstream communications. According to one embodiment, the timer may reset when data is received in either direction. For instance, when a timer exceeds a maximum period of time (e.g., 1.5 seconds, 3 NAK times, etc.), communications may be resent. A timeout may result in a pass-through device eliminating or closing communication to a downstream slave device that does not respond within the timeout period. Also, if a communication from the master device is expected, communications with the master can be reset. According to yet another embodiment, there may be a pause mode where pass-through and other devices may pause for a longer time period without having to restart the authentication process.

Figure 2B:
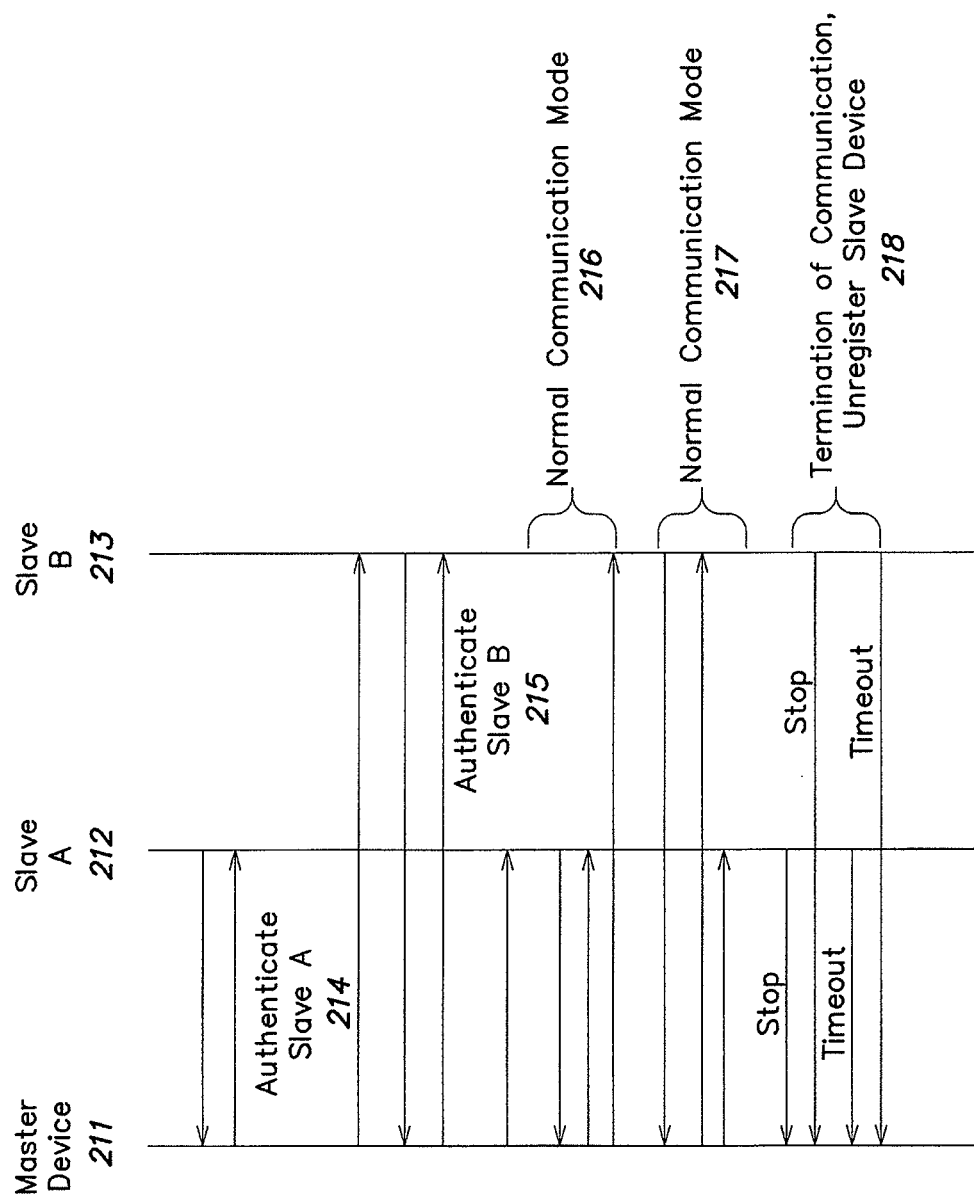

FIG. 2B shows another example of a communication process according to one embodiment of the present invention. For instance, as shown in FIG. 2B, a master device (e.g., master device 211) may communicate to one or more slave devices (e.g., slave device A 212, slave device B 213). Such a process may occur, for example, using a star configuration as shown in FIG. 1B. In one embodiment, communication may begin with one or more of the slave devices requesting to communicate with the master.

The slave device is permitted to authenticate with the master device (e.g., at 214, 215), and once authenticated, the slave may be permitted to communicate with the master device. According to one embodiment, as there may be more than one slave device connected to the master device (e.g., through different serial links), the master may authenticate each slave one-by-one, until a normal communications mode is achieved. For instance, if communications are interrupted, each slave with reauthenticate with the master. According to one embodiment, as a slave device authenticates with the master device, authentication information is not repeated to other devices that are currently authenticated with the master device. That is, in a normal operation mode, information is generally repeated to all authenticated slaves, but for security purposes, authentication information is not repeated. In one embodiment, information is transferred to other slaves that indicate authentication is being performed with other slave devices, but the actual information used to authenticate the slave devices (e.g., challenge/response information) is not repeated. In one embodiment, the authentication may involve a bidirectional authentication between a slave and a master device as discussed further below.

Once authenticated, the slave devices (e.g., slave device A 212, slave device B 213, etc.) may communicate with a master device (e.g., master device 211) in a normal communication mode (e.g., mode 216, mode 217). Normal communication may involve, for example, the slave device requesting data from the master (e.g., a request to read a portion of a memory map, register, or other data), transmit commands to be executed on the master, and/or to control the use of the protocol (e.g., stop communications). In one embodiment, when data is communicated from a slave, the master device generally responds to the data (e.g., by verifying that a command has been executed, returning a memory map portion of the data, etc.) and that response is then repeated to all other authenticated slave devices (e.g., repeated on all other serially-connected interfaces in the star configuration). This permits, for example, the "view" of the current state of the master device to be consistent among multiple slave devices.

Further, according to other embodiments, the normal communication mode in the star configuration may be interrupted, such as in the case where a device is removed from an interface, a slave device halts communication or otherwise fails. According to one embodiment, when a change in configuration occurs, each device in the star configuration may be required to re-authenticate with the master device. Termination of communication of communication (e.g., element 208)

may occur when any slave device issues a command that halts the protocol (e.g., a "STOP" command) or the communication exceeds a timeout or otherwise fails. In one embodiment, the failed device(s) are unregistered from the master device, and need to re-authenticate to resume normal communications.

In a mixed-mode configuration wherein both the star-base and serial-based communications are used (e.g., in FIG. 1C), information from the master device is repeated to all serial links having an authenticated slave device attached, including a serially-connected chain of slave devices. Information sent to a pass-through slave device on that chain is repeated serially down the chain to the other connected devices (e.g., ones that are authenticated to the master device). In the case that communication is interrupted or otherwise stopped to any authenticated slave, according to one embodiment, all slaves will reauthenticated to the master in a port-by-port, device-by-device manner along each port and down each chain. Thereafter, information from the master device may be shared consistently with each authenticated device.

Figure 2C:
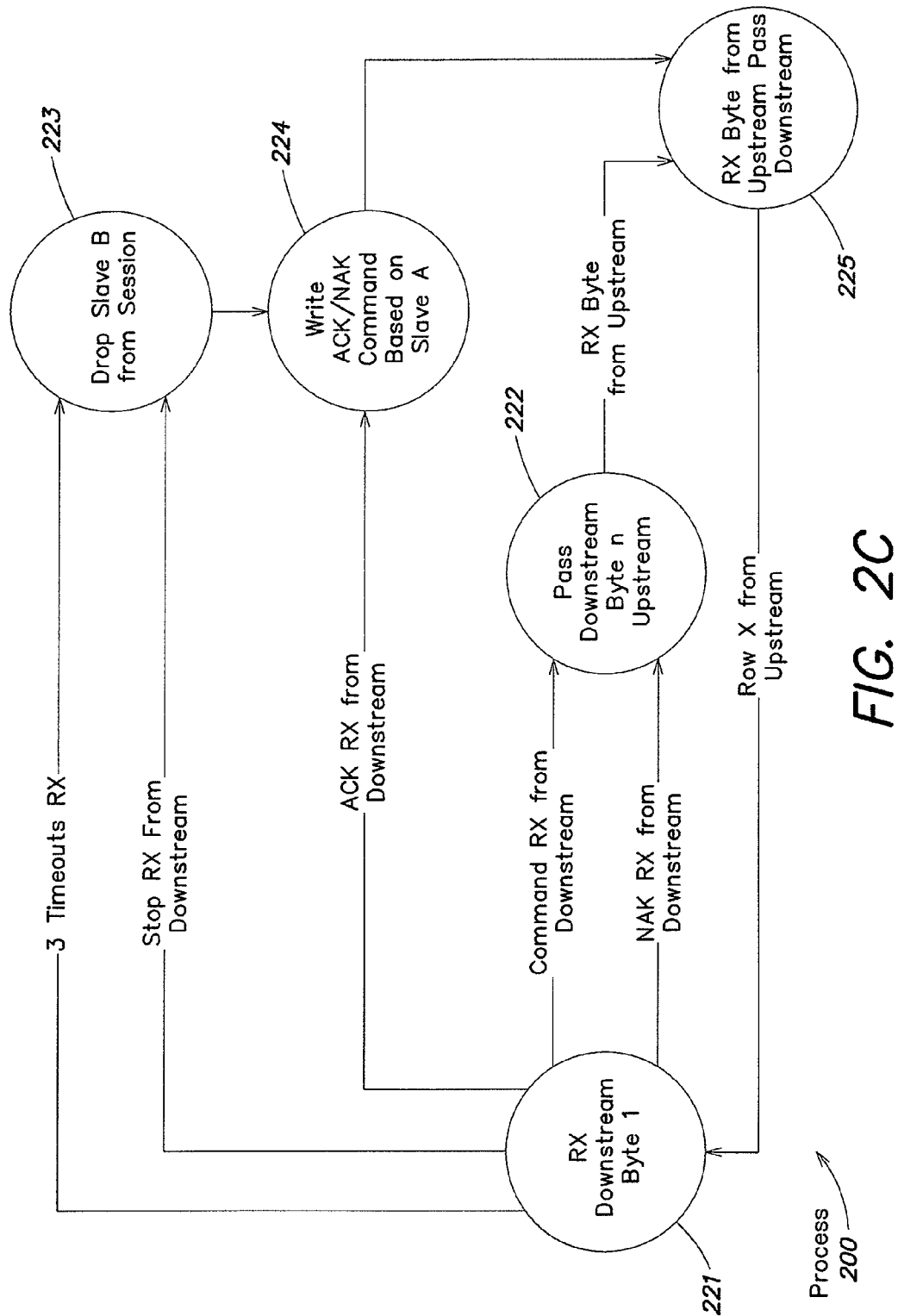

FIG. 2C shows a process 200 for conducting communications according to one embodiment of the present invention. For instance, a serial chain configuration of slave devices such as that shown in FIG. 1A may be capable of performing process 200. According to one embodiment of the invention, a pass-through slave device (slave A) may be passing data from one downstream slave device (slave B) towards the master device. As shown in FIG. 2C, a slave device may receive a row X from an upstream slave device. More particularly, a slave device may be capable of writing to one or more memory rows within a memory map of a master device. To this end, a slave device may transfer a row of memory in a communication from a slave device to the master device. At block 221, when a row X is transmitted by an upstream slave device, a pass-through device (slave B) receives the data and processes it.

The received data could include one of a number of types of communications, such as, for instance, a stop command, an acknowledgement (ACK), a negative acknowledgement (NAK), a command, or other communication type. Also, a timeout could be experienced which may cause communications to be terminated. For instance, in some embodiments, after three timeouts occur, a slave (e.g., slave B) may be dropped from the session at block 223. Further, if a slave B sends a stop command to the pass through device, the pass-through device (slave A) will drop the slave B device from the session.

In another embodiment, if an ACK message is received from a downstream slave device (e.g., slave B), the ACK command based on slave A is executed (e.g., at block 224). That is, the intermediate slave replaces the status message with their own status message, as it would be beneficial for all devices along the chain to have received the message. However, if a NAK message is received from a downstream node, then it is indicated that the downstream node has not received the message and thus does not have a consistent view of the master device. In such a case, the received NAK message is passed upstream towards the master by the pass-through device (e.g., at block 222).

Thus, in summary, data received from downstream slave devices are passed upstream and repeated by each intermediate slave device. Commands executed by downstream slave devices are passed upstream and executed on the master. The results of these commands are generally in the form of a memory row which is transferred back towards the slave device along with the serial chain configuration. In this way, each of the slave devices along the serial chain is capable of observing the change in memory map data that occurs on the master device. However, in the upstream direction, intermediate slave devices perform little to no processing on messages sent by other downstream slaves, allowing for minimal delay in data being communicated to the master device. According to one embodiment, commands sent upstream are in a multibyte form, and slaves do not parse the received multibyte message received from downstream slave devices. The intermediate slave devices merely repeat downstream communications upstream and observe the data sent back from the master device.

According to one embodiment, intermediate slave devices perform packet validation, but the intermediate slave devices do not attempt to understand data residing within the packet. Not only is this beneficial from a timing perspective, but according to one embodiment, this feature also "future-proofs" the protocol so that an intermediate device need not understand all of the commands and/or data that could be generated by downstream slave devices. In this way, different slave devices having different functionality can coexist on the same serial chain without disruption of the protocol.

The change in the master device is observed when the master receives the command and transmits the response to all slaves. As described in the example above, if there is a chain of devices 1-10, and if device 3 generates a command, devices 1 and 2 will see the command going towards the master. However, devices 4-10 have no knowledge of the command. To account for this scenario according to one embodiment, the master is adapted to send the response to the command to all slave devices. In this way, every device "sees" the command. In another case where device 10 sends command 1 and device 4 sends command 2, device 4 determines which command goes through to the master device. Because device 4 only permits one command to pass, the master will process only one command (the command from device 4). Therefore, device 10's command will never be acted upon, and device 10 will rely on the response from the master to determine that its' command was not received and that device 10 should retry transmission of the command. For these reasons, slaves only respond to data from the master, and "ignore" the commands traveling upstream and wait for the master to process them and give the response.

Figure 3A:
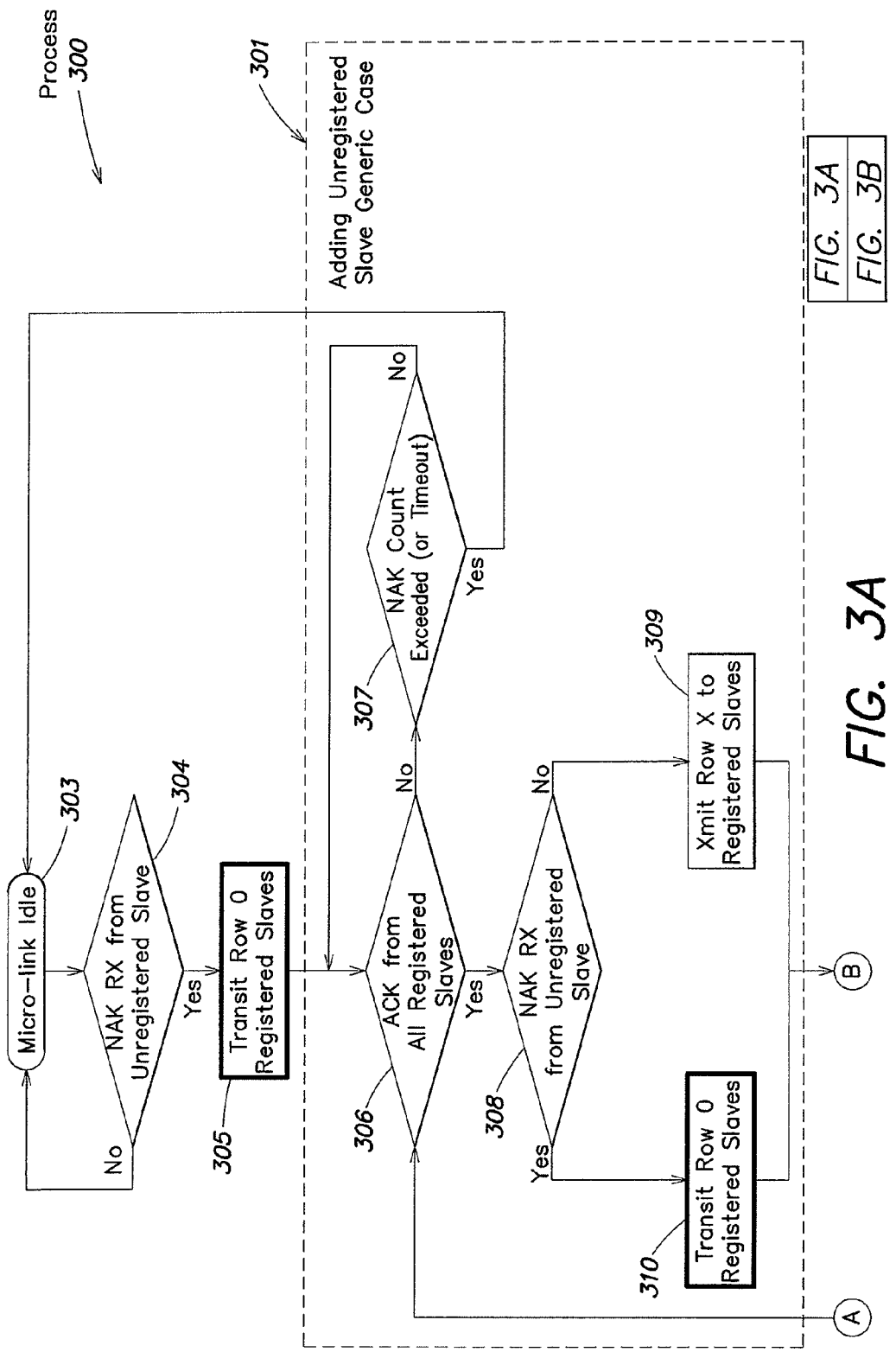
FIGS. 3A-3B show processes for adding and removing slave devices according to various embodiments of the present invention.
Figure 3B:
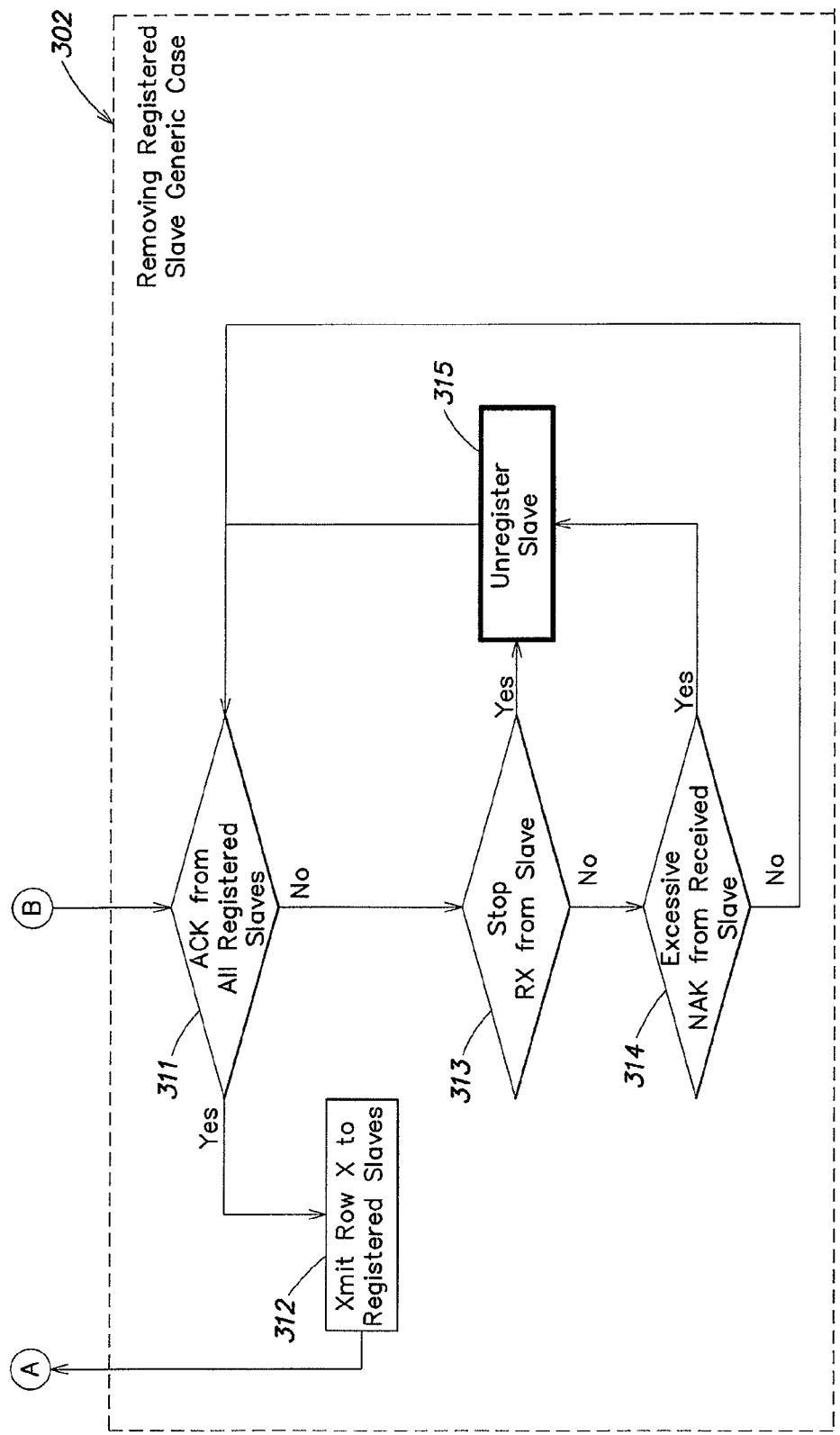

FIGS. 3A-3B show a process 300 for registering slave devices with the master according to one embodiment of the present invention. For instance, process 300 shown in FIG. 3A may be applied to slave devices in a star topology as discussed above with reference to FIG. 1B. Process 300 includes a block 301 shows a process for adding an unregistered slave to the list of slaves communicating with the master device. Block 302 shows a process for removing registered slaves from communication with the master device.

A majority of the time, it is appreciated that the configuration of the slave devices will be in a normal operating mode where data is being passed from master devices to slave devices. Occasionally, slave devices will be added or subtracted from the communication as necessary in order to manage the master device. As shown in FIG. 3A, at block 303, the protocol operates in an idle state until a NAK is received from an unregistered slave device (e.g., as determined at block 304). That is, a NAK message from an unregistered slave is recognized by the master device as a request to be added to the communication with the master device. At block 305, the unregistered slave transmits a row is zero to register slave devices.

At block 306 if an ACK is received from all registered slaves and if a NAK is received from an unregistered slave at block 308, then the master transmits row 0 of the memory map to the registered slaves at block 310 at block 309, the master transmit through acts to the registered slaves. At block 307, if a NAK count is exceeded (or a timeout is experience), then the process starts over from an idle mode. Otherwise, the protocol operates in the normal mode where information is passed to and from the master device from registered slave devices. At block 311 if an ACK is received from all registered slave devices, the master transmits a row X of the memory map to all registered slaves at block 312. If a NAK is received from an unregistered slave, then that NAK is interpreted to be a request for addition to the serial connection by the unregistered slave device. If, for example, an ACK is not received from all registered slave devices, and if at block 313, data is not received from a slave device, then that slave is unregistered at block 315. However, if the slave device still continues to communicate but yet excessive NAK messages are received from the slave device, that slave device will become unregistered.

Figure 3C:
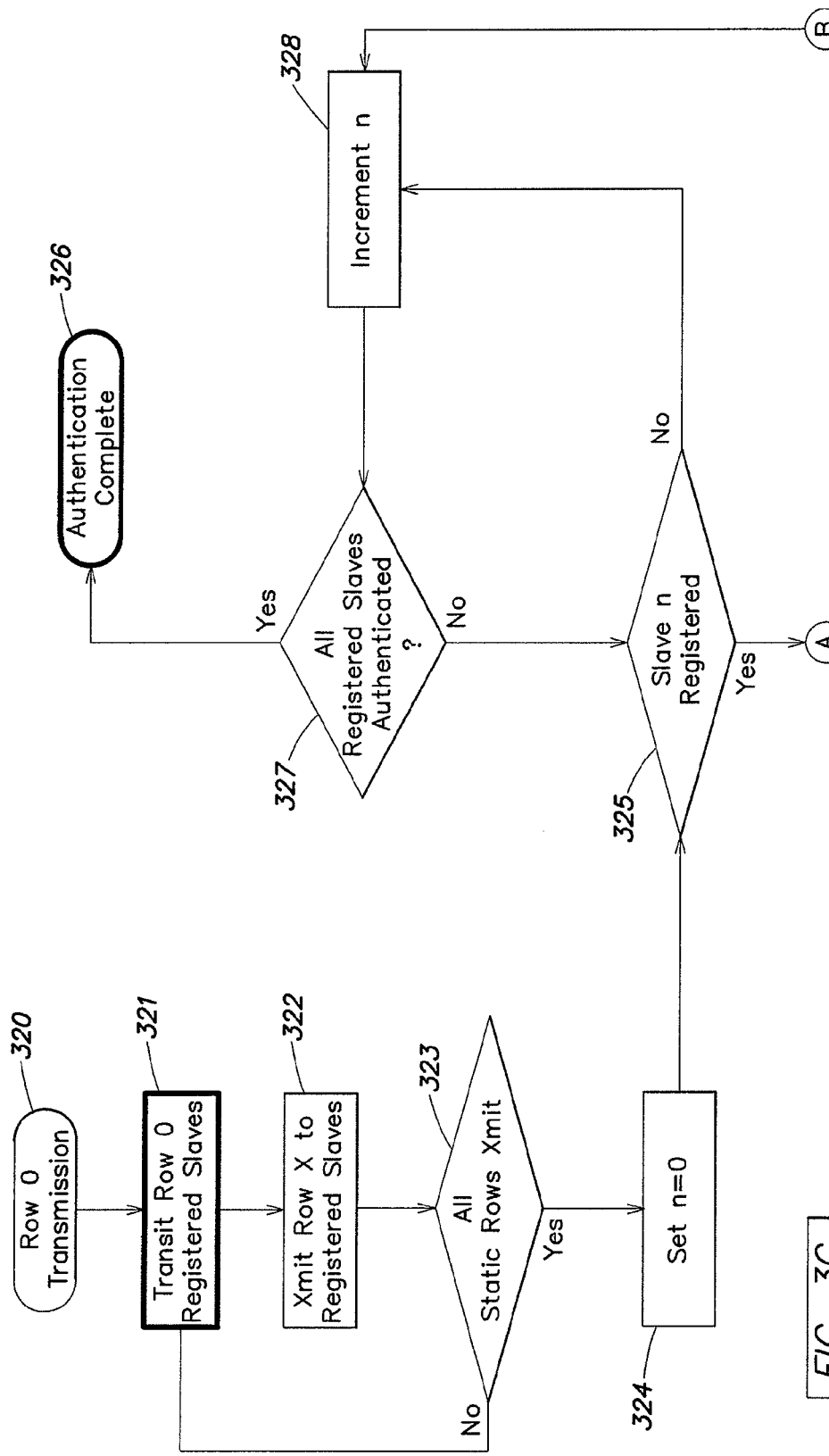
FIGS. 3C-3E shows an authentication method according to one embodiment of the present invention.
Figure 3D:
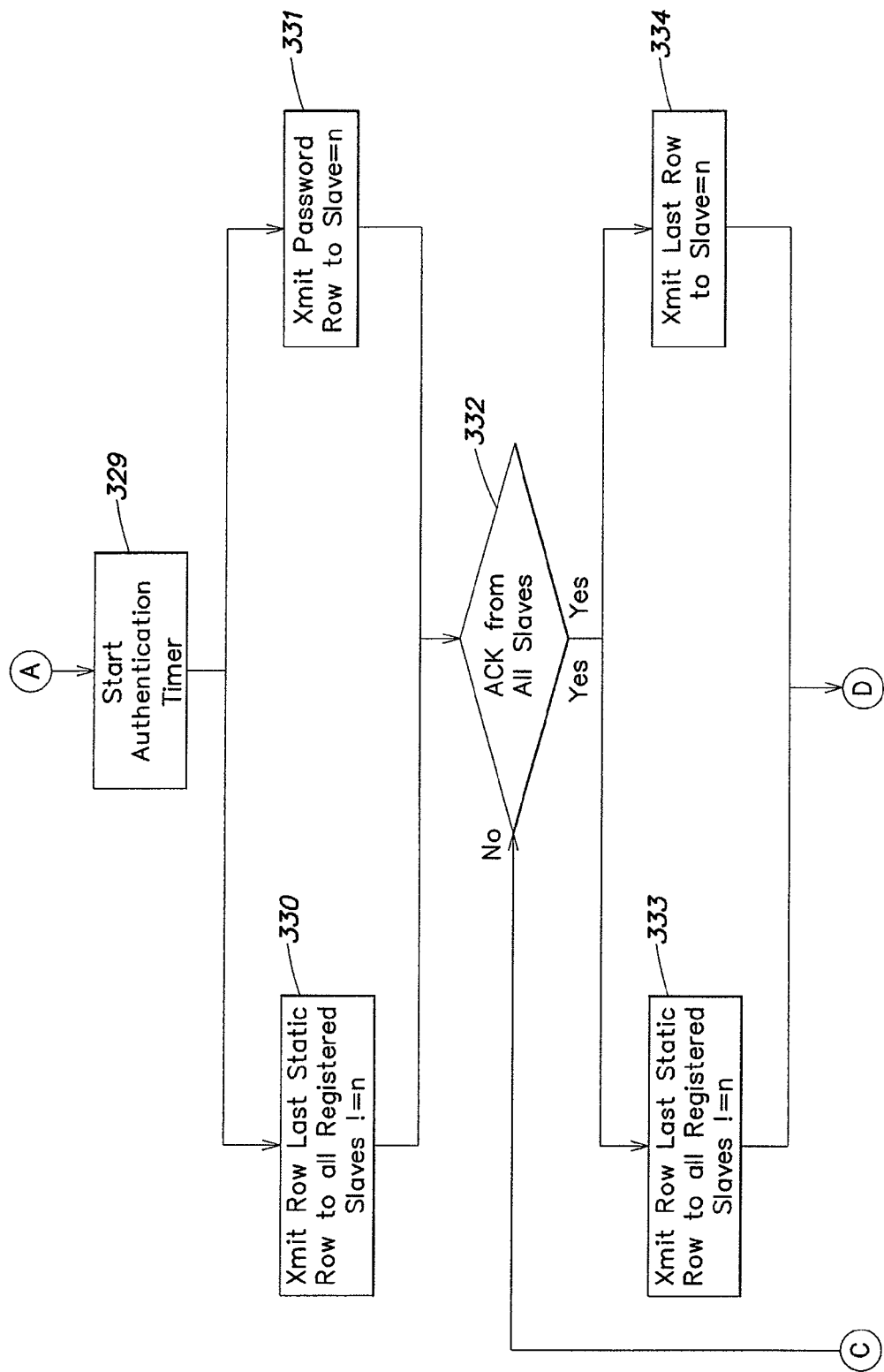
Figure 3E:
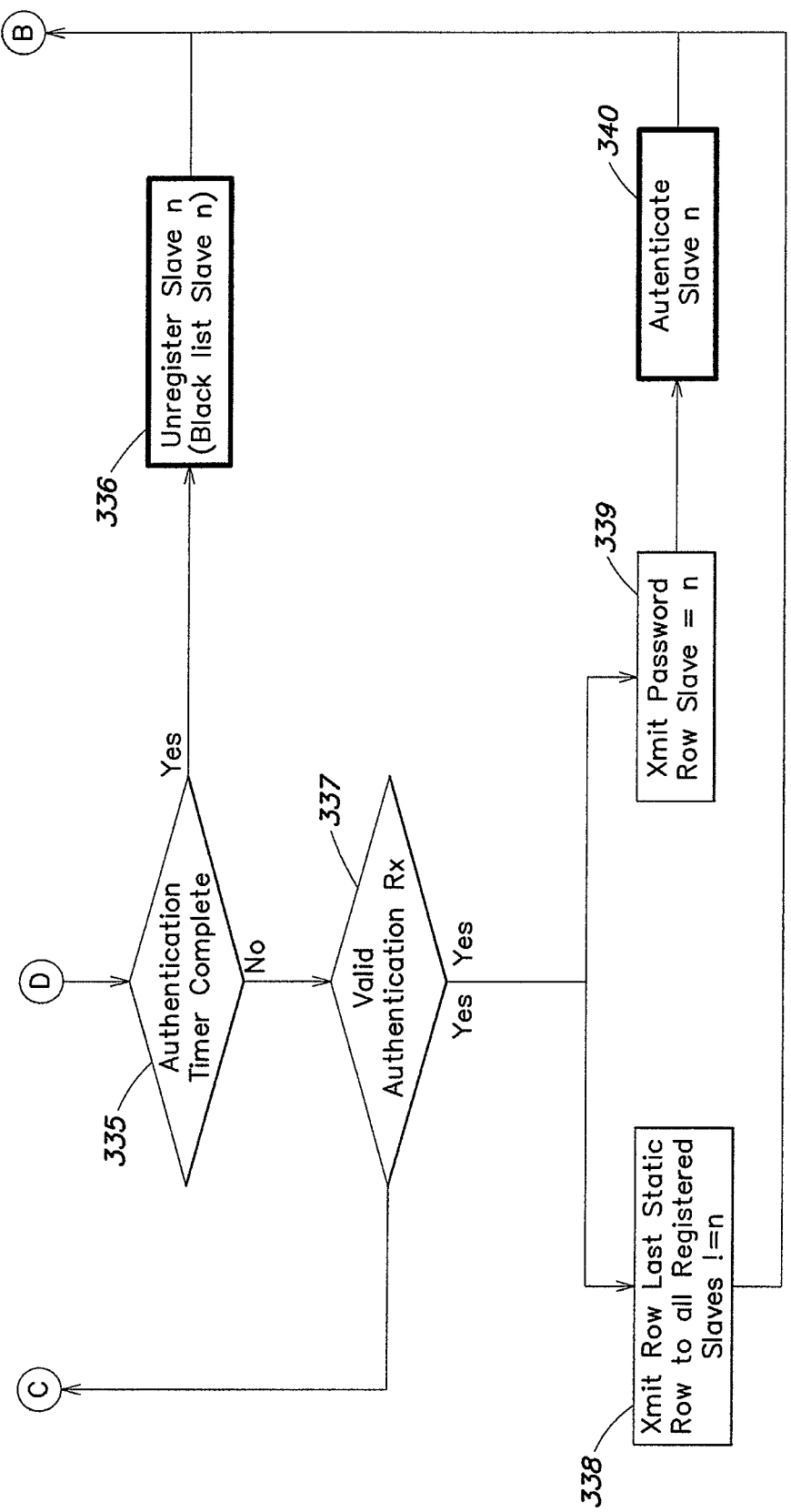

FIGS. 3C-3E show a process for authenticating slave devices according to one embodiment of the present invention. At block 320, the master device transmits row 0 of the memory map to all registered slave devices. In one instance, the information in row 0 may be static data discussed below that may be communicated by the master device without the need for authentication as further discussed below.

According to one embodiment, the master device may store a record of registered slave devices (e.g., ones that the master has previously communicated) in a memory (e.g., a register, memory map, etc.) of the master device. The master may proceed to transmit all of the rows of static data (e.g., in blocks 321, 322) to all registered slave devices. If, at block 323, it is determined that all static rows have been transmitted from the master, then n (the number of registered slave devices) is set to 0 at block 324.

At block 325, it is determined for a location n whether there is a slave device registered. If not (e.g., there is not a registered slave device at location n), then n is incremented at block 328. At block 327, it is determined whether all registered slave devices are authenticated. If so, authentication is complete at block 326, and normal communication mode occurs. If not, it is determined whether there remain any unauthenticated slaves, and these an attempt is made to authenticate them.

At block 329, an authentication timer is started, and according to one embodiment, there may be a fixed amount of time permitted for slave devices to authenticate to the master device. At block 330, the last static row is transmitted to all registered slaves. In addition, a password row is transmitted to the slave device being authenticated (slave device n) at block 331. If, at block 332, it is determined that an acknowledgement message is received from all slave devices (e.g., the slave device being authenticated acknowledging the receipt of the password row, and the remaining slave devices acknowledging the last row of static information). If so, the last static row is transmitted again to all registered slave devices at block 333. At block 334, a last row is transmitted to the slave device being authenticated.

At block 335, it is determined whether the authentication time has expired. If so, the slave device being authenticated (slave device n) is unregistered from the master device at block 336, as the authentication has timed out. If the authentication has not timed out, and a valid authentication is received at block 337, then the last static row is again sent to all slave devices (at block 338), and the last password row is sent to slave device n. At block 340, slave device n is placed in an authenticated state. The integer n is incremented at block 328, and it is determined whether there are any additional devices to authenticate at block 327. If so, the same authentication process may occur with a different registered but unauthenticated device (e.g., slave device n+1). This process may continue until all registered slave devices are authenticated.

In a serial chain configuration, slave devices may register themselves with a master device in a similar way as discussed above with respect to the star configuration. However, the authentication process may include authenticating each slave device one-by-one, beginning with the slave device closest to the master device, working away from the master device downstream along the serial chain. In such a configuration, each slave device authenticates one by one along the chain, with any intermediate slave devices operating in a pass-through mode. That is, the intermediate slave devices, once authenticated, repeat authentication information either upstream or downstream, as appropriate, when received from the opposite direction. The authentication process ends when the last slave device farthest from the master device is authenticated.

Example Serial Link Protocol

FIGS. 4-22B (discussed further below) show an example serial link protocol that may be used to communicate information according to various aspects of the present invention, either alone or in various combination with the aspects for communicating information between master and slave devices as discussed above with reference to FIGS. 1A-3B.

Figure 4:
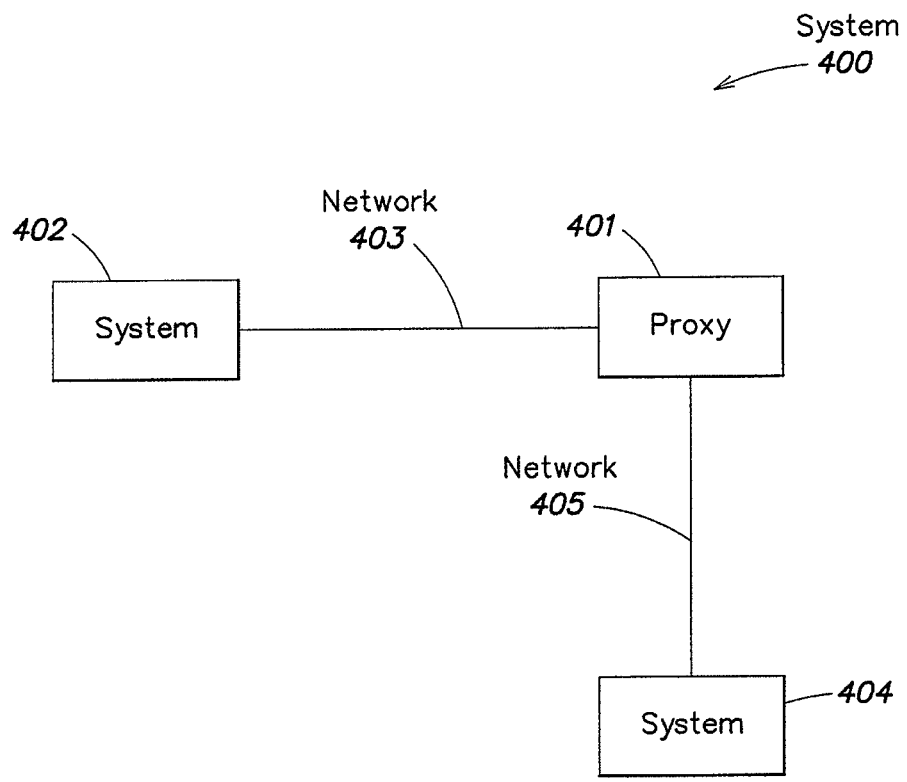
FIG. 4 is a block diagram of an example network system in which various aspects of the present invention may be practiced.

FIG. 4 is a block diagram of an example network system in which various aspects of the present invention may be practiced. In particular, system 400 includes one or more systems connected by one or more networks. In the example shown, system 402 is coupled to a proxy system 401 over network 403. According to one aspect of the present invention, proxy system 401 has a capability for communicating to system 402 using a communication protocol. Communication with system 402 may be useful, for example, for monitoring or managing system 402 by system 404. In an alternative configuration (not shown), system 402 may be coupled directly to another system (e.g., system 404), and various aspects of the communication protocol described herein may be used to communicate between them. A proxy system may be used, for example, to communicate with other types of systems that do not function as native slave devices.

Further, according to another aspect of the present invention, a proxy system 401 is provided that translates requests from one or more systems (e.g., system 404) to requests that may be recognized by system 402. These requests may be, for example, messages generated by an application program executing on system 404. One example application program that may generate such requests is a management program that is provided for managing one or more systems (e.g., system 402). These requests may include control data used to control and configure system 402, requests for performance and/or status information from system 402, among others. To this end, proxy 401 may be capable of translating received management requests to messages that are capable of being processed by system 402. Although proxy 401 may be capable of communicating management data, it should be appreciated that proxy 401 may be capable of translating any type of request having any type of data.

It should be appreciated that proxy system 401 is capable of being coupled to more than one system. In one example, proxy system 401 is coupled to two or more networks (e.g., network 403 and network 405). To this end, proxy 401 may have more than one link or other network interface. Proxy 401 may also be capable of communicating using one or more communication protocols. According to one aspect of the present invention, a proxy may be capable of learning new protocols from a system to which the proxy system is coupled. A specific example of a proxy and its capabilities are discussed below with reference to FIG. 21.

System 400 is merely an illustrative embodiment of a communication system that may implement one or more aspects of a communication protocol according to various embodiments of the invention. Such an illustrative embodiment is not intended to limit the scope of the invention, as any of numerous other implementations of the system (e.g., variations of 400 having more or less systems) are possible and are intended to fall within the scope of the invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. In one specific embodiment, various aspects of a communication protocol are provided that may be used by computer systems such as controllers. Such controllers may be embedded in one or more systems, such as, for example, an Uninterruptible Power Supply (UPS) or one of its components. However, it should be appreciated that one or more of any type computer system may be used to communicate according to various embodiments of the invention. It should also be appreciated that different types of systems (e.g., a PC, a controller, etc.) may communicate with each other using various aspects of the present invention.

A general-purpose computer system according to one embodiment of the invention is configured to perform any of the described communication functions including but not limited to communicating between computer systems and/or relaying data to other systems (e.g., to system 506). It should be appreciated that the system may perform other functions, and the invention is not limited to having any particular function or set of functions. Various entities such as, for example, systems 402, 404 and proxy 401 may be general-purpose computer systems that implement various communication functions according to various embodiments of the present invention.

Figure 5:
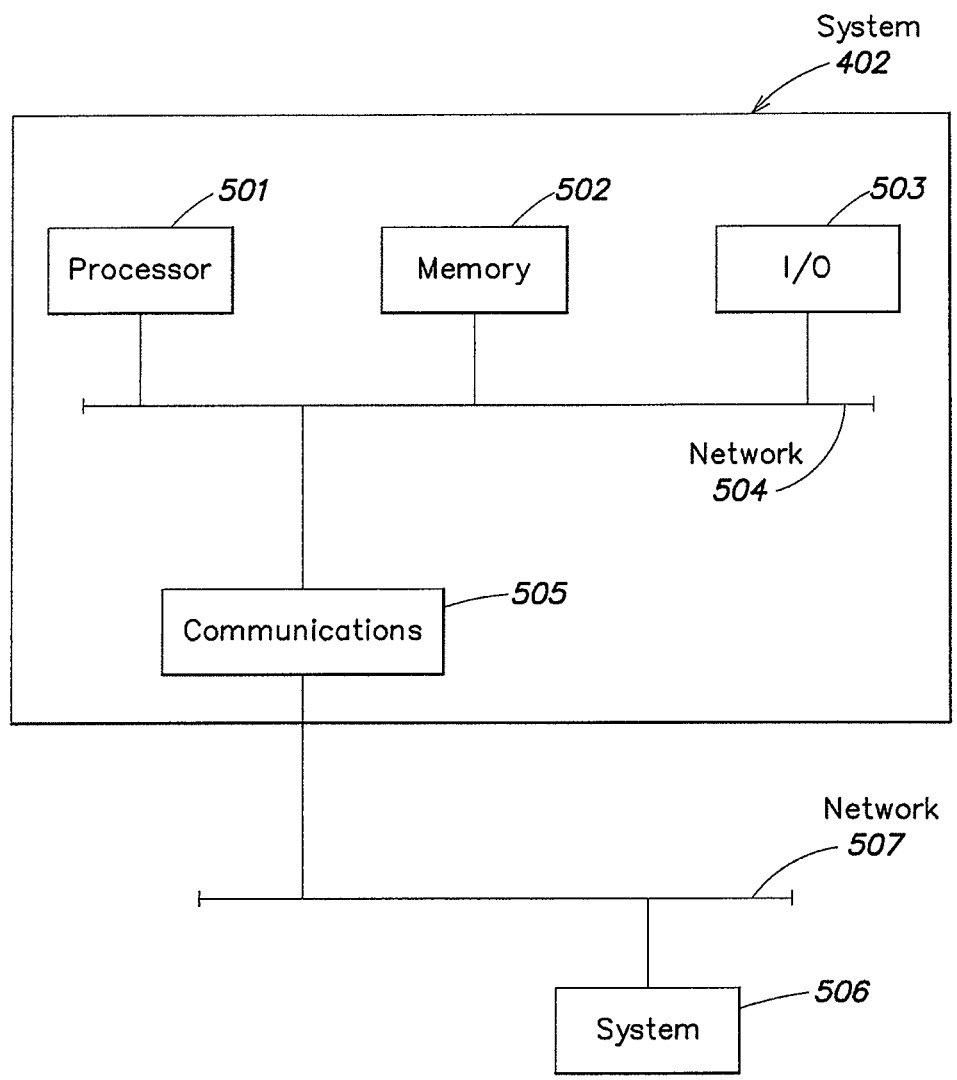
FIG. 5 is a block diagram of a communication system according to one embodiment of the present invention.

For example, various aspects of the invention may be implemented as specialized software executing in a general-purpose computer system such as that shown in FIG. 5. The computer system 402 may include a processor 501 connected to one or more memory devices 502, such as a disk drive, memory, or other device for storing data. Memory 502 is typically used for storing programs and data during operation of the computer system 402. Components of computer system 402 may be coupled by an interconnection mechanism (e.g., network 504), which may include one or more busses (e.g., between components that are integrated within a same machine) and/or a network (e.g., between components that reside on separate discrete machines).

The interconnection mechanism 504 enables communications (e.g., data, instructions) to be exchanged between system components of system 402. System 402 also includes one or more I/O devices 503 (e.g., ports, devices, systems, etc.) for inputting and outputting data. In addition, system 402 may contain one or more interfaces 505 that connect computer system 402 to a communication network 507. System 402 may be capable of learning one or more protocols used to communicate by one or more systems (e.g., system 506).

According to one embodiment of the invention, interface 505 may be a serial-type interface that is used to communicate to an attached device. The interface may be capable of communicating using various aspects of the present invention. Such an interface 505 may use one or more serial-type transport layer protocols including, but not limited to, TTL serial, RS-232, RS-422, RS-485, I2C, CAN, Bluetooth, ZigBee or any other transport layer capable of moving packets between systems.

System 402 typically includes a storage mechanism as a part of memory 502 or other storage that includes computer readable and writeable nonvolatile (non-transitory) recording medium in which signals are stored that define a program to be executed by the processor or information stored on or in the medium to be processed by the program. The medium may, for example, be a disk, flash memory, EEPROM, RAM, or the like. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). This memory may be located in a storage system, or in memory system 502.

The processor 501 generally manipulates the data within the memory and then copies the data to the medium after processing is completed. A variety of mechanisms are known for managing data movement between the medium and the memory elements, and the invention is not limited thereto. It should be appreciated that the invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 402 is shown by way of example as one type of computer system upon which various aspects of the invention may be practiced, it should be appreciated that aspects of the invention are not limited to being implemented on the computer system as shown in FIG. 5. Various aspects of the invention may be practiced on one or more computers having a different architecture or components that that shown in FIG. 5.

System 402 may be a general-purpose computer system that is programmable using a high-level computer programming language. System 402 may be also implemented using specially programmed, special purpose hardware. In computer system 402, processor 501 is typically a commercially available processor such as the well-known Pentium class processor available from the Intel Corporation. Many other processors are available. Such a processor usually executes an operating system which may be, for example, the Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented as programmed or non-programmed elements, or any combination thereof.

Figure 6:
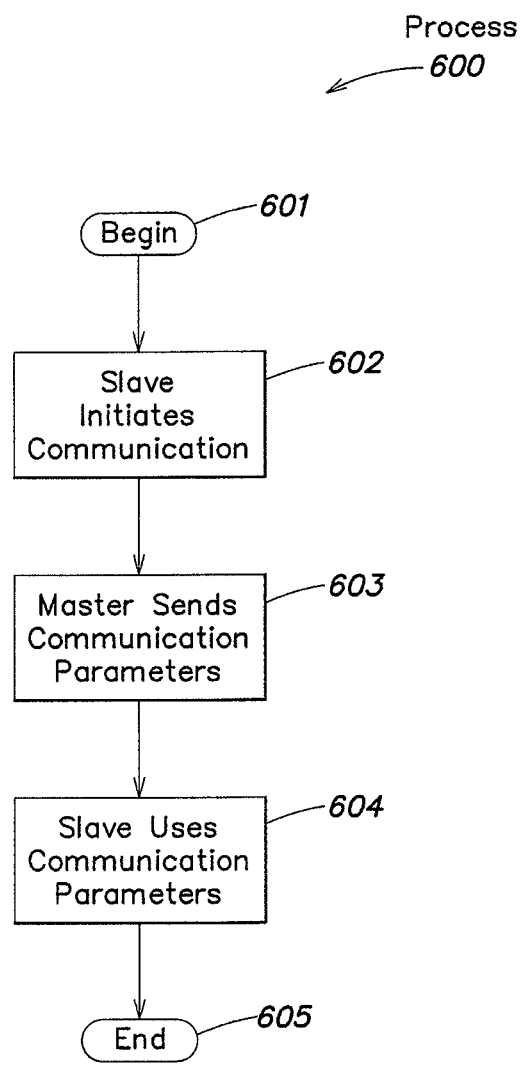
FIG. 6 shows a process for establishing communication between two entities according to one embodiment of the present invention.

FIG. 6 shows a process for establishing a communication according to one embodiment of the present invention. At block 601, process 600 begins. At block 602, a slave system initiates communication with a master system. In one embodiment, the slave system is a management system that is adapted to manage one or more master systems. In one aspect of the present invention, the slave system determines the protocol by which the slave, and optionally, other entities through the slave system, communicate with the master system.

Also, as discussed above, the slave system may initiate communication between the master and slave systems, for instance, by sending a sequence of messages that, when received by the master system, cause the master system to send communication parameters to the slave (e.g., at block 603). At block 604, the slave uses the communication parameters to communicate with the master system. Such communication parameters may, for instance, indicate the version of the protocol used, the length of messages used to communicate, a memory and/or data structure layout, or other communication information.

Figure 7:
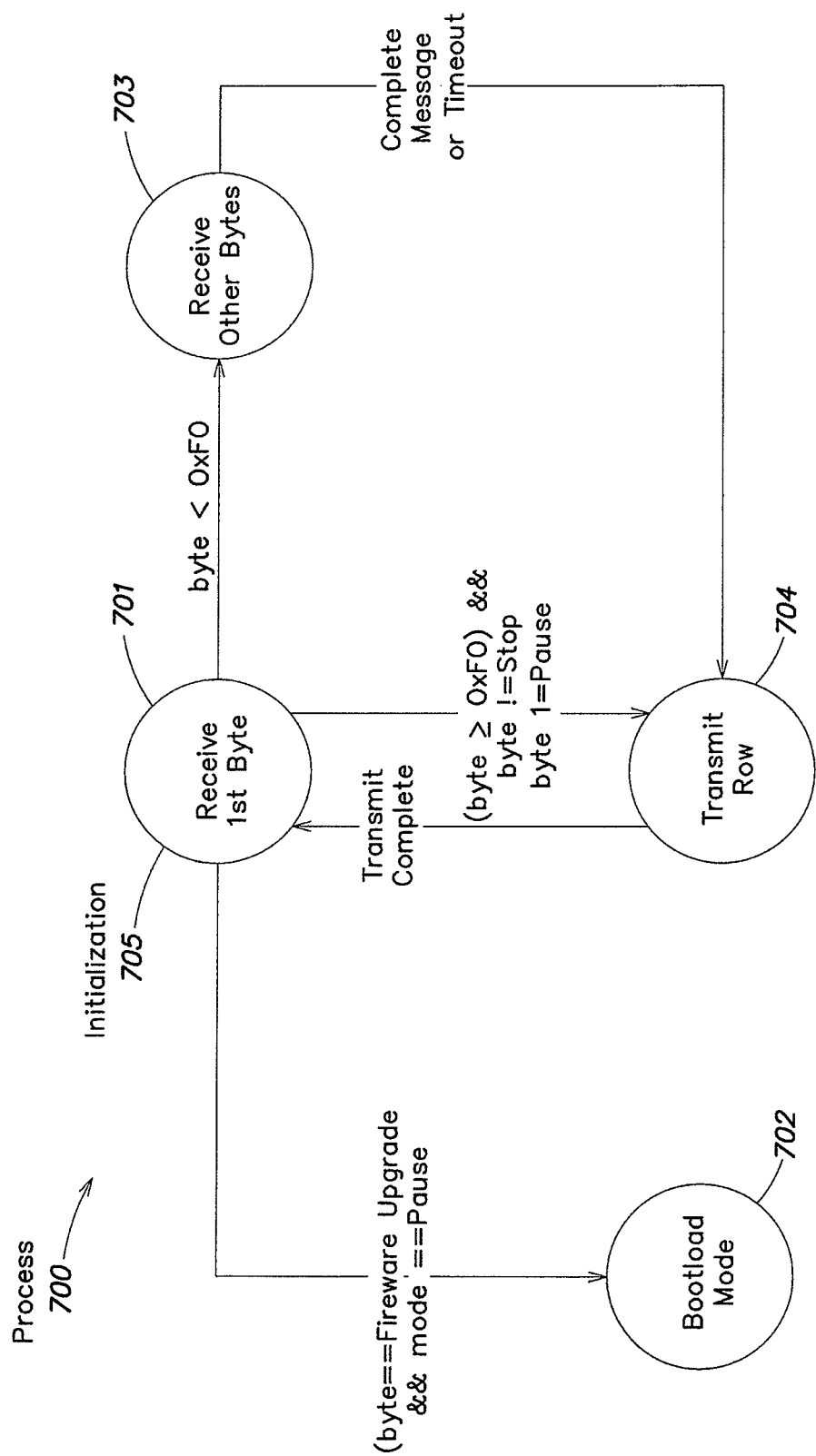
FIG. 7 is a state diagram of a master communication according to one embodiment of the present invention.

FIG. 7 shows a process 700 performed by a master system according to one embodiment of the present invention. Specifically, FIG. 7 shows a state diagram of a communication process performed by a master system. In one example, the master includes an engine that runs a communication protocol having four states. This state diagram may be, for example, performed by a processor of a UPS or a UPS component as discussed above. In a specific example, the state diagram shown in FIG. 7 is implemented in a UPS device, and is programmed in a programming language in firmware to execute a communication protocol according to one embodiment of the invention.

The communication protocol includes four basic states (states 701-704) and one flag that indicates that communications are active (e.g., a COM_VALID flag). Upon initialization 705 of the master, the master initializes the communications active flag. The four basic states include a first state 701 which includes waiting to receive a first character (e.g., a first byte) of a message from the slave. If the first character is a single-byte message, then the master processes the single byte message by transmitting the appropriate row to the salve. In a second state 703, the master receives the remainder of a message from the slave (e.g., receives other bytes associated with the message). At state 704, the master transmits any row information to the slave in response to the information received from the slave.

As discussed, according to one embodiment, a communication protocol may be implemented that includes one or more timeout mechanisms. According to one embodiment, a dual timeout may be used between a master and a slave. In one embodiment, the timeout mechanism provides a method for detecting communication problems on a communicating network (e.g., a data bus) and defines a standard recovery process. In one example, a maximum time is set between bytes (e.g., a byte timeout) in a message. For example, this timeout may be approximately 25 milliseconds ("ms") but this timeout period may be adjusted to other values. In one example, once a message packet has started sending subsequent bytes in a message, the message must be transmitted at a rate greater than this timeout to ensure that the data is received. If bytes are not received in a message at this rate, the packet is discarded and a negative acknowledgement (NAK) is sent to the slave. Further, a recipient of a packet may have another timeout that measures the time by which a message response may be received. If a response to a message does not occur within a defined timeout period (e.g., 250 milliseconds) the device considers the transmission a failure and acts accordingly.

Figure 8:
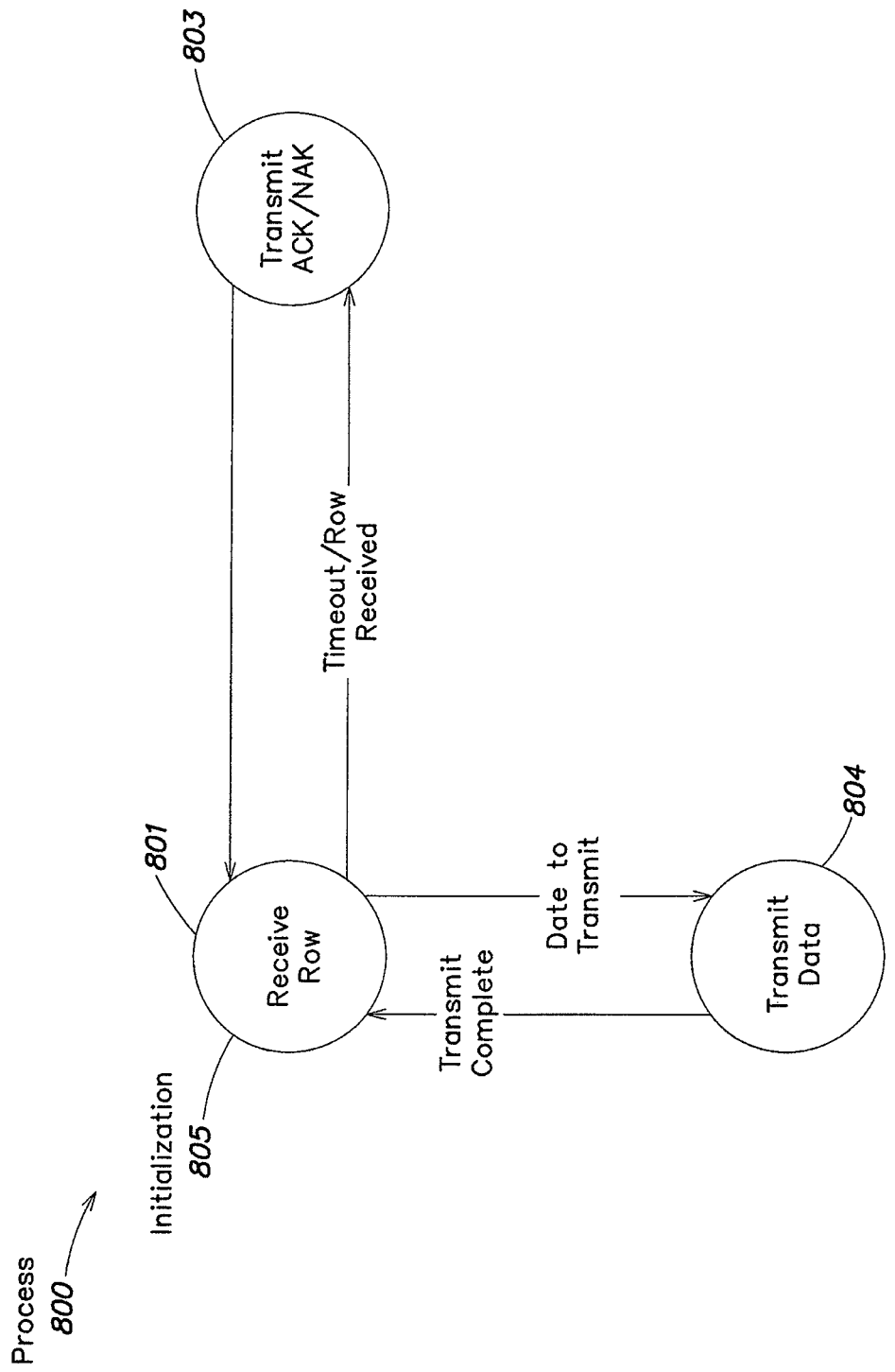
FIG. 8 is a state diagram of a slave communication according to one embodiment of the present invention.

FIG. 8 shows an example process 800 for performing communication by a slave system according to one embodiment of the present invention. In particular, FIG. 8 shows a state diagram that may be executed by a slave system in association with communicating with a master as discussed above with reference to FIG. 7. In particular, the state diagram may include four states (states 801-804) at which the slave system may be during any point in communication with the master. Such a state diagram may be performed, for example, in software, hardware, or both within a slave system.

Upon initialization 805, a slave enters a receive state where the slave is capable of receiving a row of data from a master device. The slave system may also be in an acknowledgement mode 803 wherein the slave system transmits acknowledgement (ACK) messages or negative acknowledgement (NAK) messages as appropriate depending on whether information was properly received from the master system. As discussed in the example above, if a particular message is not received within a predetermined timeout period, the slave may send a negative acknowledgement to the master system, prompting the master system to resend the message.

At state 804, the slave system may transmit any data as necessary to the master system. Such transmitted data may include, for example, write commands that perform the writing of information to memory locations of the master system, read requests for reading information from appropriate memory locations, or any other reading or writing operations.

Figure 9A:
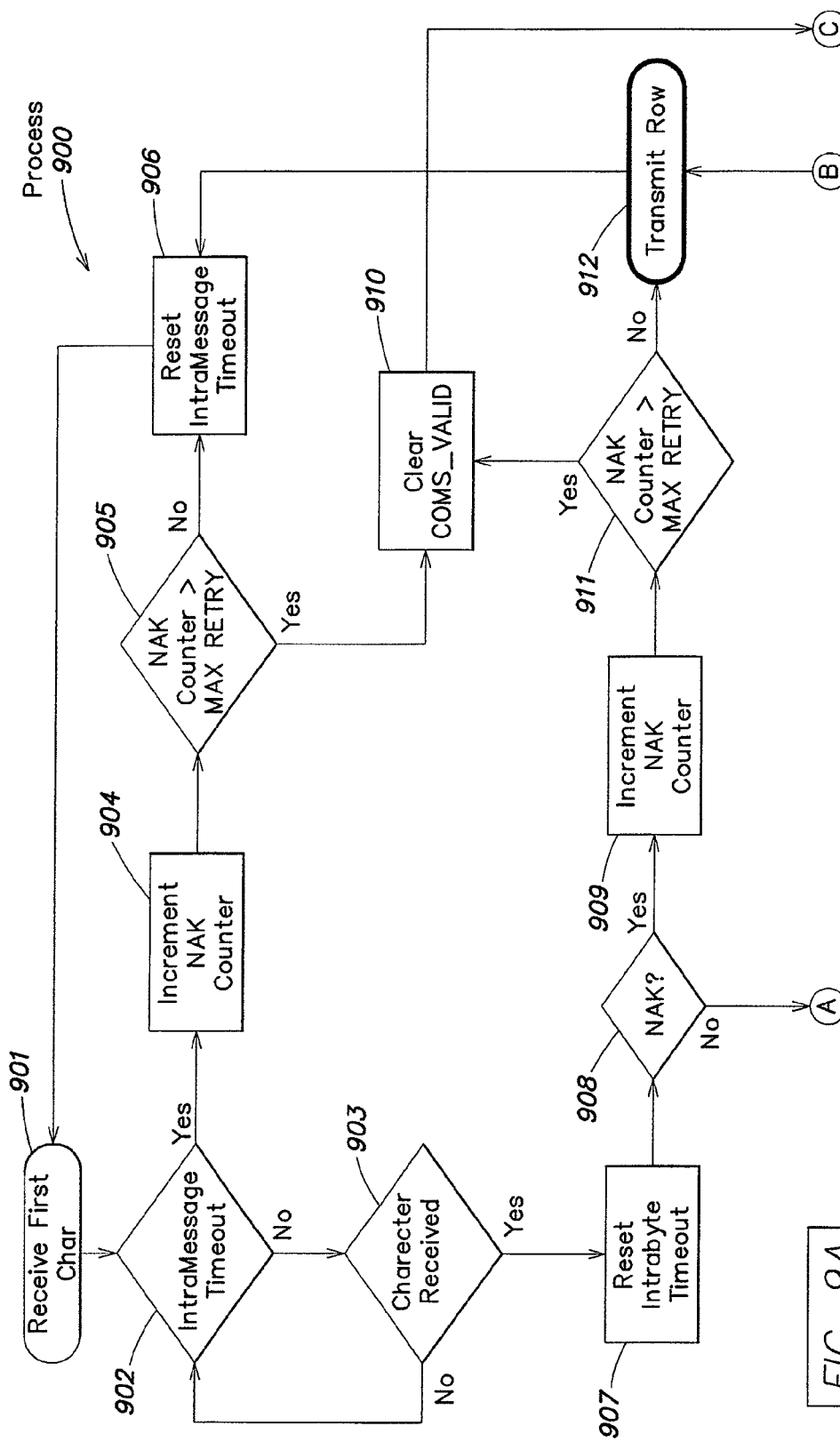
FIGS. 9A-9B show a flow chart of a communication process according to one embodiment of the present invention.
Figure 9B:
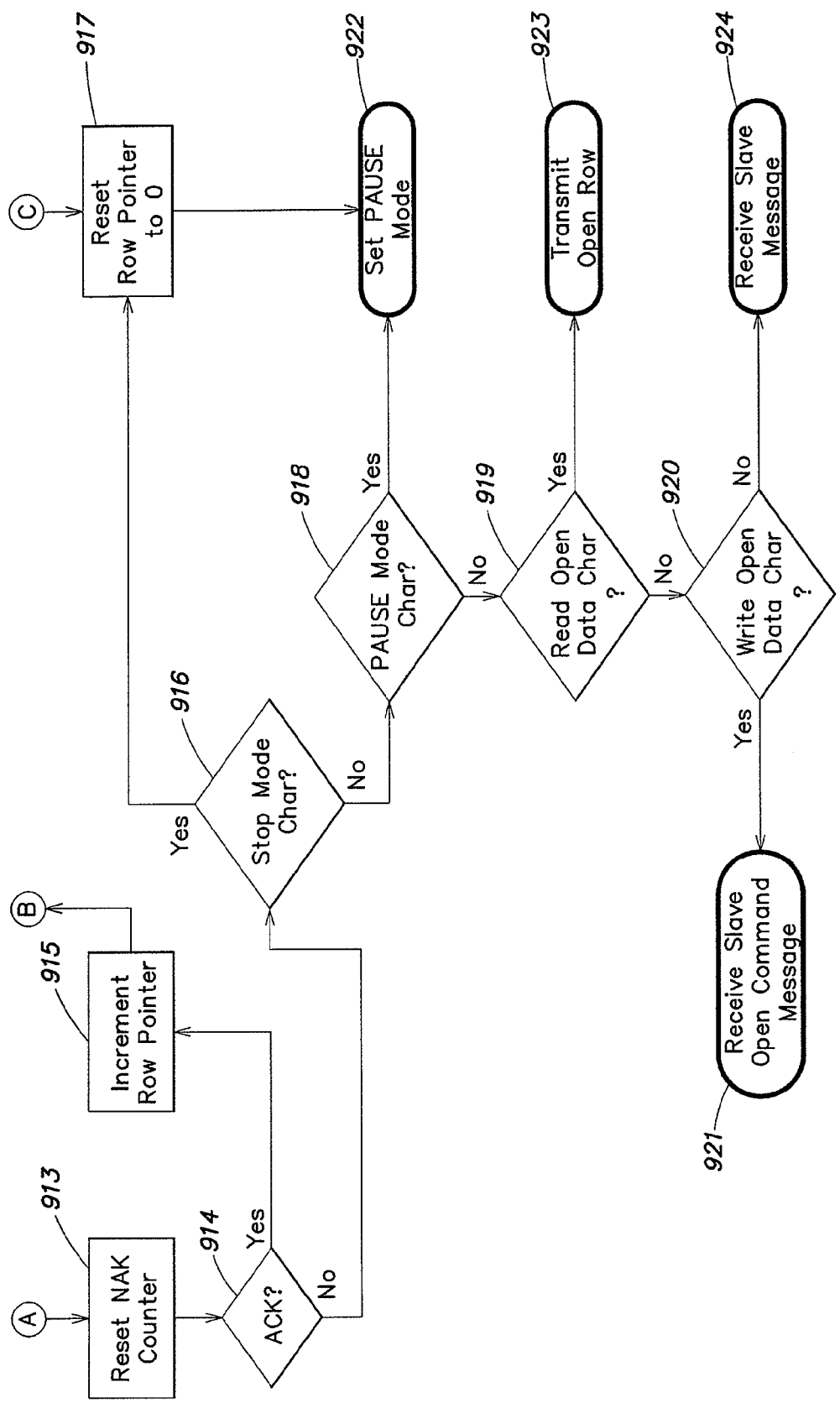

FIGS. 9A-9B show an example flow chart of a process 900 that occurs during the received first character state 701 as described above with reference to FIG. 7. At block 901, the master receives a first character from a slave system. At block 902, an intramessage timeout timer is started to track the time over which the message may be sent. If the message is not sent within an intramessage timeout value, a negative acknowledgement is sent at block 904, and a NAK counter is incremented. If, at block 905 it is determined that the value of the NAK counter exceeds the maximum number of retries permitted to send a message, a communication valid (communication active) flag is cleared at block 910. If the NAK counter is not exceeded, the message was received and the intramessage timeout is reset at block 906, and the master is ready to receive the first character of another message.

As discussed, there may be two levels of timeouts that may be used, one for messages and one for receiving consecutive bytes within a message. At block 903, if a character is received, an intrabyte timeout is reset at block 907. If, at block 908, a negative acknowledgement (NAK) is received, a negative acknowledgement counter is incremented at block 909. If, at block 911, the NAK counter exceeds a maximum number of retries for sending a consecutive byte, then an active communication flag is reset at block 910. If not, the byte has been successfully transmitted and the timers are reset for receipt of another byte and/or message.

If, at block 908, a NAK is not received, the NAK counter is reset at block 913. At block 914, it is determined whether an acknowledgement is received from the slave system. If yes, the master prepares to send an additional row, and a row pointer is incremented at block 915. At block 912, the master transmits a row to the slave. If an acknowledgement is not received at block 914, it is determined whether the master has received a stop character at block 916. If so, the master resets the row pointer to zero at block 917 and enters the pause mode at block 922.

If a stop mode character is not received at block 916, it is determined whether a pause mode character has been received by the master at block 918. If so, the master enters the pause mode at block 922. If not, the master determines whether a read open data character has been received at block 919. If so, the master transmits an open row to the slave at block 923. If not, the master determines whether a write open data character has been received from the slave at block 920. If so, the master receives a slave open command message at block 921. If not, the master receives a slave message at block 924.

Figure 10A:
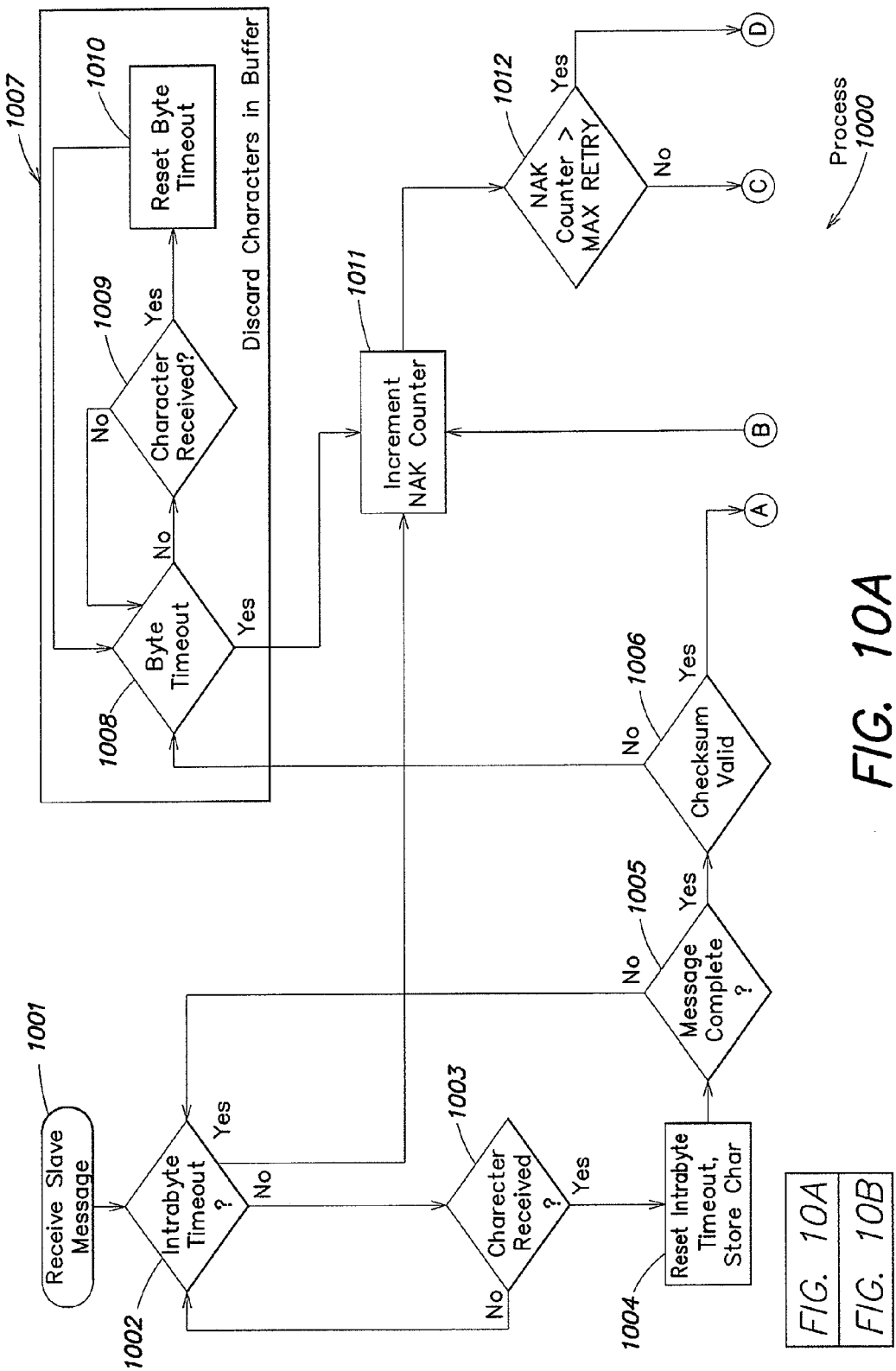
FIGS. 10A-10B show a flow chart of a communication process according to one embodiment of the present invention.
Figure 10B:
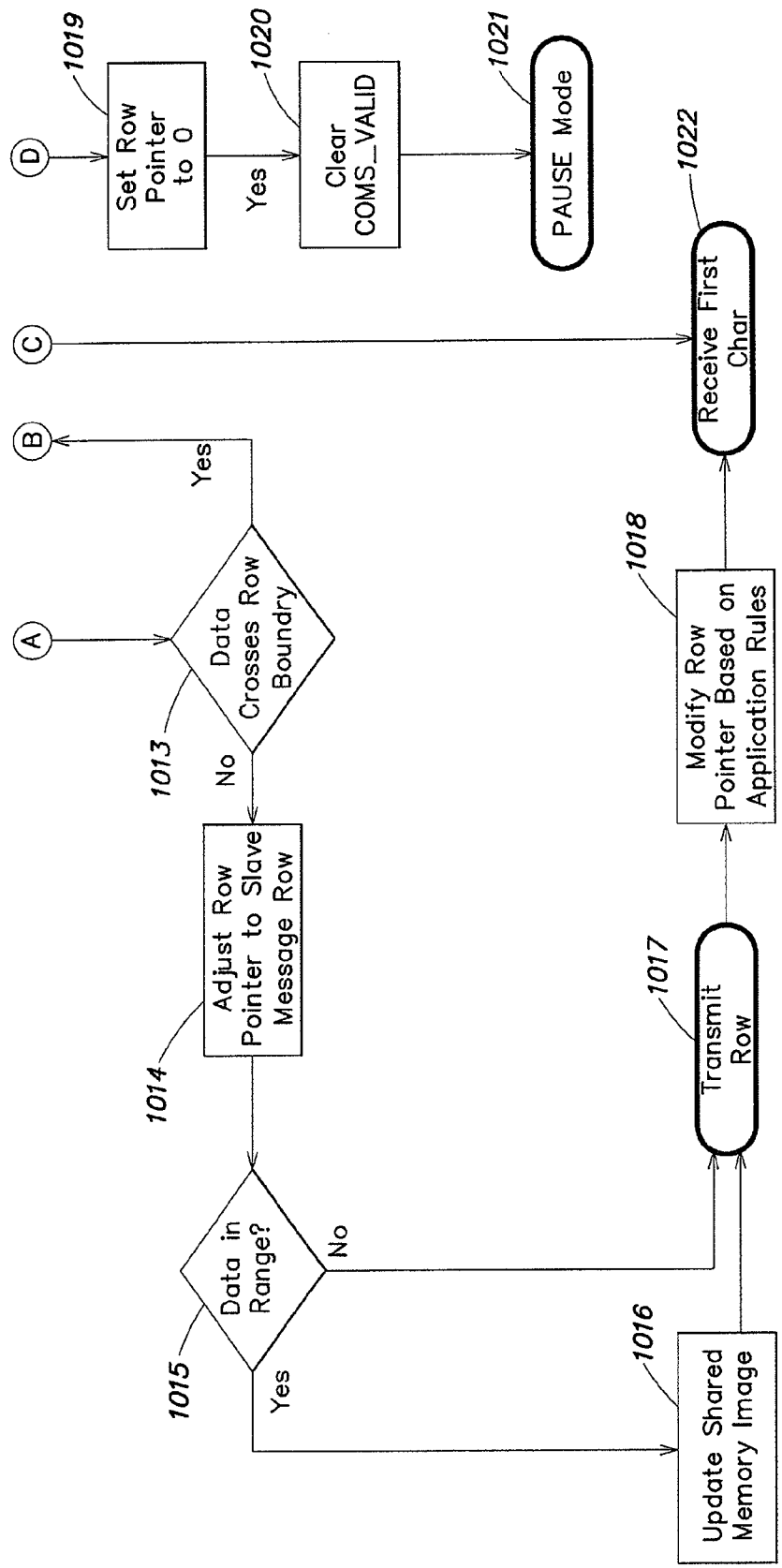

FIGS. 10A-10B show a process 1000 that may be performed by a master while in a receive message state. At block 1001, a master system receives a slave message. At block 1002, it is determined whether an intrabyte timeout has been exceeded. If so, a NAK counter is incremented at block 1011. If, at block 1012, it is determined that the NAK counter exceeds a maximum number of retries for sending the message, then the row pointer is set to zero at block 1019. Further, an active communication flag is cleared at block 1020, and the master enters the pause mode at block 1021. If, at block 1012 it is determined that the number of NAKs does not exceed the maximum number of retires, the message has been received correctly and the master transitions to a received first character state at block 1022.

If a character is received at block 1003, then the intrabyte timeout is reset at block 1004 and the character is stored in a memory of the master. At block 1005, it is determined whether the message is complete. If so, it is determined whether the message received is valid based on a checksum received in the transmitted message at block 1006. If not, it is determined whether to discard characters in the receive buffer at block 1007. More particularly, at block 1008, it is determined whether a byte timeout has been exceeded. If not, it is determined whether a character is received at block 1009. If so, the byte timeout is reset at block 1010. If a character has not been received, it is determined whether the byte timeout has been exceeded. If so, the NAK counter is incremented at block 1011 as discussed above.

If the checksum is determined valid at block 1006, it is determined whether data crosses a row boundary at block 1013. If so, the received message is invalid and the NAK counter is incremented at block 1011 as discussed above. If data does not cross a row boundary, a row pointer is adjusted to the slave message row at block 1014. At block 1015 it is determined whether the data message received is within the range of memory of the master at block 1015. If so, shared memory image of the master is updated with the appropriate data at block 1016. If not, the master transmits row information 1017 to the slave. Further, the row pointer is modified based on an application rule for sending information to the slave at block 1018. The master then transitions to the receive first character state at block 1022.

It is noted that the transmit row flow operates to output the characters of a row guaranteeing that characters are transmitted faster than the interbyte timeout between successive characters.

Figure 11A:
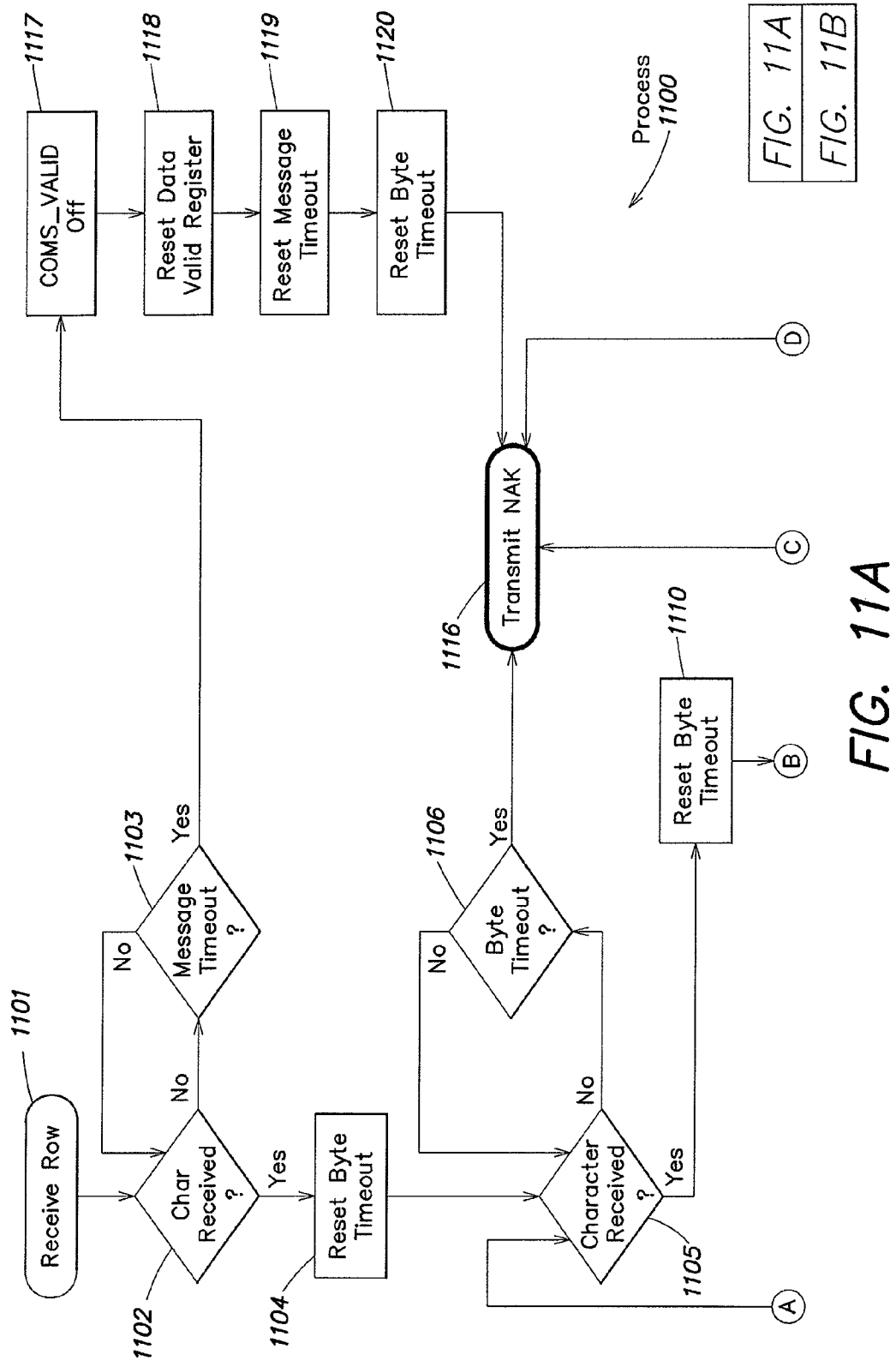
FIGS. 11A-11B show a flow chart of a communication process according to one embodiment of the present invention.
Figure 11B:
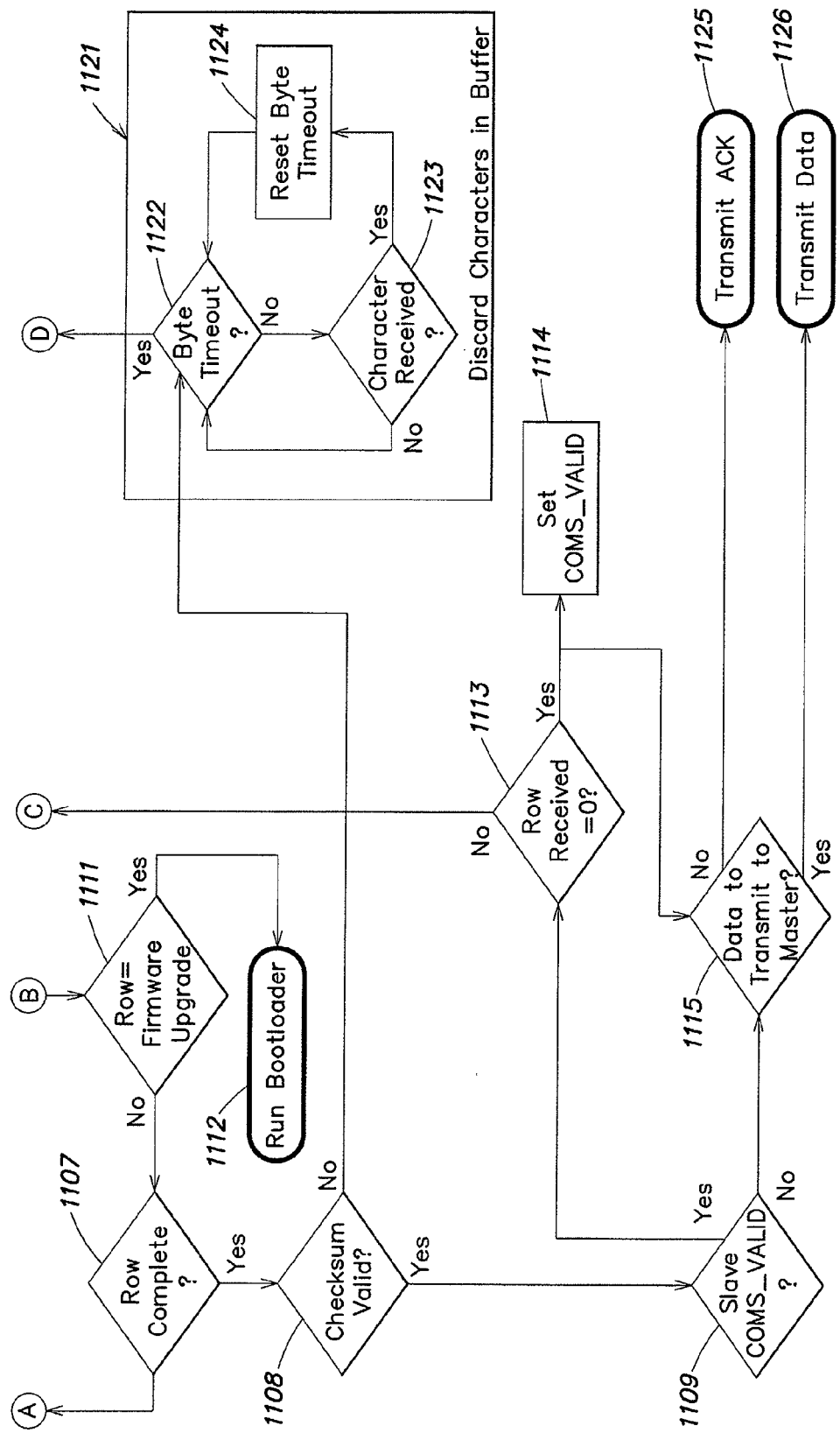

FIGS. 11A-11B show an example process 1100 that may be implemented in a slave system during the receive row state 801 as discussed above with reference to FIG. 8. At block 1101, the slave system enters the receive row state. At block 1102 it is determined whether a character is received at the slave. If not, it is determined at block 1103 whether a message timeout has been exceeded. If not, the slave monitors for characters received from the master. If the character is received, a byte timeout is reset at block 1104. At block 1105 it is determined whether a character has been received. If not, it is determined whether the byte timeout has been exceeded at block 1106. If not, the slave continues to monitor for additional characters received from the master.

If the byte timeout has been exceeded at block 1106, the slave transmits a NAK to the master at block 1116. If a character is received at block 1105, the byte timeout is reset at block 1110, and it is determined at block 1111 whether the row information indicates that the firmware or other software of the master should be upgraded. If so, the slave enters a run boot loader state at block 1112. During this state, the slave may provide one or more files to the master to reprogram itself. If, at block 1111, it is determined that the master does not request to enter the boot load state, it is determined at block 1107 whether the transmitted row is complete. If not, additional characters may be received at block 1105. If the row is complete, it is determined whether the transmitted row is valid given a checksum included in the received message at block 1108. If so, it is determined whether a slave communication flag is set at block 1109. If so, it is determined whether the received row is row zero at block 1113. If so, a communication active flag is set at the slave of block 1114. If, for example, the row received is not row zero, the slave may transmit a negative acknowledgement (NAK) to the master at block 1116.

When the communication active flag is set at block 1114, it is determined whether there is data to transmit to the master at block 1115. If not, the slave merely transmits an acknowledgement to the master that row zero was received successfully at block 1125. If the slave does have data to transmit to the master, the slave does so at block 1126.

If, at block 1108, it is determined that the checksum is not valid, the slave enters a discard mode where characters are discarded in the buffer at block 1121. More specifically, it is determined at block 1122 whether a byte timeout has been exceeded. If not, it is determined whether a successive character has been received at block 1123. If so, a byte timeout is reset at block 1124. If not, the slave continues to wait for characters until the byte timeout is exceeded at block 1122.

If a message timeout is exceeded at block 1103, an active communication flag at the slave is set to off at block 1117. Further, a data valid register is reset at block 1118, and a message timeout and byte timeout are reset at blocks 1119 and 1120, respectively. Also, a negative acknowledgement is transmitted to the master at block 1116.

Figure 12A:
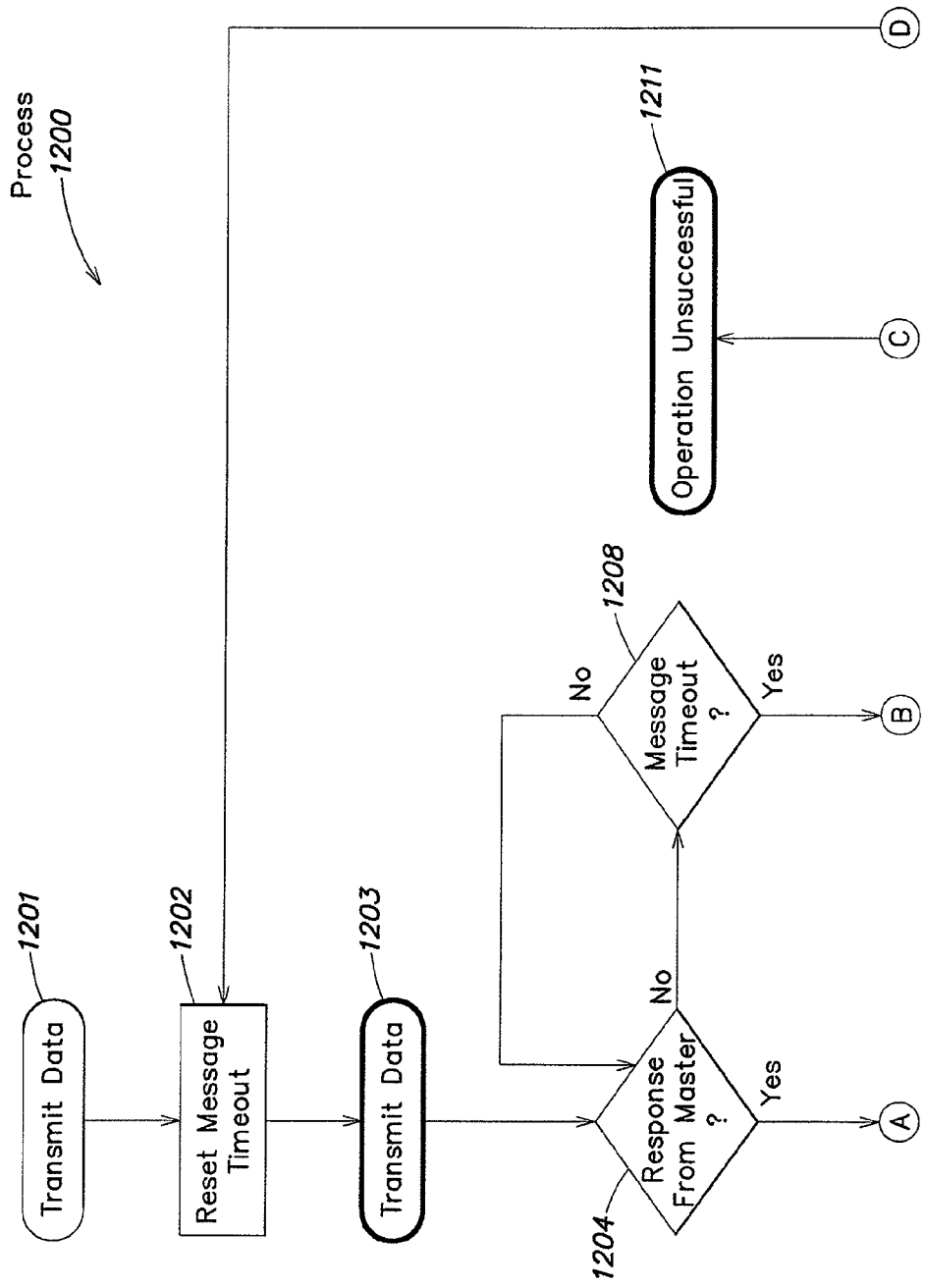
FIGS. 12A-12B show a flow chart of a communication process according to one embodiment of the present invention.
Figure 12B:
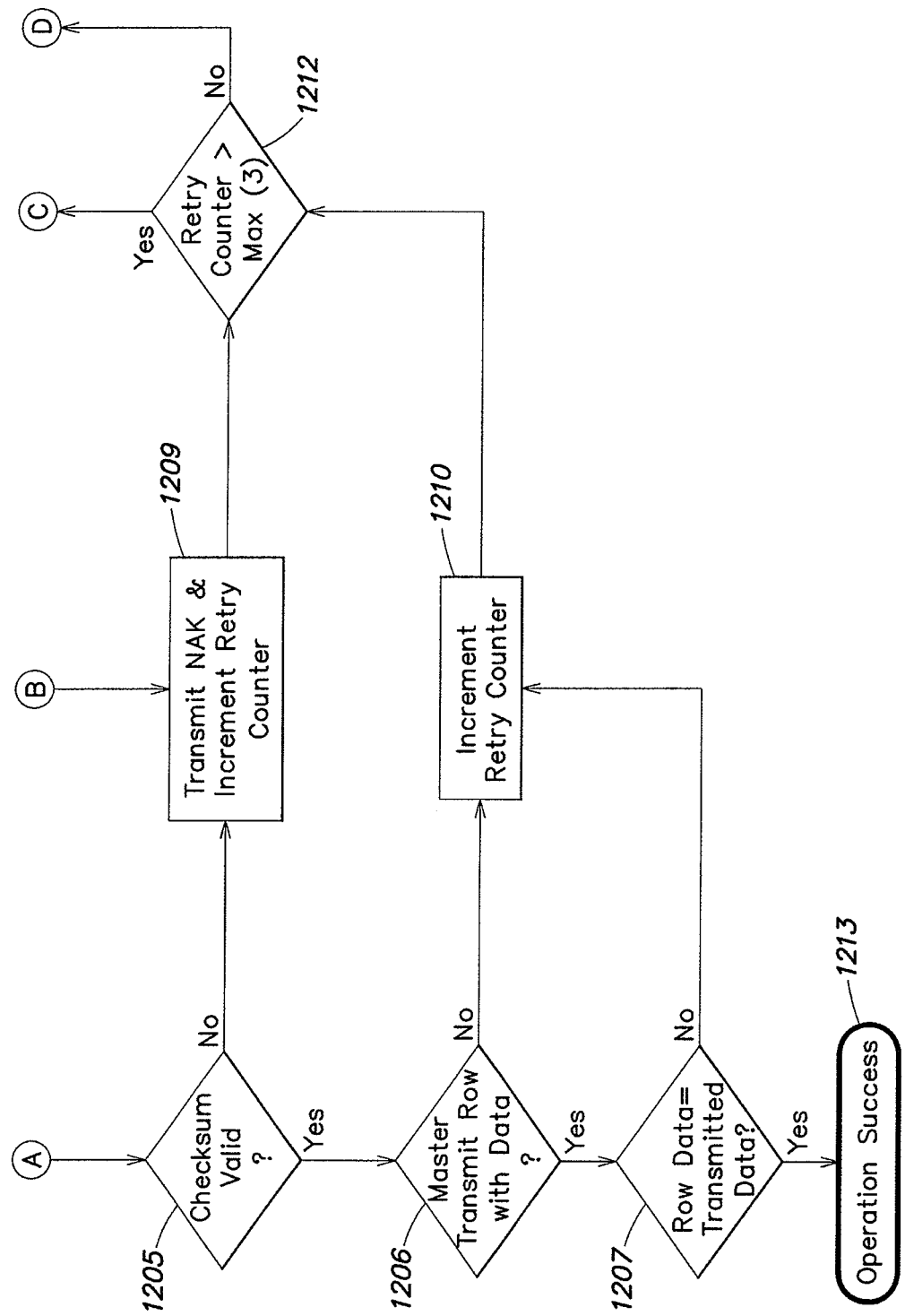

FIGS. 12A-12B show a process 1200 followed by the slave while in a transmit data state 503. At block 1201, the slave enters the transmit data state. At block 1202, a message timeout is reset at the slave. At block 1203, the slave enters the transmit data state and begins to transmit information to the master. At block 1204, it is determined whether a response is received from the master. If not, it is determined whether a message timeout is exceeded at block 1208. If the message timeout has not been exceeded, the slave waits for a response from the master.

If the slave receives a response from the master, it is determined whether the received information is valid. For example, a checksum may be included in the transmitted information and the slave may determine whether the information is valid based on the checksum at block 1205.

If the checksum is valid, it is determined whether the master transmitted a row having data at block 1206. If so, it is determined at block 1207 whether the row data is the same as the transmitted data. If so, the operation is indicated as a success at block 1213.

If the row data does not equal the transmitted data, a retry counter is incremented at block 1210. If, at block 1212, it is determined that the retry counter exceeds a maximum value (e.g., 3) the operation is indicated as being unsuccessful at block 1211. If not, the slave waits for the receipt of another message from the master at block 1202. If, there is a message timeout at block 1208 or the checksum is not valid at block 1205, the slave transmits a NAK to the master and increments its retry counter at block 1209. Again, if the retry counter exceeds a maximum value at 1212 at block 1212, the operation is indicated as being unsuccessful at block 1211.

Messaging

According to one aspect of the present invention, there are three possible messages that may be used to communicate between a slave and a master system. More particularly, there may be a master transmission which is a transmission from a master to a slave, a slave transmission which is a transmission from a slave to a master, and a slave single byte command that is executed at the master.

Figure 13:
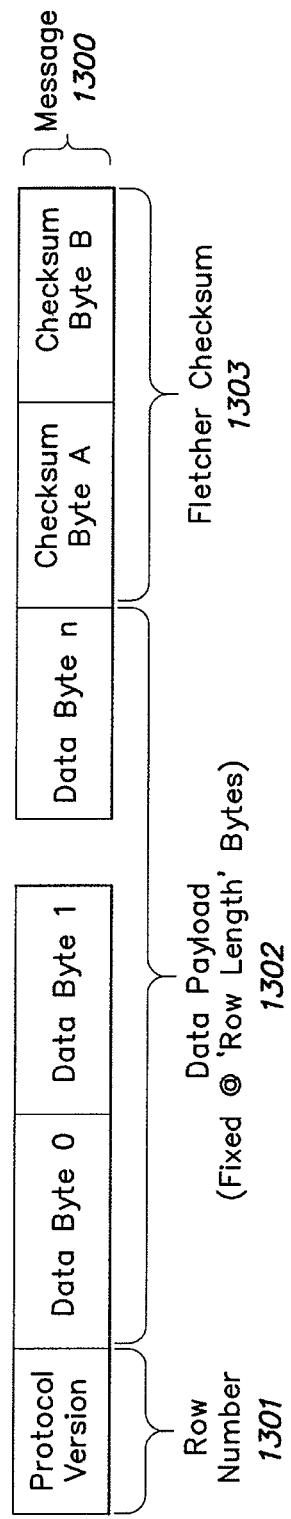
FIG. 13 is a block diagram of a master message format according to one embodiment of the present invention.

FIG. 13 shows one example master format according to one embodiment of the invention. In one example, a master system transmits messages having the same length and format. Message 1300 may include, for example, a row number 1301 that indicates the position of the data being transmitted by the master system. In row 0, the row 1301 may indicate the version of the communication protocol. Message 1300 may also include a data payload 1302 which includes one or more data bytes 0 through n. In one embodiment, the length of each message 1300 sent by the master may be a fixed length. In one example, this fixed length may vary between master implementations. This fixed length may be determined, for example, based on the protocol version 1301 which may be located, for example, in a row 0 data element or by a row length byte located in row 0.

Message 1300 may also include checksum information used to verify the contents of a particular message. In one embodiment, message 1300 includes a Fletcher checksum 1303. A Fletcher checksum is a well-known checksum used for detecting errors as more fully described below. However, it should be appreciated that any other type of checksum may be used to verify the transmitted information.

Figure 14:
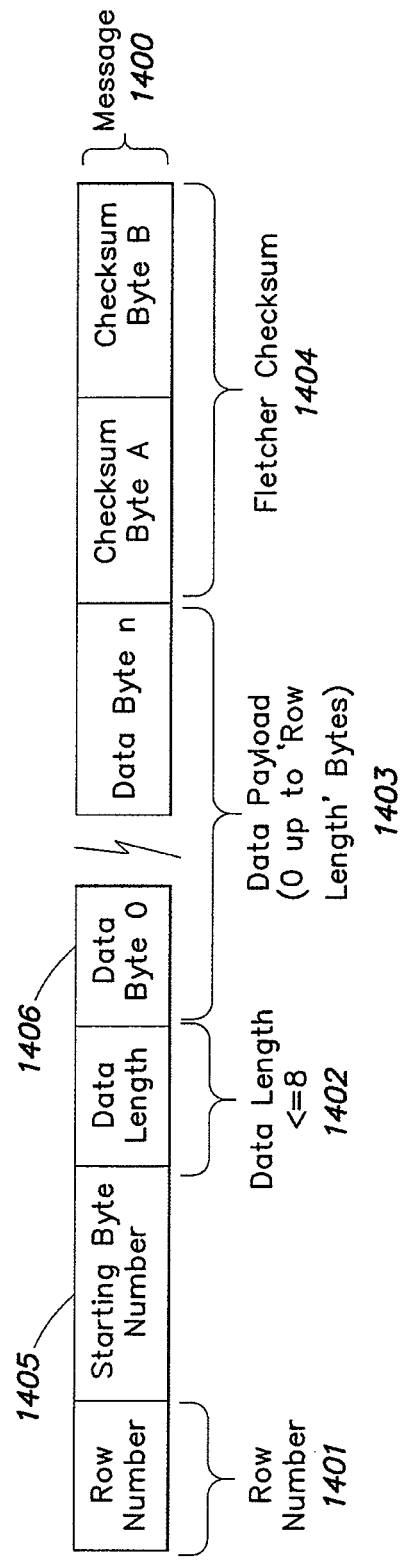
FIG. 14 is a block diagram of a slave message format according to one embodiment of the present invention.

A slave system may transmit in one of two different formats according to one embodiment of the invention. The first data format is a single byte message and the second is a multi byte communication message. FIG. 14 shows an example message format 1400 according to one embodiment of the invention. Message 1400 includes a row number 1401 that specifies the type of message being transmitted. According to one embodiment, there are three possible values of row number 1401. For example, a value of 0xFD indicates a negative acknowledgement (NAK) message.

According to one embodiment, NAK messages are used to initiate communications between a master and a slave. Other single byte commands that may be invoked by the slave include, but are not limited to, commands to stop communication, pause communication, acknowledge (e.g., ACK) a transmission or not acknowledge (e.g., NAK) a transmission. In one specific example, a message having a row number 1401 value greater than 0xF0 is a single byte command or a special command. According to one embodiment, special commands may be used to expand the functionality of the protocol. According to one embodiment, such a message may include the first byte of a multi-byte message.

As discussed, the last type of message that a slave may transmit to a master is a multi-byte message used to request to change data stored at the master. Such a message may take the same form as message 1400 shown in FIG. 14. Message 1400 includes starting byte number 1405 which indicates a row offset where data byte zero (item 1406) is to be written. Data length 1402 indicates the number of data bytes in data payload 1403. According to one embodiment, the data payload must be less than or equal to the length of the row transmitted by the master (e.g., 8 bytes). For example, to write through a third element of a memory location that is 2 bytes long, the starting position is indicated in message 1400 as 3, and the length is indicated as 2. Similar to message 1300, message 1400 may include checksum information. In one specific example, a Fletcher checksum 1404 may be used as discussed further below.

A message 1400 having a data length value of zero (0) in field 1402 may be interpreted by a particular master implementation as a request for the master to send a specified row.

Example Transactions

Figures 15, 16:
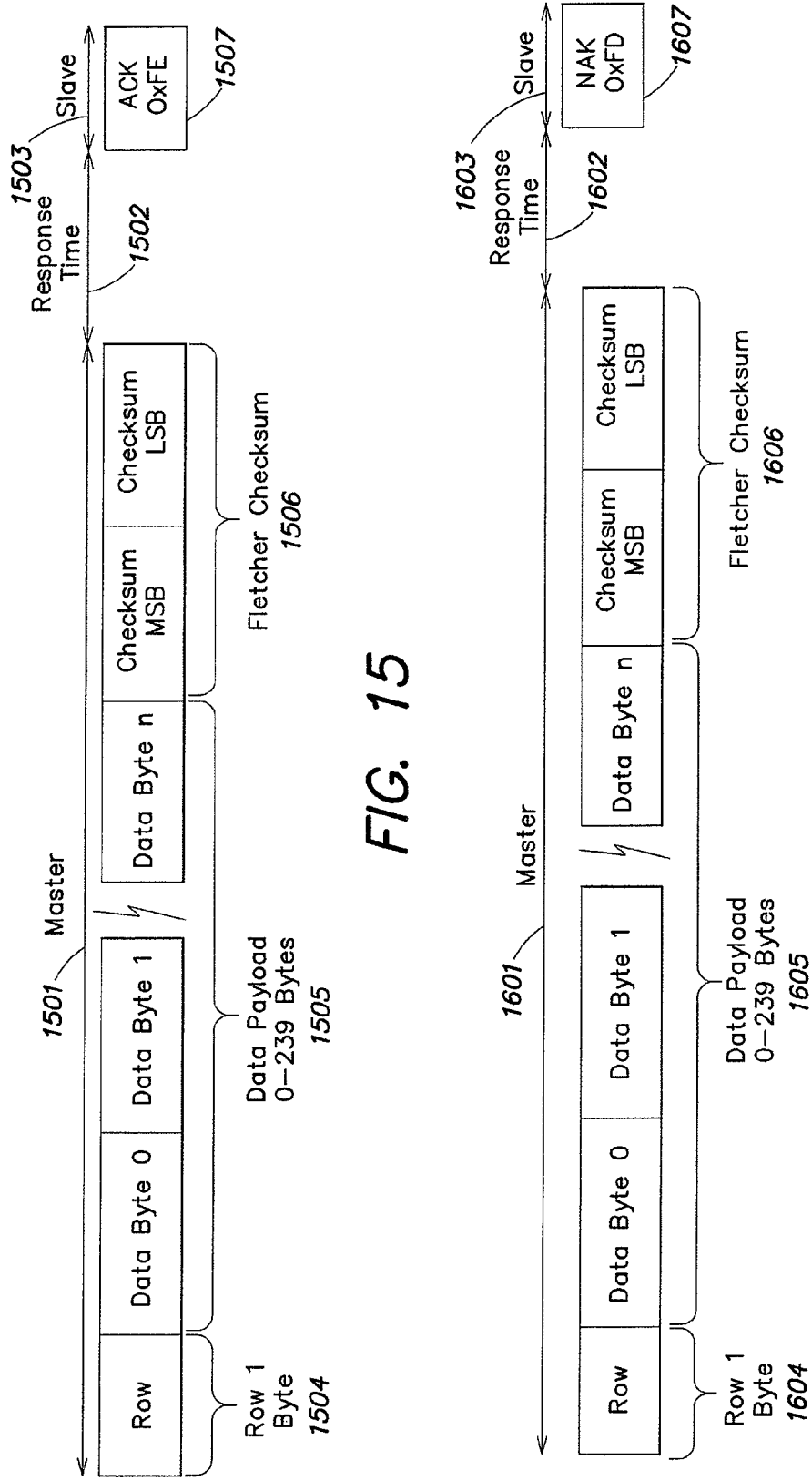
FIG. 15 is a block diagram of a master message format according to another embodiment of the present invention.
FIG. 16 is a block diagram of a master message format according to another embodiment of the present invention.

FIG. 15 shows one embodiment of a message transaction according to one embodiment of the present invention. In particular, a master system transmits a message 1501 to a slave, and after some response time 1502, a slave responds with an appropriate message 1503. In one embodiment, the response is an acknowledgement message 1507 indicated by a 0xFE value for the row value (first byte). Master message 1501 includes a row 1 byte 1504 and a data payload 1505. In one embodiment, the data payload ranges from 0 bytes to 239 bytes. Optionally, master message 1501 includes a Fletcher checksum 1506 as described above.

FIG. 16 shows another embodiment wherein a master sends a message 1601 similar to 1501 (e.g., one having a first byte 1604 followed by a data payload 1605, and optionally, a Fletcher checksum 1606). However, the slave, after some response time 1602, does not receive message 1601. This may occur, for example, if the master does not transmit the information quickly enough (e.g., there are more than the predetermined number of byte timeouts), there are transmission errors (e.g., a corrupted byte, dropped byte or other change in transmitted data), or other transmission or reception problems that cause the data not to be transferred properly. In such a case, the slave system issues a message 1603 indicating that message 1601 was not received. After which indication, the master may resend message 1601. Message 1603 may be, for example, a NAK message 1607 as described above, which may be indicated by a row value (first byte) of 0xFD.

In general, a master may receive one of four basic responses from a slave system. A slave may respond with a single-byte NAK, and in response, the master will retransmit the same data packet. A slave may send a single-byte ACK, and in response, the master will proceed to transmit the next block of data in the message. A slave may also send a multi-byte message with the first byte not indicated as an ACK or a NAK. In the absence of a checksum error, the master may be configured to update its local memory with data received from the slave. According to one embodiment, the master updates its memory only after validating that the received data is in the appropriate range. If validated, the master may respond with a message including the row containing the address in a response packet. If a checksum error occurs, the master system may respond with NAK message (i.e., requesting a retransmission of the last row), after which, the slave may resend the message.

Figure 17:
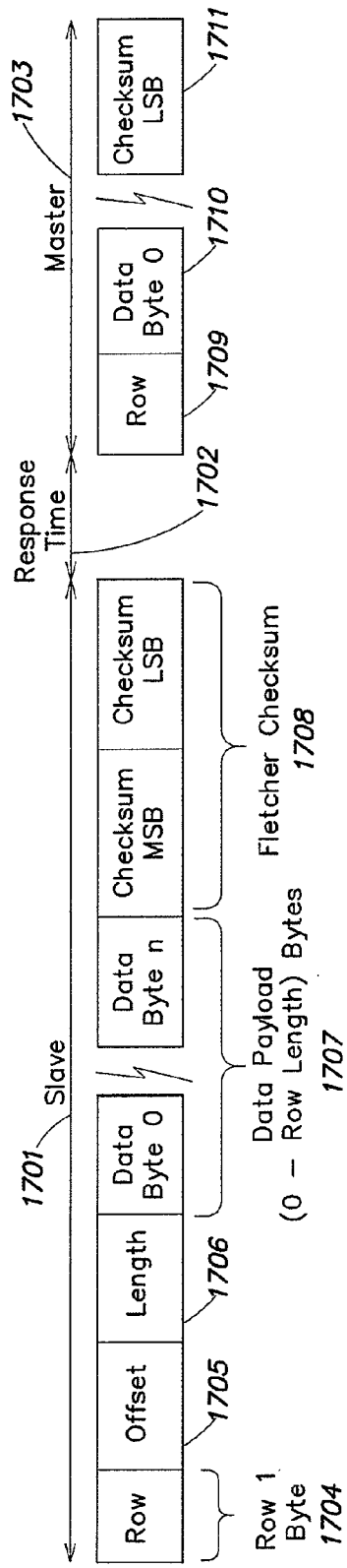
FIG. 17 is a block diagram of a slave message format according to another embodiment of the present invention.

Another transaction type includes a write operation from the slave system to the master. An example of such a message transaction is shown in FIG. 17. A slave system sends a message 1701 to a master system, and after some response time 1702, the master replies with a message 1703. Message 1701 may include row information 1704, offset information 1705, length information 1706, a data payload 1707 and a Fletcher checksum 1708. In the case of a write operation, the master may reply to the slave indicating the row address written by the write operation, indicating to the slave that the write operation was successful. To this end, the message 1703 from the master may include row information 1709, one or more data bytes 1710, and any checksum information 1711.

In summary, the slave sends messages (e.g., ACK messages) to retrieve row information stored in a memory of the master. The master determines which row of data to transmit next, and the master eventually transmits the entire set of data. As described below, such information may be stored in the master according to a memory map described below.

Memory Map

According to one aspect of the present invention, the master may include a memory map in which configuration and performance data are stored. For instance, data may be stored in one or more rows of a memory map as shown in FIG. 18. As is shown, the memory may be a linear array of memory organized in rows. In one embodiment, the master defines a shared memory format. As shown in FIG. 18, the memory may be referenced in a linear array as indicated by the offset shown in the cells. For example, row 0 contains data at offset 0x0000-0x0007. A slave or other entity that reads the memory map may issue commands to the slave that "walks" through the memory map to provide all of the information stored in the memory map. Alternatively, the slave may selectively request particular information from the memory map if the location of the data is known.

According to one embodiment, the memory map may include data that defines the format of the memory map, and its contained data. In one example, the memory map includes header information that defined the data contained in the memory map. Such header information may be stored in reserved locations (or offsets) in the shared memory map, permitting a slave to discover communication parameters for communicating with the master. Further, the header may contain information describing the contents of the shared memory. In the example memory map shown in FIG. 18, the header may be defined as offsets 0x00-0x08.

Figure 19:
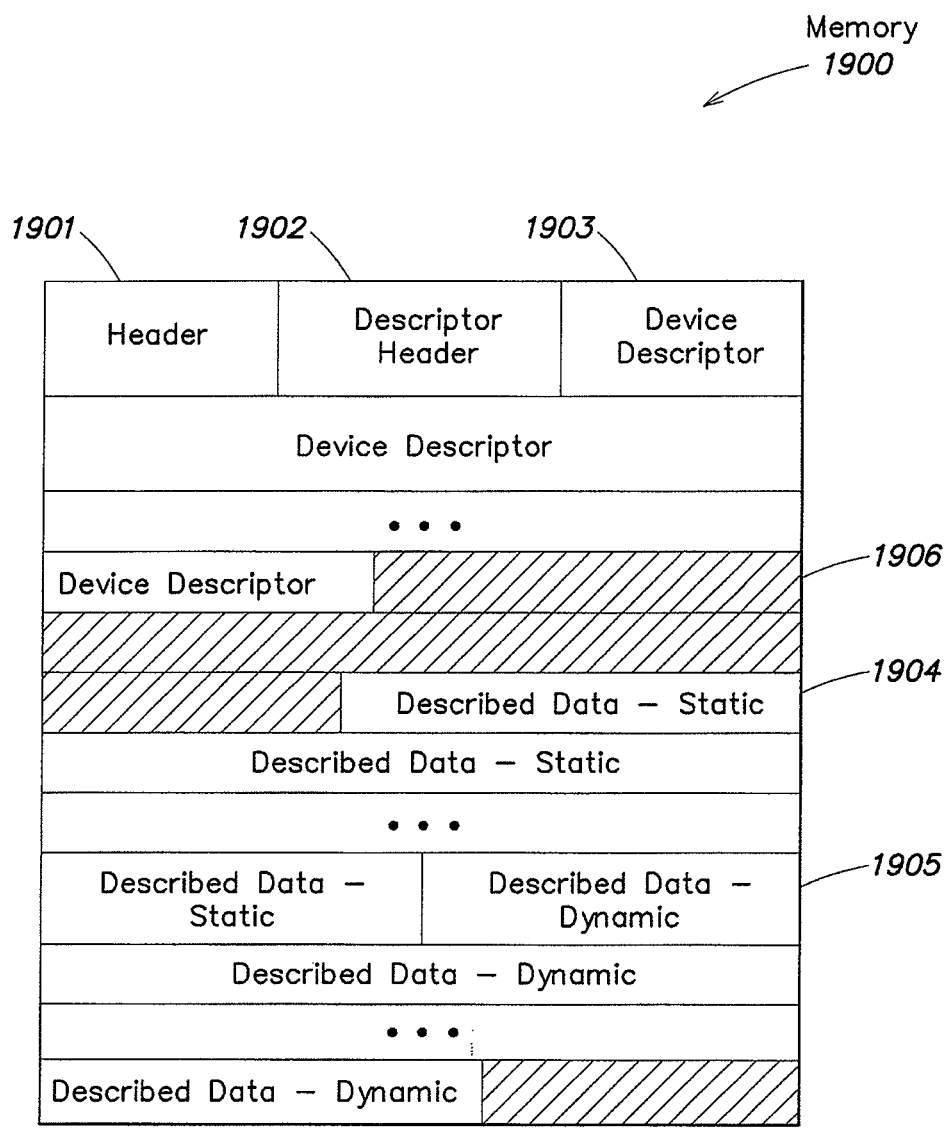
FIG. 19 is a table showing an example memory map according to another embodiment of the present invention.

The memory of a master device may contain several regions. For example, FIG. 19 shows an example master memory having different regions that may be accessed by a slave device. According to one aspect of the invention, the memory (e.g., memory 1900) includes a header 1901 that includes information for establishing communication and accessing other portions of the master memory. In one example, header 1901 has a standard format that slaves and other entities can identify communication parameters contained therein and therefore may communicate with the master device. An example header format is shown by way of example in FIG. 20 and discussed further below. The header 1901 may be a publicly-accessible area that may be accessed by devices to determine communication parameters. In one specific implementation, header 1901 is 8 bytes long.

In one embodiment, the header is a required data region, from which other communication parameters are determined. Specifically, header 1901 may indicate, for instance, a version of a communication protocol to be used to access the master. Header 1901 may also specify the organization of data in the memory map, the regions that are contained within the map, and aspects of their organization. In one specific example, the header includes a unique identifier that identifies a data structure of the memory from a group of known configurations. Further, the header may include information identifying the number and size of data packets used in communication.

Following header 1901, memory 1900 may include a descriptor header 1902 that indicates, for example, an indicator (e.g., a pointer) that identifies where data may be found within memory 1900. For example, the descriptor header 1902 may include a pointer that indicates a beginning of described data. Descriptor header 1902 may include other information, such as an indication of parsing rules to be used to parse a device descriptor 1903 that follows the descriptor header 1902.

Device descriptor 1903 may provide a number of functions, including identifying which rules for parsing the descriptor may be used by slaves that access the master. Device descriptor 1903 is, in one embodiment, a series of bytes that describe the format of the described data. According to one embodiment, device descriptor 1903 is encoded and decoded using a set of rules. One purpose of the device descriptor, according to one embodiment, includes informing slaves as to which usages of the data (e.g., a data element) are implemented, where a particular usage exists in the memory map, any parameters for particular usage, and where a particular usage exists in the device hierarchy.

Memory 1900 may be divided into sections of described data that are either static (e.g., static data 1904) and dynamic data (e.g., dynamic data 1905). According to one embodiment, if no distinction is made, the described data may be considered dynamic. According to one embodiment, a split is made between data types to aid the slave in determining how to most efficiently store data received from the master. Such described data may include meaningful data for the master entity including, for example, operating parameters, debug information, performance information, etc. The described data may be located in any portion of memory 1900, and is not limited to following immediately after the device descriptor 1903. For example, memory 1900 may include one or more portions of undescribed data (e.g., data 1906) that is included for padding purposes or other use.

Static data is data that changes infrequently, for example, information describing the master configuration. The described data may also include data which changes frequently, such as performance information.

FIG. 20 shows an example header format according to one embodiment of the present invention. The header may include protocol version information that identifies a version of the protocol being used. The header may also include row length information that identified the length of a row contained in the memory map. The row length may also define a packet size for communicating to the master from a slave or proxy entity. The header may include an identifier that indicates the number of rows of memory in the memory map.

The header may include information identifying the master entity. This information may be, for example, a unique identifier for a particular model of a master device. Such information may be useful to a slave for identifying what capabilities a particular master may have. In one instance, the slave may be a personal computer (PC) that manages a master device, such as a UPS, and thus the model number of the UPS being managed may be useful for determining the commands that may be performed, information that may be monitored, etc.

The header may also include an identifier that indicates a particular data table configuration format. This identifier may permit, for example, a slave to identify a particular configuration of the memory map. This identifier may also allow a slave device to determine whether the slave supports a particular memory map configuration. That is, the slave may store different memory map configurations, and the slave may use a particular configuration in response to the identifier. Further, the header may identify what protocols and/or features are supported by the master, allowing a slave to adequately determine the master's capabilities. The header may also include a human-readable description of the device for use, by an administrator or other user, or any other information describing the device and/or method for accessing the device.

According to one embodiment, the device descriptor is a sequence of bytes, which describes the format of the described data. The device descriptor is encoded and decoded by following a set of rules as discussed further below.

According to one embodiment, the purpose of the device descriptor is to let slave devices know:

Which data usages are implemented by a master.

Where a particular usage exists in the memory map of the master.

Any parameters for a particular usage.

Where a particular usage exists in the master device hierarchy.

Thus, a usage as defined in a publicly-accessible location may permit a slave system to access certain information stored in memory of a master. In a similar manner, the slave device may access such information as part of a proxy system that may provide access from other devices or systems.

Proxy System

According to one embodiment, a slave may act as a relay for the purpose of relaying information to one or more other entities. To this end, the slave may be a part of a proxy system that is configured to communicate with other entities, such as a computer system. Such a computer system may be coupled to the proxy through one or more communication networks. In a system using more than one slave device in a serial chain configuration, a proxy may be used as the last slave device in the chain.

According to one aspect of the present invention, the proxy is adapted to communicate on behalf of multiple devices to a single master. In one embodiment, the protocol used between the master and slave is transported using a network protocol. Conventionally, master devices such as UPSs usually communicate to a management entity using a directly-connected link (e.g., a serial communication cable) or are provided what is referred herein as a network management card (NMC), interface card, or other devices that communicate to the device using the native language of the device, and this device translates data to one or more other systems or devices using network protocols such as HTTP (e.g., over one or more networks).

Currently, products such as UPSs and other devices communicate to other devices over an Ethernet-based network through either of two methods. First, an interface card (e.g., an NMC, communicates to the UPS or other device in the native language of the UPS or other device, translates this data to client-friendly terminology and vocabulary, and communicates over the Ethernet-based network to one or more other devices (e.g., a client) using one of many protocols such as HTTP, Telnet, SNMP and others. A client interpreting the translated data can be a human using a network browser or an application programmed to implement processes in response to the UPS or other devices' state of condition.

The disadvantage of this approach is that the interface needs to understand the UPS or device to which the interface is communicating so that the interface can translate its language to the client-friendly interface in a meaningful way. Using this approach, the interface card needs to store in its memory not only the many different languages of the different UPSs and devices the interface card expects to translate, but the languages of the different clients that the card can be configured to transmit that translated data. Because of the need for multiple-language support requirements of both the device and the client, physical memory requirements of the interface card are increased. Also, because this translation occurs in real-time, the processor performing the translation needs to be fast enough to reduce lag time to an acceptable amount. Both of these requirements add to the cost and complexity of the interface card hardware.

Another way by which a connection is formed includes a software application installed in a computer that connects to the UPS or other device through a serial connection, translates the UPS or other device data to client-friendly terms and makes that data available to other devices through an Ethernet-based network connection. One disadvantage of this approach is that the approach requires a PC or other computer connected to the UPS or other device via a serial connection. The computer is obviously an expensive, voluminous, and power hungry piece to this solution if it were not intended to be used for other purposes such as file-serving, print management, and other network activities. This approach also requires that a serial port is to be available to communicate to the UPS or other device, which is not always possible or practical. Further, conventional discovery of devices requires polling of all network (e.g., IP) addresses to "find" nodes that contain network devices. Such discoveries are time intensive due to the number of possible IP addresses, and resource intensive due to the network bandwidth required to perform such operations.

According to one embodiment, a system is provided that does not need to translate data from the UPS or other device before providing it in client-friendly formats over the network. Because data is not translated, but is provided in its native form, the complexity of the code and the hardware is reduced. A side benefit of passing data through the interface in its native form is that the system works with a broad array of products without the system needing to store multiple protocols or otherwise having to know anything about individual capabilities and features of different master devices. Another advantage over conventional interface cards is that the system, according to one embodiment, is designed to work with only main network protocol. In contrast to a conventional network card which has to store the protocols of several network communication methods in memory, the system according to one embodiment of the present invention uses only one. Support for a single protocol reduces cost and complexity and simplifies set-up time during product installations. According to another embodiment, a lightweight protocol is provided that allows a software client to perform a simple network broadcast and receive a response from all devices on the network that comply with this protocol.

According to one aspect of the present invention, a universal translation system is provided. In particular, a single device is provided that for all master devices compliant with the serial and network protocol regardless of the data that is specific to the master devices. Further, a capability is provided for discovering devices on the network that are compliant with the protocol. This may be accomplished, for example, via a lightweight communication method. In one particular example, existing communication protocols are utilized as a transport layer for a proprietary serial protocol. The data received at the software client is the same format as the data that would have been received through a direct serial communication with the master.

As discussed, a network version of a serial link protocol may be provided. According to one embodiment, the protocol allows access to the same memory map that is accessed over the serial port of the master. In one embodiment, the protocol is a lightweight network protocol that functions as a serial cable replacement. The added advantage of the network protocol is that multiple devices may connect to the same network master, with only one connection to the master.

Figure 21:
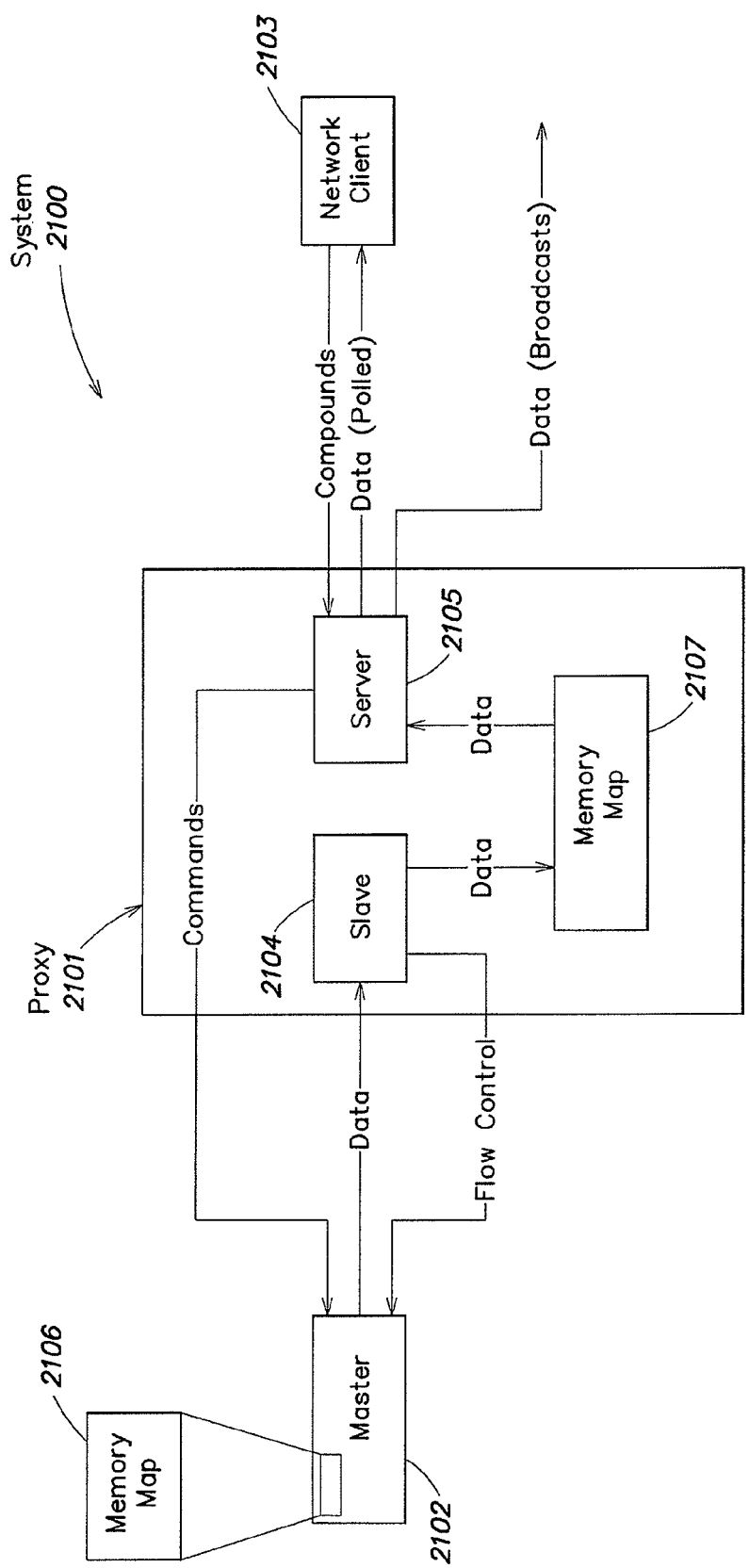
FIG. 21 is a blocking diagram of a proxy system according to one embodiment of the present invention.

FIG. 21 shows one example system used for communicating with a master device according to one embodiment of the present invention. Communication system 2100 includes a master system 2102 having information to be relayed to other entities. More particularly, master 2102 may include one or more memory areas to be accessed by one or more external devices. Master 2102 may include a memory map 2106 that includes the data to be accessed. According to one embodiment, memory map 2106 may include data that describes the format of other data contained within the memory map. A slave, proxy or other system may use such information in the memory map to determine communication parameters for communicating with the master 2102.

According to one embodiment, a proxy 2101 is provided that is capable of reading the memory map 2106 of the master 2102 and providing the information to one or more clients (e.g., network client 2103). To this end, a proxy 2101 includes a slave 2104 that is capable of communicating with master 2102. As discussed, slave 2104 may communicate commands and other data to master 2102 over a serial communication link. Such information may be, for example, messages as discussed above with reference to FIGS. 13-14. Such information may include commands, data received from a master, and any flow control information.

Data retrieved from the master may be stored in a copy of the memory map of the master stored in the memory of proxy 2101. More particularly, memory map 2107 may be a local copy of memory map 2106 of master 2102. Slave 2104 may periodically read the memory map of master 2102 and update its local copy. Thereafter, other systems may be capable of accessing information stored in the local copy of the memory map 2107. Such access may be provided, for example, by a server 2105 which is capable of communicating over one or more communication networks to other systems, including network client 2103. According to one embodiment, server 2105 may permit clients to communicate with the master 2102 using one or more conventional network communication protocols.

As discussed above, network client 2103 may include one or more systems that are capable of communicating commands and data to a master (e.g., master 2102). Client 2103 may be, for example, a management system capable of monitoring one or more devices (e.g., a UPS). In one example, network client 2103 may be the well-known ISX manager product available from the American Power Conversion Corporation. Some clients may be capable or reading and/or writing to memory locations within memory map 2106 of master 2102. As discussed above, one or more portions of memory of master 2102 may be accessed, including static data and dynamic data. In one example, static data does not change and may be transmitted to proxy 2101 upon communication with the master 2102. Dynamic data may be communicated periodically or as requested by proxy 2101.

Major features of a serial protocol may be duplicated in a networked version of the serial communication protocol system. That is, a network protocol may be used as a transport to conduct the serial communication protocol over a network. According to one embodiment, the "networked" version of the serial protocol may be substantially similar to the serial communication protocol used between a slave and a master. This feature may be beneficial, as client software that is capable of communicating with a master devices as a slave (e.g., using a serial link) may be nearly identical to that of software that communicates through a proxy and associated network transport protocol. The following describes differences between a serial version and the networked version of a serial protocol according to one embodiment of the present invention.

The slave in the proxy device unlocks the serial protocol so that a correct version of the memory map resides in the proxy server. To recreate the "authentication protocol", the proxy device may implement two tables of clients, a monitor client list (e.g., a "read only" list), and a shutdown client list (e.g., clients having both read and write access).

A "shutdown client" is, in the case of a UPS master device, a software client executing on a PC or server to which the UPS is being controlled. For instance, it may be desired to shut down a UPS from a server to which the UPS provides output power. To this end, the network may issue one or more commands that affect the operation of the UPS. Thus, it may be necessary to provide write access in addition to read access to portions of the master memory. According to one embodiment, addition of a client to either table requires registration using the authentication protocol. Any client on the network may communicate with the proxy server, but certain pieces of information are "restricted", and are not reported to the client unless the client is registered in one of the two registration tables.

Each table may contain a fixed number of entries; each entry referred to herein as a slot contains the IP address, MAC address and a timeout value in seconds. The timeout is reset, for example, with each SNMP communication packet from the client to the proxy. Communications with the proxy is allowed as long as the timeout has not expired and the client is defined in one of the registration tables. The timeout may be set to, for example, 600 seconds for shutdown clients and 3600 seconds for monitor clients. When the timeout expires, the device is removed from active registration, but its IP and MAC addresses may be stored in a memory of the proxy. If the device re-establishes communication, the proxy server may provide the same slot or entry previously provided.

A slot is occupied if the slot has defined IP and MAC address. One way to completely remove a client from the list is to actively register for the particular slot, or to be registered on a different slot and clear a slot. Addition of a client to a registration table is accomplished, for example, by writing the serial authentication with a slot number to the appropriate OID (e.g., registration list OIDs). The format of the data to be written may be a hex string <Serial Slave Password Challenge><Serial Master Password Response><16-bit Slot Number>. A slot number having a value of 0 requests the proxy to pick an available slot, or to reassign a slot previously registered to the same client. If the table is full, an error may be returned. In the case of a full table, the client must decide to refuse connection, or bump another client by registering for a particular slot.

The first table, the shutdown client table, is intended for management entities and shutdown clients to register. Devices in this table receive periodic updates of the dynamic memory and are allowed to read and write to the serial memory. Once listed in the broadcast table the proxy device sends SNMP traps to the network client on a specified interval, and upon receipt of a valid write command. Registered clients may, according to one embodiment, receive exactly the same memory map images. The network client is responsible for renewing the registration periodically to prevent the registration from timing out. Renewal of the registration may be performed, for example, by any valid SNMP communication to the proxy device. In another embodiment, a polled read of the registration table may be performed to renew the registration with the least impact to the proxy server.

The second table, the polled table, may be provided for entities that periodically poll the proxy (e.g., a management server or other monitoring software that communicate on a polled basis to the proxy). These devices may be permitted to register in a separate table with a similar registration method described above.

As discussed above, data in the master is organized into two basic regions, a static region followed by a dynamic region. The static region contains data that changes infrequently and can be communicated without any authentication. The proxy server may store data in this region in memory (e.g., in ROM). If placed in ROM, care should be taken not to place data that changes frequently, as the ROM in most devices have 10K write limitations. The dynamic region may include all data within the memory map that is not static. Dynamic data may optionally be masked to a network client by replacement with a constant piece of data when the network client is not a registered client. According to one embodiment, data needed by the network client to generate the registration may not be masked.

If a device is not registered, the device may be provided "garbage" dynamic data. Data from the proxy device will be valid with the exception of the dynamic data. According to one embodiment, the only data in the dynamic data that will be valid is the data necessary to properly generate the registration packet.

As discussed, the proxy device may provide a "universal translator" to multiple device types. According to one embodiment, the proxy functions as a transparent protocol translator. This function is achieved by placing restrictions on the master devices that are supported by the proxy. According to one embodiment, requirements may be imposed on master devices that allow them to work with the proxy server. For example, all devices that are designed to work with the proxy device may be required to implement the device descriptor. If registration is to be used, the authentication protocol must also be used. A device that fails to implement all the required usages may be declared to be incompatible by the proxy device.

Authentication Protocol

According to one embodiment of the present invention, it may be beneficial to prevent unauthorized vendors from making products that communicate with a particular master device (e.g., a UPS), and prevent other device manufacturers from making a master device that communicates with a particular slave device. For instance, in the case of a UPS master device that communicates with a particular slave system, it may be beneficial to prohibit "knock-off" master and slaves from entering the marketplace. To this end, a protocol is provided to prohibit either an unauthorized master or slave (or its network clients) from communicating with an "approved" master or slave entity.

Prior communication methods assume that the master entity is an approved one. That is, security measures are taken to prohibit unauthorized slaves from controlling a particular master. However, such security measures do not ensure that the masters or slaves are themselves compliant, and therefore, such master and client devices may be easily reproduced.

According to one embodiment, additional methods are provided for verifying that the master is an authorized master. For instance, an additional verification method may be provided to allow a slave, proxy, or client to determine whether a particular master is "authorized." Further, a method may be provided to determine whether a master is in a locked or unlocked state.

Also, because the information contained in the device (e.g., status, control, and configuration information) can be viewed, modified and controlled via a serial communication link that is accessible to external devices, it is possible that someone or some company, may write software that uses the communication protocol to communicate with a master device. It is also possible that someone, or some company, could reverse-engineer the communication protocol and build a master device (e.g., a UPS) that duplicates the protocol and works with software tools. According to one embodiment of the present invention, a "lock" mechanism is provided that blocks meaningful data from being transmitted from the device unless an unlock sequence of data is sent to the device. The unlock sequence is based on an algorithm performed on data transmitted via the serial link.

According to one embodiment of the present invention, a method is provided that ensures that authorized slave devices communicate with a master and ensures that only authorized master devices communicate with a slave. Authentication is guaranteed, according to one embodiment, by implementing an unlocking algorithm at the master along with bidirectional authentication implemented by the slave and master. The authentication algorithm may be tracked with a version number so that changes can be made to the algorithm should the existing algorithm be compromised or otherwise be considered inadequate.

According to one embodiment, a master always send data in response to a slave request. However, the data is masked if the master is in a locked state. When data is masked, the data is ignored by the communicating software (e.g., a slave, or client accessing the master through a slave). According to one embodiment, an authentication protocol may include the following features:

Bi-directional locking key—The master (e.g., a UPS) only communicates with authorized slaves, and slaves can detect an authorized master. When the master is locked, the master only allows data to be written to a public memory section (e.g., of EEPROM or to public rows of RAM). Other data writes are not permitted. The slave is adapted to ignore communications from devices that are not verified as authentic master devices.

Method for detecting data status—The slave may be able to detect whether data is locked or unlocked to determine whether the data being returned from the master is valid.

A locking feature according to one embodiment utilizes the fact that there are two types of data that are transmitted, public and private. Data that is public is always available, and data that is private is only available after an unlocking sequence is sent to the master. In one example, the master, according to one embodiment, generates a "secret key" automatically on power up, and whenever the master exits factory mode. This secret key may be, for example, 16-bits long and calculated, for example, based on an 8-bit Fletcher checksum algorithm performed on specific elements of the master memory map.

According to one embodiment of the present invention, a Fletcher checksum may be used to verify the integrity of the transmitted data. For instance, an 8-bit Fletcher checksum may be used. One example of the Fletcher checksum algorithm is defined in the IETF document RFC 1146 for use with the TCP protocol.

The 8-bit Fletcher checksum is calculated over a sequence of data octets (call them $D[1]$ through $D[N]$) by maintaining 2 unsigned 1's-complement 8-bit accumulators A and B whose contents are initially zero, and performing the following loop where i ranges from 1 to N:

$$A := A + D[i]$$

$$B := B + A$$

At the end of the loop, A contains the 8-bit 1's complement sum of all octets in the datagram, and that B contains (N)D[1]+(N−1)D[2]+ . . . +D[N]. At the end of the loop, the A is placed in the first byte of the checksum field and B is placed in the second byte. Note that, unlike the OSI version of the Fletcher checksum, the above version of the Fletcher checksum does not adjust the check bytes so that the receiver checksum is 0. It should be appreciated that there are a number of much faster algorithms for calculating the two octets of the 8-bit Fletcher checksum, and any method for calculating a Fletcher checksum may be used.

Naturally, any computation which computes the same number as would be calculated by the loop above may be used to calculate the checksum. One advantage of the Fletcher algorithms over the standard TCP checksum algorithm is the ability to detect the transposition of octets/words of any size within a datagram. Although the Fletcher checksum may be used, it should be appreciated that other methods for checking data may be used.

A "shared secret" may be combined with elements of the public memory map, and may be used to initialize an algorithm used to generate the "secret key." In one example, the algorithm may process a set of particular bytes from the master's memory map. These processed bytes may be referenced to particular elements in the memory map or may include the data located at a particular position of the memory map. The "shared secret" according to one embodiment of the invention includes the elements that are used to generate the "secret key."

According to one specific embodiment of the invention using a Fletcher checksum algorithm, the shared secret may be used to initialize both bytes of the Fletcher checksum prior to calculating the Fletcher checksum of the first X bytes of the master memory, followed by Y bytes of data starting with the serial number of the master, where X and Y are shared secrets. According to one embodiment, all data included in the calculation of the "secret key" is public and can be retrieved without knowledge of the "secret key". To generate the secret key, knowledge of the initializer for the Fletcher checksum and the number of bytes of data X and Y are required. The initializer and the number of bytes of data may, for example, be determined at compile time during the design of a specific product. According to another embodiment, the calculated "secret key" is not transmitted with the exception of one cycle after the correct key has been transmitted to the master device.

To prevent unauthorized duplication of the master, the slave may send the master a random number to which the master applies a secret algorithm to generate a response. The response is sent to the slave and allows the slave to determine whether the master is authentic.

In another example implementation, the master may generate a random number which is added to the bytes of the "secret key" to generate a simple checksum. This simple checksum with the random number may be transmitted periodically from the master so that the slave can verify that the device with which it is communicating is an authorized master.

To allow the slave to determine the status of the master (locked or unlocked) information (e.g., one or more bits) in a specific response indicates the master data status and may be transmitted periodically to the software. The slave may inspect this information to determine if the responses to queries are valid.

On microprocessor reboot, and on loss of communications, the master may change its data status to a locked state. When in locked state, locations having data that is private may be transmitted with random, fixed, or garbage data in lieu of transmitting the private data. The transmitted data may be ignored by the communicating slave. The master becomes unlocked, in one specific example, when a specific 16-bit sequence is written to the master registers. When the appropriate key is sent, the master acknowledges the data and then proceeds to transmit all private data as valid.

Whether the master data is locked or unlocked, the master may transmit a random number followed by a simple checksum of the random number, the MSB of the 16-bit secret, and the LSB of the 16-bit secret. A slave device can interrogate these two bytes to determine if the master is an "authorized" master. The slave may lock the data in the master at any time by sending an incorrect secret key to the master. This receipt causes the master to "lock" the data.

Authentication also permits access to private data (e.g., parameters) within the memory map of the master, so additional usages need not be defined for special access to the master.

| | |
|---|---|
| PUBLIC DATA | Master memory elements that are publicly available. |
| PRIVATE DATA | Master memory elements that are "masked" when the memory is in a locked state. |
| LOCKED | Master memory status prior to authentication. Private data is unavailable when in a locked state. |
| UNLOCKED | Master memory status after authentication. Private data is available when in an unlocked state. |

As discussed, FIG. 16 shows an example representation of a master memory 1600 identifying the data located in different regions. In the example described above with reference with respect to FIG. 16, described data that is static is public data and therefore is available to clients that are not authenticated. Described data that is dynamic is private data that is not available to clients that are not authenticated.

According to another aspect of the present invention, a challenge/response method may be used to perform a bidirectional authentication between a master and a slave. In particular, another example process for performing a bidirectional authentication between a slave and a master device may be performed as follows:

Upon initialization after hardware reset (or after stop command received from a slave, data is locked and the master transmits only public data. This public data includes a Master Password Challenge (MPC). In one example, the MPC is a random number. To increase security, the master should attempt to make this number as random as practical for its application. Also, to further increase security, the use of constant numbers and incrementing the previous random numbers should be avoided.

When the slave receives row 0, the slave assumes that the master is locked. The slave waits to receive the last row from the master, ensuring that the password and authentication status usages have been received. The received authentication status usage is then checked to verify locked status of the master.

When locked, the master transmits the last row repeatedly (assuming ACKs) until the slave writes a Slave Validation Response, or SVR. In another implementation of the master, the master may choose to repeatedly transmit all public data.

The slave writes the SVR in response to the MPC (which is stored by the slave in its memory map). As part of the same write, the slave writes a Slave Password Challenge or SPC which also may be a random number.

Upon a write to the SVR/SPC, the master checks the SVR for validity. If valid, the master responds to the write with a Master Validation Response or MVR. The Master then begins transmission of all the private data including the authentication status usage, which shows that the master is unlocked. After successful unlocking, the master ensures that all rows have been transmitted at least once before the master reports data valid in the authentication usage. If the SVR is invalid, the master ensures that the master is locked. Any write to the SVR/SPC, whether valid or invalid, causes the master to update the MPC to prevent easily defeating the authentication.

Upon transmission of the row in response to the write to the SVR/SPC, the slave then checks the MVR for validity. If valid, the slave continues normal operation receiving the rows transmitted by the master up to and including the last row which confirms that all the data in the master memory is now unlocked and valid. If the MVR is invalid, the slave stops communications and takes an appropriate action. The appropriate action may be application-specific (e.g., alert user through GUI, stop communication for a period of X minutes, etc.).

Figure 22A:
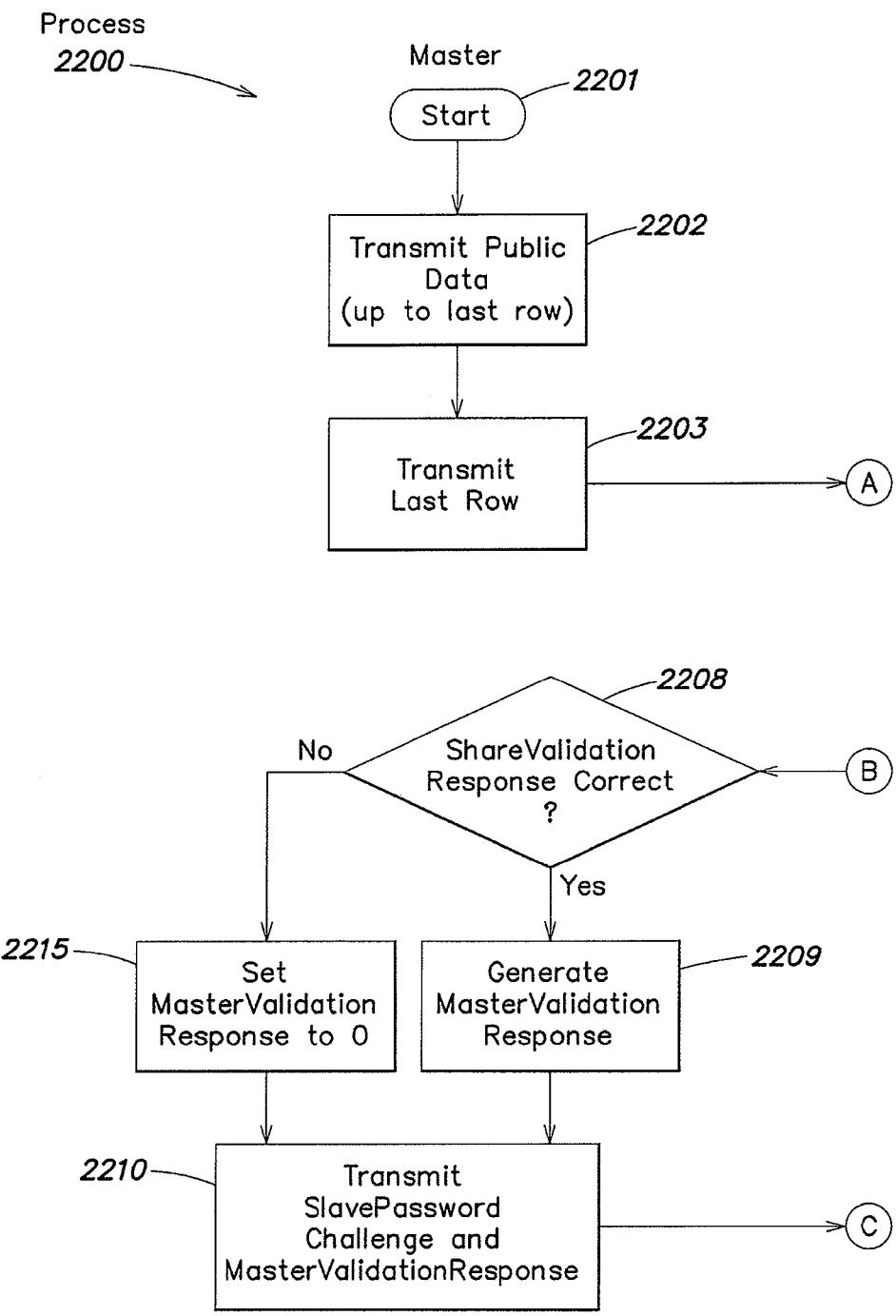
FIG. 22A-22B show a flow chart of an authentication process according to one embodiment of the present invention.
Figure 22B:
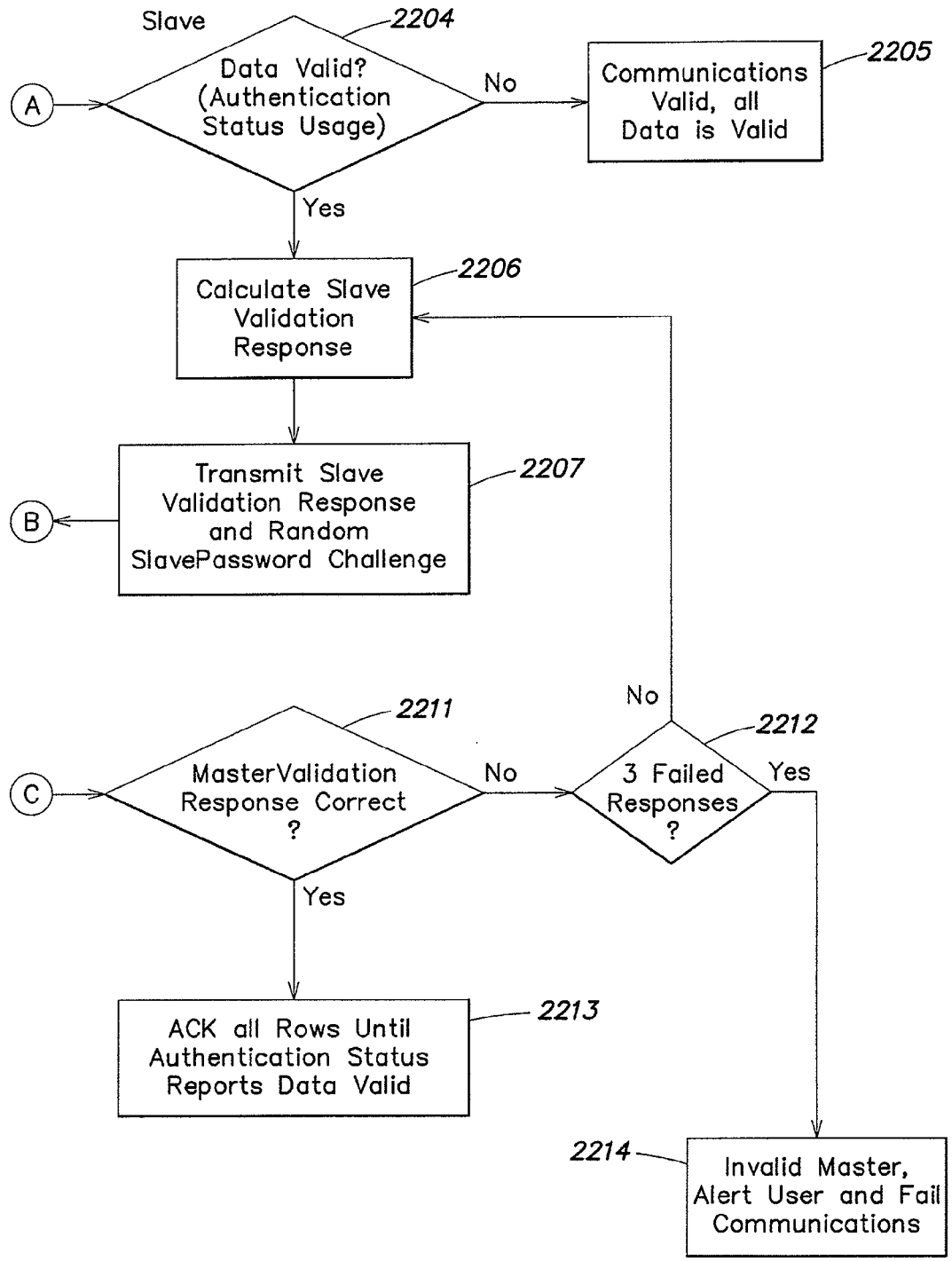

FIGS. 22A-22B show an example authentication process according to one embodiment of the present invention. At block 2201, process 2200 begins. At block 2202, the master transmits public data within the memory map. In one embodiment, the master transmits public data up until the last row of public data in the memory map. Upon receipt of the transmitted last row of data from the master at block 2203, the slave determines whether the received data is valid at block 2204. If so, slave determines a Slave Validation Response (SVR) at block 2206. If not, the communications are determined valid and all data is valid at block 2205.

In one embodiment, the SVR is determined based on the Master Password Challenge stored within the memory map of the slave. However, it should be appreciated that the SVR may be determined by any other portion(s) of the memory map. At block 2207, the slave transmits the SVR and a Slave Password Challenge (SPC) which may also be a random number.

At block 2208, the master determines whether the slave validation response is correct. If so, the master generates a Master Validation Response (MVR) at block 2209. If not, the master sets the Master Validation Response to a value of zero. The master transmits the Slave Password Challenge and the determined Master Validation Response to the slave at block 2210. Also, the master may generate a new Master Password Challenge (MPC) when the Slave Validation Response is written or the master is initialized or reset.

At block 2211, the slave determines whether the Master Validation Response is correct. If so, the slave acknowledges all rows until the Authentication Status reports that all of the received data is valid at block 2213. If, at block 2211, it is determined that the Master Validation Response is not correct, it is determined at block 2212 whether a number of failed responses (e.g., a predetermined number such as 3) have been received. If so, the master is determined invalid, and communications with the master have failed. The slave may then alert the user (e.g., a client or proxy) and terminate communications at block 2214.

If, at block 2212, it is determined that a predetermined number of failures has not occurred, the slave may recalculate a new Slave Validation Response for transmission to the master. If the SVR is valid, the master will begin transmission of the private data. If not, the master remains locked.

Request-Response Protocol

According to some embodiments, the processes described above are invoked according a request-response protocol. This request-response protocol defines a set data structures, data values and rules that enable a master to communicate with one or more slaves. More particularly, in some embodiments, the request-response protocol implements a set message types and a protocol engine that processes messages having one of these message types. Each of the message types is structured according to a defined format. Each defined format includes a field allocated to store an identifier of a usage and other fields allocated to include information relevant to the identified usage. A usage is a discrete set of processing activity executed by the protocol engine. In some embodiments, the protocol engine invokes a usage upon receipt of a message that includes an identifier of the usage. In at least one embodiment, usage identifiers are stored as globally unique identifiers (GUIDs).

According to one embodiment, the protocol engine can generate and transmit or receive and parse Request, Response, Asynch, Error, Discovery and Discovery Error messages. A Request message is produced by a slave device and is a request to access data from the master device. In some embodiments, the protocol engine starts a timer to ensure that a Response message is received prior to expiration of a timeout period. In one embodiment, this response timeout period is 2 seconds. In another embodiment, a slave device can have only 1 unanswered Request message pending at a time. According to this embodiment, the protocol engine does not transmit another Request message until a response corresponding to a previous Request message has been received or a response timeout occurs. According to other embodiments, the protocol engine will not transmit a Request message until a predetermine period of time has transpired. According to one embodiment, this period of time is configured to equal 100 ms.

When a USB or other serial link is used to transmit and receive the Request message, the protocol engine structures the Request message according to the following format:
<Start of Frame> <FrameLength> <DataLength> <GUID> [Index] [Data] <Checksum>
When a link that guarantees transmission accuracy (such as, for example, UDP over Ethernet) is used to transmit and receive the Request message, some embodiments of the protocol engine do not allocate the Checksum field within the Request message. Similarly, when transmitting the Request message via a physical medium, such as Ethernet, that allows transmission of the Response message within one packet (or other transmission block), other embodiments of the protocol engine do not allocate the Checksum field within the Request message.

The Start of Frame (SOF) field is 1 byte in length and its value indicates the format of the message. In one embodiment, the value stored in the SOF field is 0xEF for a Request message. The value stored in the FrameLength field indicates the number of bytes in the message except for the SOF field and the Checksum field. The value stored in the DataLength field indicates the number of bytes of information included in the message that are relevant to the usage corresponding to the value stored in the GUID field. The value stored in the DataLength field does not reflect any bytes consumed by an array, if an array is present in the message. The value stored in the GUID field is a unique 4 byte identifier of the usage executed by the protocol engine responsive to receipt of the message. The Index field is optional. The protocol engine allocates and populates the Index field in messages including GUIDs that correspond to usages that utilize an array index. The protocol engine determines the number of bytes to allocate for the index based on the value stored in the GUID field. The Data field is also optional. The protocol engine allocates the Data field and populates the Data field when the Request message includes a request to write data to the master device. If the Request message includes a request to read data from the master device, the protocol engine does not allocate the Data field and the protocol engine sets the value stored in the DataLength field to 0. Thus, in at least some embodiments, the DataLength field indicates whether the Request message is a write request or a read request. The Checksum field includes a calculated value representative of the message. In at least one embodiment, the protocol engine allocates the Checksum field and populates the Checksum field with a Fletcher checksum prior to message transmission.

A Response message is produced by the master device in response to a valid Request message from a slave device. As explained below, the format of a Response message is similar to the format of a Request message. A Response message includes result data generated from the processing of the valid Request message. In one embodiment, if the valid Request message was a request to write data, the protocol engine reads the result data from the storage location to which the protocol engine previously wrote the requested data during processing of the valid Request message. Thus, according to this embodiment, the slave may easily verify that a write request was successful by comparing the result data received in the Response to the data included by the slave in corresponding Request.

In another embodiment, the protocol engine will send the result data to other authenticated slaves participating in the same communication session via an Asynch message, which is described further below. If the valid Request message was a request to read data, the protocol engine reads the result data from a cache local to the master device. When a USB or other serial link is used to transmit and receive the Response message, the protocol engine structures the Response message according to the following format:
<SOF> <FrameLength> <DataLength> <GUID> [Index] [Data] <Checksum>
When a link that guarantees transmission accuracy is used to transmit and receive the Response message, some embodiments of the protocol engine do not allocate the Checksum field within the Response message. Similarly, when a physical medium allows transmission of the Response message within one packet (or other transmission block), other embodiments of the protocol engine do not allocate the Checksum field within the Response message.

The SOF field is 1 byte in length and its value indicates the format of the message. In one embodiment, the value stored in the SOF field is 0xEF for a Response message. The value stored in the FrameLength field indicates the number of bytes in the message except for the SOF field and the Checksum field. The value stored in the DataLength field indicates the number of bytes of information included in the message that are relevant to the usage corresponding to the value stored in the GUID field. The value stored in the DataLength field does not reflect any bytes consumed by an array, if an array is present in the message. The value stored in the GUID field is a unique 4 byte identifier of the usage executed by the protocol engine responsive to receipt of the message. The Index field is optional. The protocol engine allocates and populates the Index field in messages including GUIDs that correspond to usages that utilize an array index. The protocol engine determines the number of bytes to allocate for the index based on the value stored in the GUID field. The Data field is also optional. The protocol engine allocates the Data field and populates the Data field with the result data described above. The Checksum field includes a calculated value representative of the contents of the message. In at least one embodiment, the protocol engine allocates the Checksum field and populates the Checksum field with a Fletcher checksum prior to message transmission.

An Asynch message is produced by a master device and is an unsolicited Response message sent to report data that has changed to one or more slaves. In various embodiments, Asynch messages are triggered by events including a change to the data stored in the memory map of the master device or occurrence of a critical event that may impact other devices in communication with the master device, such as, for example, an input line failure. Entities capable of changing the data stored in the memory map of the master include slave devices and physical, user interfaces provided by the master.

When a USB or other serial link is used to transmit and receive the Asynch message, the protocol engine structures the Asynch message according to the following format:
<SOF> <FrameLength> <DataLength> <GUID> [Index] [data] <Checksum>
When a link that guarantees transmission accuracy is used to transmit and receive the Asynch message, some embodiments of the protocol engine do not allocate the Checksum field within the Asynch message. Similarly, when a physical medium allows transmission of the Asynch message within one packet (or other transmission block), other embodiments of the protocol engine do not allocate the Checksum field within the Asynch message. Further when the link and the physical medium support packets (or other transmission blocks) of sufficient length to hold multiple Asynch messages, some embodiments of the protocol engine concatenate several Asynch messages into the same transmission block. For example, in one embodiment, the protocol engine concatenates multiple reports of data changing in a single UDP packet containing multiple Asynch messages. In this embodiment, the limit is approximately 1500 bytes which allows for greater than 50 messages to be concatenated in a single UDP packet.

The SOF field is 1 byte in length and its value indicates the format of the message. In one embodiment, the value stored in the SOF field is 0xEC for an Asynch message. The value stored in the FrameLength field indicates the number of bytes in the message except for the SOF field and the Checksum field. The value stored in the DataLength field indicates the number of bytes of information included in the message that are relevant to the usage corresponding to the value stored in the GUID field. The value stored in the DataLength field does not reflect any bytes consumed by an array, if an array is present in the message. The value stored in the GUID field is a unique 4 byte identifier of the usage executed by the protocol engine responsive to receipt of the message. The Index field is optional. The protocol engine allocates and populates the Index field in messages including GUIDs that correspond to usages that utilize an array index. The protocol engine determines the number of bytes to allocate for the index based on the value stored in the GUID field. The Data field is also optional. The protocol engine allocates the Data field and populates the Data field with the result data described above. The Checksum field includes a calculated value representative of the contents of the message. In at least one embodiment, the protocol engine allocates the Checksum field and populates the Checksum field with a Fletcher checksum prior to message transmission.

In some embodiments, the protocol engine implements an Asynch queue in which the protocol engine stores Asynch messages for later transmission. If, for example, the protocol engine detects several events that generate Asynch messages over a time frame that is too short to allow for transmission of each Asynch message upon detection, the protocol engine stores the Asynch messages generated by the events in the Asynch queue. In other embodiments, to guarantee that devices receive Response messages in a timely manner, the protocol engine prioritizes Response messages over Asynch messages. In these embodiments, Asynch messages are queued to allow the protocol engine to transmit queued (or recently generated and not in queue) Response messages before the Asynch messages, as circumstances warrant. In some embodiments, when sequentially transmitting a series of Asynch messages, such as from the Asynch queue, the protocol engine waits a predetermined period of time between transmissions of consecutive messages. This "idle" time provides slaves receiving the Asynch messages with time to process the messages and recover from communication errors. In at least one embodiment, the idle time is configured to be 50 ms.

An Error message is produced by a master device and is a Response message sent to report an error. The types of errors that will generate an Error message include, among others, a timeout, an invalid array index, an invalid GUID and an invalid read of a GUID that supports only a write usage. Each type of error is associated with a designated ErrorResponse. In at least one embodiment, a write to a usage that results in an out of bounds error or a write at an invalid state of the device will not generate an Error message. Instead, according to this embodiment, these types of errors will result in a normal Response message that indicates the data targeted by the write request has not changed. In another embodiment, an incomplete message or a message with an invalid checksum will not generate an Error message. Instead, according to this embodiment, these types of errors are ignored by the protocol engine and no response is generated.

When a USB or other serial link is used to transmit and receive the Error message, the protocol engine structures the Error message according to the following format:
<SOF> <FrameLength> <DataLength> <GUID> <ErrorResponse> <Checksum>
When a link that guarantees transmission accuracy is used to transmit and receive the Error message, some embodiments of the protocol engine do not allocate the Checksum field within the Error message. Similarly, when a physical medium allows transmission of the Error message within one packet (or other transmission block), other embodiments of the protocol engine do not allocate the Checksum field within the Error message.

The SOF field is 1 byte in length and its value indicates the format of the message. In one embodiment, the value stored in the SOF field is 0xED for an Error message. The value stored in the FrameLength field indicates the number of bytes in the message except for the SOF field and the Checksum field. The value stored in the DataLength field indicates the number of bytes of information included in the ErrorResponse field. The value stored in the GUID field is the unique 4 byte identifier of the usage executed by the protocol engine when the error that is the subject of this message was encountered. The ErrorResponse indicates error encountered by the protocol engine in processing the Request message responded to by this message. The Checksum field includes a calculated value representative of the contents of the message. In at least one embodiment, the protocol engine allocates the Checksum field and populates the Checksum field with a Fletcher checksum prior to message transmission.

A Discovery message is produced by a slave device and is a special request to determine whether a usage identified by a particular GUID is supported by a master. According to some embodiments, slaves use Discovery messages to determine whether usages supported by the slaves are also supported by the master. In these embodiments, slaves build lists of the usages supported by masters by executing a process such as the following.

First, the slaves determine the first usage supported by a master by issuing a Discovery message to the master having a RequestedGUID value of 0x0000 0000. After receiving a Discovery Response message (which is described further below), the slaves gather information regarding the next usage supported by the master by issuing another Discovery message having a RequestedGUID value equal to the value of the NextGUID field in the Discovery Response message. Next, the slaves iteratively execute the previous step until the end of the list of supported usages is encountered, which will generate a Discovery Error message (which is also described further below). In this way, the slaves may discover all of the usages supported by a master and the GUIDs that identify these supported usages.

This method also provides the additional benefit of allowing the master to have "private" usages identified by "private" GUIDs which are not discoverable. In one embodiment, private usages are designated as not being discoverable by not including private usages in the next list. In some embodiments, although private usages are not discoverable, they may still be accessible by slaves configured to issue Discovery messages including the private GUIDs that identify the private usages. In these embodiments, the NextGUID field of the Discovery Response message including a private GUID indicates that the next usage is unavailable.

When a USB or other serial link is used to transmit and receive the Discovery message, the protocol engine structures the Discovery message according to the following format:
<SOF> <FrameLength> <DataLength> <DiscoveryGUID> <RequestedGUID> <Checksum>
When a link that guarantees transmission accuracy is used to transmit and receive the Discovery message, some embodiments of the protocol engine do not allocate the Checksum field within the Discovery message. Similarly, when a physical medium allows transmission of the Discovery message within one packet (or other transmission block), other embodiments of the protocol engine do not allocate the Checksum field within the Discovery message.

The SOF field is 1 byte in length and its value indicates the format of the message. In one embodiment, the value stored in the SOF field is 0xEF for a Discovery message. The value stored in the FrameLength field indicates the number of bytes in the message except for the SOF field and the Checksum field. The value stored in the DataLength field indicates the number of bytes of information included in the message that are relevant to the usage identified by the value stored in the DiscoveryGUID field, i.e., the Discovery usage. In at least one embodiment, the DataLength field stores a value of 4 to represent the size of the RequestedGUID field. The value stored in the DiscoveryGUID field is a unique 4 byte identifier of the usage executed by the protocol engine responsive to receipt of the message. The value stored in the DiscoveryGUID indicates that the slave requests a response that indicates whether the master recognizes and supports the usage identified by the value specified in the RequestedGUID field. The Checksum field includes a calculated value representative of the contents of the message. In at least one embodiment, the protocol engine allocates the Checksum field and populates the Checksum field with a Fletcher checksum prior to message transmission.

A Discovery Response message is produced by the master device in response to a valid Discovery message from a slave device. A Discovery Response message includes information regarding the RequestedGUID specified in the valid Discovery message. When a USB or other serial link is used to transmit and receive the Discovery Response message, the protocol engine structures the Discovery Response message according to the following format:

<SOF> <FrameLength> <DataLength> <DiscoveryGUID> [<Tag> <Data>]...[<Tag> <Data>] <RequestedGUID> <Size> <NextGUID> <Checksum>

When a link that guarantees transmission accuracy is used to transmit and receive the Discovery Response message, some embodiments of the protocol engine do not allocate the Checksum field within the Discovery Response message. Similarly, when a physical medium allows transmission of the Discovery Response message within one packet (or other transmission block), other embodiments of the protocol engine do not allocate the Checksum field within the Discovery Response message.

The SOF field is 1 byte in length and its value indicates the format of the message. In one embodiment, the value stored in the SOF field is 0xEF for a Discovery Response message. The value stored in the FrameLength field indicates the number of bytes in the message except for the SOF field and the Checksum field. The value stored in the DataLength field indicates the number of bytes of information included in the message that are relevant to the usage corresponding to the value stored in the DiscoveryGUID field. In one embodiment, the value stored in the DataLength field of a Discovery Response message is 9 and reflects the size of the RequestedGUID field, the NextGUID field and the Size field.

The value stored in the DiscoveryGUID field is a unique 4 byte identifier of the usage executed by the protocol engine responsive to receipt of the message. The value stored in the DiscoveryGUID field indicates that the message is a response that includes information regarding the usage identified by the value stored in the RequestedGUID field. If the value stored in the RequestedGUID field is not supported by the master, the master will return a Discovery Error message, which is described further below.

The value stored in the NextGUID field indicates that next GUID that identifies a usage that is recognized and supported by the master. A value of 0 within the NextGUID field indicates that there are no more GUIDs within the list of GUIDs supported by the master. The value stored in the Size field indicates the number of bytes consumed by each Data field included within the message. Each pair of Tag and Data fields is optional.

The value stored in the Tag field is an identifier of a property of the usage identified by the value stored in the RequestedGUID field. In at least one embodiment, the size of the Tag field is 1 byte. The value stored in the Data field is the value of the property identified by the value stored in the Tag field. In at least one embodiment, the protocol engine determines the number of bytes consumed by the Data fields using the value stored in the Size field. The Checksum field includes a calculated value representative of the contents of the message. In at least one embodiment, the protocol engine allocates the Checksum field and populates the Checksum field with a Fletcher checksum prior to message transmission.

In one embodiment, the value stored in the Tag field may identify properties including an array utilized by the usage identified by the value stored in the RequestedGUID field, a default value for the usage identified by the value stored in the RequestedGUID field, maximum and minimum values for the usage identified by the value stored in the RequestedGUID field, and a bitmask utilized by the usage identified by the RequestedGUID field. In this embodiment, a Tag field value of 0xFD indicates that the Data field paired with the Tag field stores information describing an array. In this case, the protocol engine structures the Data field according to the following format:
<Dimension 1> . . . <Dimension 2>
In at least one embodiment, each Dimension included in the Data field is less than or equal to 0xE0 to allow the protocol engine to parse the Tag fields (which have values greater than 0xE0) and the Data fields.

A Tag field value of 0xFA indicates that the Data field paired with the Tag field stores both a Minimum value and a Maximum value for the usage identified by the value stored in the RequestedGUID field. In this case, the protocol engine structures the Data field according to the following format:
<Maximum> <Minimum>

A Tag field value of 0xF9 indicates that the Data field paired with the Tag field stores a default value for the usage identified by the value stored in the RequestedGUID field. A Tag field value of 0xFB indicates that the Data field paired with the Tag field stores a bitmask value utilized by the usage identified by the value stored in the RequestedGUID field. The protocol engine may implement additional Tag field and Data field values and embodiments are not limited to the Tag field and Data field values described above.

A Discovery Error message is produced by a master device and is sent to report a discovery error. The types of errors that will generate an Discovery Error message include an invalid RequestedGUID. Each type of error is associated with a designated GUID. When a USB or other serial link is used to transmit and receive the Discovery Error message, the protocol engine structures the Discovery Error message according to the following format:

<SOF> <FrameLength> <DataLength> <DiscoveryGUID> <RequestedGUID> <ErrorResponse> <Checksum>

When a link that guarantees transmission accuracy is used to transmit and receive the Discovery Error message, some embodiments of the protocol engine do not allocate the Checksum field within the Discovery Error message. Similarly, when a physical medium allows transmission of the Discovery Error message within one packet (or other transmission block), other embodiments of the protocol engine do not allocate the Checksum field within the Discovery Error message.

The SOF field is 1 byte in length and its value indicates the format of the message. In one embodiment, the value stored in the SOF field is 0xED for a Discovery Error message. The value stored in the FrameLength field indicates the number of bytes in the message except for the SOF field and the Checksum field. The value stored in the DataLength field indicates the number of bytes of information included in the message that are relevant to the usage corresponding to the value stored in the DiscoveryGUID field, which (in at least one embodiment) is equal to 8. The value stored in the DiscoveryGUID field is a unique 4 byte identifier of the usage executed by the protocol engine responsive to receipt of the message. The value stored in the DiscoveryGUID field indicates that the message includes information regarding the usage identified by the value stored in the RequestedGUID field. The Error-Response indicates error encountered by the protocol engine in processing the Discovery message responded to by this message. The Checksum field includes a calculated value representative of the contents of the message. In at least one embodiment, the protocol engine allocates the Checksum field and populates the Checksum field with a Fletcher checksum prior to message transmission.

It is to be appreciated that, in some embodiments, the Checksum field is optional within the message types described herein. In these embodiments, the protocol engine may not allocate or populate the Checksum field for any of the message types disclosed herein. In other embodiments, the protocol engine may not allocate or populate the Checksum for some subset of the message types disclosed herein. Therefore, embodiments are not limited with regard to the manner in which Checksum field is calculated, populated or used.

Figure 23:
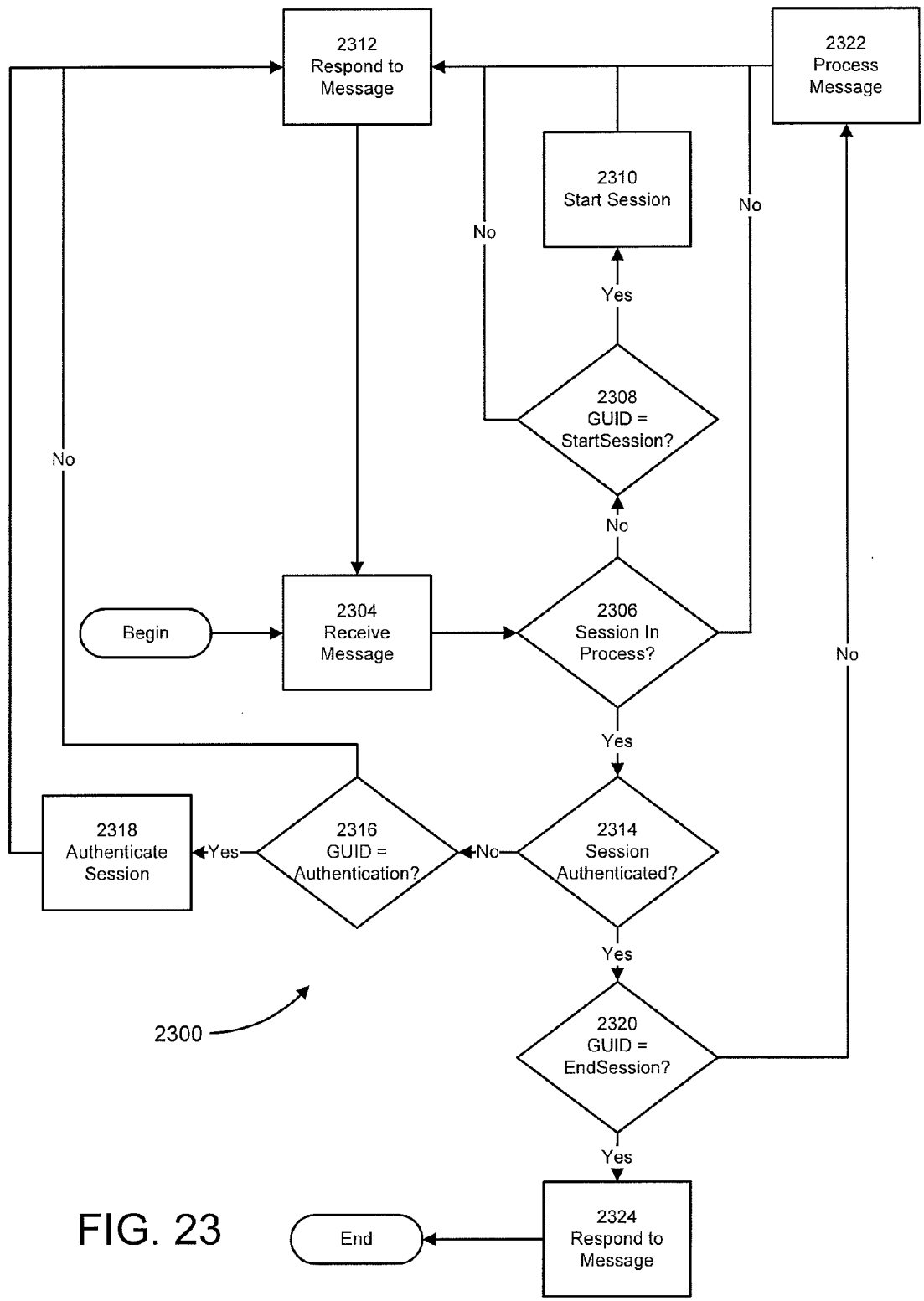
FIG. 23 is a flow chart of a communication process according to one embodiment.

In some embodiments, the protocol engine uses the message types described above to implement a variety communication processes through which one or more slaves exchange information with a master. FIG. 23 illustrates an example process 2300 in accord with these embodiments. The process 2300 is executed a protocol engine resident on a host device (master or slave) that receives a message of a type defined by the request-response protocol.

As shown in FIG. 23, the process 2300 begins when the protocol engine receives a message in act 2304. In some embodiment, the protocol engine must receive at least one message every 120 seconds or the communication session will terminate (as if the protocol engine received a usage instructing it to terminate the communication session). In act 2306, the protocol engine determines if a communication session is underway. In at least one embodiment, the protocol engine makes this determination by executing a usage that accesses a memory map of the master, such as the memory map describe above with reference for FIGS. 19 and 20. If a communication session is ongoing, the protocol engine executes act 2314, which is described further below. Otherwise, the protocol engine executes act 2308.

In the act 2308, the protocol engine compares the GUID stored in the received message to a GUID that indicates a request to start a communication session. If GUIDs are not equal, the protocol engine executes act 2312, which is described further below. Otherwise, the protocol engine executes act 2310.

In the act 2310, the protocol engine executes a usage that establishes a communication session with one or more slaves. In one embodiment, the usage executed by the protocol engine writes data to a specific row and offset within the memory map to record the establishment of the communication session. It is to be appreciated that although only one execution of the usage that establishes a communication session is needed to establish a communication session, multiple executions of the usage (resulting from multiple Request messages including a request to start a communication session) will not adversely impact (e.g. terminate) an ongoing communication session. Next, the protocol engine executes the act 2312, which is described further below.

Returning to the act 2314, which the protocol engine executes after determining that there is a current communication session, the protocol engine determines whether the current communication session has been authenticated. In some embodiments, the protocol engine makes this determination by executing a usage that accesses a specific location of the memory map. If the current communication session has been authenticated, the protocol engine executes act 2320, which is describe further below. Otherwise, the protocol engine executes act 2316.

In the act 2316, the protocol engine compares the GUID stored in the received message to a GUID that indicates a request to authenticate the current communication session. If the GUIDs are not equal, the protocol engine executes act 2312, which is described further below. Otherwise, the protocol engine executes act 2318.

In the act 2318, the protocol engine executes a usage that attempts to authenticate the current communication session. In some embodiments, this usage writes a 16 byte key to a specific row and offset within the memory map to record the establishment of the communication session. In these embodiments, the protocol engine structures the key according to the following format:

<Application ID> <Random Number> <Checksum 1> <Checksum 2>

The Application ID field is 4 bytes in length and stores a value that is a unique number representative of a licensed user of the protocol. The Random Number field is 8 bytes in length and stores a value that is a unique random number. The Checksum 1 field is 2 bytes in length and stores a value that is a checksum of the first 12 bytes of the key and the serial number of the host device. The Checksum 2 field is 2 bytes in length and stores a value that is a checksum of the first 14 bytes of the key. In one embodiment, the protocol engine determines the values of the Checksum 1 and Checksum 2 fields using the Fletcher checksum method.

According to some embodiments, each message received by the protocol engine prior to authentication of a communication session increments an authentication counter. If the authentication counter is greater than 12, the protocol engine responds (in act the 2312 described further below) to each message received with an error packet indicating an unauthenticated device until a valid Request message including a valid authentication request is received. Once an authenticated communication session is established, the authentication counter is set to a value of 0 and is not incremented so long as the authenticated communication session remains active.

After executing the authentication usage, the protocol engine executes the act 2312, which is described further below.

Returning to the act 2320, which the protocol engine executes after determining that the current communication session has been authenticated, the protocol engine compares the GUID stored in the received message to a GUID that indicates a request to terminate the authenticated communication session. If the GUIDs are not equal, the protocol engine executes act 2324, which is described further below. Otherwise, the protocol engine executes act 2322.

In the act 2322, the protocol engine processes the received message. The processing performed by the protocol engine varies based on the type of message received and the content of the message. In most instances, the protocol engine will parse the received message based on its type, compare the GUID included in the received message to a list of GUIDs supported by the protocol engine and, if the received GUID is supported, attempt to execute the usage identified by the received GUID. In one embodiment, the protocol engine executes usages by manipulating (reading or writing) information at particular locations (rows and offsets) of the memory map described above with reference to FIGS. 19 and 20. As described above, by manipulating information stored within the memory map, the protocol engine performs a variety of actions. These actions include retrieving performance information, configuring system behavior via values stored in operational parameters, retrieving information used to debug anomalous system behavior and retrieving information that identifies the system and its components. In an example where the master is a UPS, usages retrieve the model number and other component identification information applicable to the UPS, retrieve the remaining runtime of a UPS, configure the power quality settings for the UPS and cause the UPS to shed one or more loads.

Figure 24:
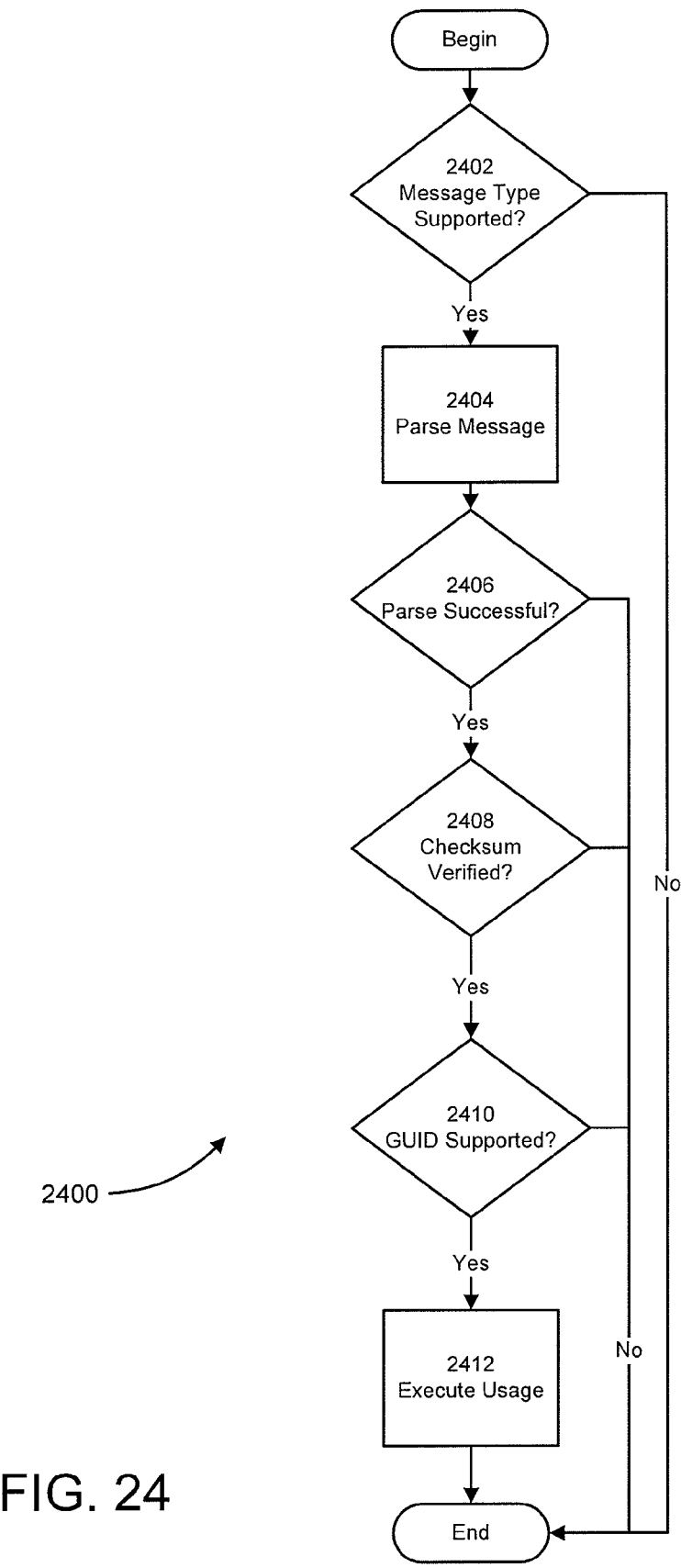
FIG. 24 is a flow chart of a communication process according to one embodiment.

One example of a process 2400 executed by the protocol engine while performing the act 2322 is described below with reference to FIG. 24. The process 2400 begins in act 2402 where the protocol engine determines whether the type of message received is supported. In some embodiments, the protocol engine makes this determination by comparing the message type of the received message to one or more supported message types. In at least one embodiment, this comparison is performed by attempting to match the value stored in the SOF field of the received message to a value of an SOF field of a supported message type. If the received message type is not supported (e.g. the value stored in the SOF field of the received message does not equal a value of an SOF field of a supported message type), the protocol engine stores an error for future processing terminates the process 2400. Otherwise, the protocol engine executes act 2404.

In the act 2404, the protocol engine parses the received message into to a message data structure corresponding to the message type identified by the value stored in the SOF field of the received message. Next, in act 2406, the protocol engine determines whether the received message was successfully parsed. If not, the protocol engine stores an error for future processing and terminates the process 2400. Otherwise, the protocol engine executes the act 2408.

In the act 2408, the protocol engine determines if the Checksum field is present in the parsed message and, if so, attempts to verify the value stored therein. If the Checksum field is present and its value cannot be verified, the protocol engine stores an error for future processing and terminates the process 2400. Otherwise, the protocol engine executes the act 2410.

In the act 2410, the protocol engine determines whether the usage identified by the value of the parsed GUID field is supported. In some embodiments, the protocol engine makes this determination by comparing the value of the parsed GUID field to one or more supported GUID values. In at least one embodiment, this comparison is performed by attempting to match the value stored in the parsed GUID field to a value of a supported GUID. If the usage is not supported (e.g. the value stored in the parsed GUID field does not equal a value of a supported GUID), the protocol engine stores an error for future processing and terminates the process 2400. Otherwise, the protocol engine executes act 2412.

In the act 2412, the protocol engine attempts to execute the usage identified by the value of the parsed GUID field. As described above, in at least one embodiment, when executing a usage, the protocol engine manipulates data stored in a designated location of the memory map. The manipulation performed varies by message type and usage.

In one example, if the message type is a Request message, the protocol engine determines the data manipulation (read or write) requested. In one embodiment, if the value of the parsed DataLength field is not equal to 0, the requested manipulation is a write. Otherwise the requested manipulation is a read. Next, the protocol engine determines if the usage supports the requested manipulation. If not, the protocol engine stores an error for future processing and terminates the process 2400. Otherwise, the protocol engine resolves the value of the parsed GUID field to a location within the memory map and performs the requested manipulation to that location. If the Request message includes a write request, the protocol engine uses the values stored in the parsed Index and Data fields to populate the resolved location of the memory map with data. Otherwise, the protocol engine reads the data stored at the location of the memory map.

If the message type is a Discovery message, the protocol engine determines whether the usage identified by the value of the RequestedGUID field is supported. In some embodiments, the protocol engine makes this determination by comparing the value of the parsed RequestedGUID field to one or more supported GUID values. In at least one embodiment, this comparison is performed by attempting to match the value stored in the parsed RequestedGUID field to a value of a supported GUID. If the usage is not supported (e.g. the value stored in the parsed RequestedGUID field does not equal a value of a supported GUID), the protocol engine stores an error for future processing and terminates the process 2400. Otherwise, the protocol engine stores an acknowledgement of that the RequestedGUID is supported and terminates the process 2400.

If the message type is a Response or an Asynch message, the protocol engine stores the message and any result data in the parsed Index and Data fields in memory or some other form of local storage. In one embodiment, the local storage is a file including GUID, value tuples. According to this embodiment, the protocol engine uses the data stored in the Response and Asynch messages to keep the GUID, value tuples in sync with the memory map of the master. If the message type is a Discovery Error message or an Error message, the protocol engine stores a copy of the message in local storage and takes corrective action.

As illustrated by each of these examples, the protocol engine terminates the process 2400 after executing the act 2412.

Returning now to the FIG. 23 and the act 2312, the protocol engine responds to the message received in the act 2304. The response generated and transmitted by the protocol engine depends both on the type and the content of the received message, and the results of the message processing conducted by the protocol engine based on the received message.

For instance, if the received message is a valid Request message including a write request and no errors occurred during its processing, the protocol engine reads the information written by the write request, allocates a Response message data structure of sufficient size to hold the information written within the Index field and/or the Data field, populates the SOF field with 0xEF, populates the FrameLength field and the DataLength field according to the size of the data structure allocated, sets the value of the GUID field to the value of the GUID field in the received message, populates the Index field and/or the Data field with the written information and calculates and populates the Checksum field with a Fletcher checksum (if needed).

If the received message is a valid Request message including a read request and no errors occurred during its processing, the protocol engine allocates a Response message data structure of sufficient size to hold the information read within the Index field and/or the Data field, populates the SOF field with 0xEF, populates the FrameLength field and the DataLength field according to the size of the data structure allocated, sets the value of the GUID field to the value of the GUID field in the received message, populates the Index field and/or the Data field with the information read and calculates and populates the Checksum field with a Fletcher checksum (if needed).

In either case, after creating the Response message, the protocol engine transmits the message to the slaves within the communication session.

If the received message is a valid Discovery message and no errors occurred during its processing, the protocol engine allocates a Discovery Response data structure of sufficient size to hold the information describing the RequestedGUID in the Data and Tag fields, populates the SOF field with 0xEF, populates the FrameLength field and the DataLength field according to the size of the data structure allocated, sets the value of the DiscoveryGUID field to the value of the DiscoveryGUID field in the received message, sets the value of the RequestedGUID field to the value of the RequestedGUID field in the received message, sets the value of the NextGUID to the next GUID supported by the protocol engine, populates the Size field according to the size of the data structure, populates the Tag and Data fields with information relevant to the usage identified by the RequestedGUID and populates the Checksum field with a Fletcher checksum (if needed). After creating the Discover Response message, the protocol engine transmits the message to the slaves within the communication session.

If the received message is an invalid message of any type other than a Discovery Request message, or an error occurred during its processing, the protocol engine allocates an Error message data structure, populates the SOF field with 0xED, populates the FrameLength field and the DataLength field according to the size of the data structure allocated, sets the value of the GUID field to the value of the GUID field in the received message, sets the value of the ErrorResponse to the value representative of the error encountered and calculates and populates the Checksum field with a Fletcher checksum (if needed). After creating the Error message, the protocol engine transmits the message to the slaves within the communication session.

If the received message is an invalid Discovery Request message or an error occurred during its processing, the protocol engine allocates an Discovery Error message data structure, populates the SOF field with 0xED, populates the FrameLength field and the DataLength field according to the size of the data structure allocated, sets the value of the DiscoveryGUID field to the value of DiscoveryGUID field in the received message, sets the value of the RequestedGUID to the value of the RequestedGUID in the received message, sets the value of the ErrorResponse to the value representative of the error encountered and calculates and populates the Checksum field with a Fletcher checksum (if needed). After creating the Discover Error message, the protocol engine transmits the message to the slaves within the communication session.

In the act 2324, the protocol engine generates and transmits a response to the request to terminate the authenticated communication session. In one embodiment, the request to end an authenticated communication session is a Request message including a read request of a designated GUID. In this embodiment, the response generated and transmitted is a Response message including no data. After executing the act 2324, the protocol engine terminates execution of the process 2300. In some embodiments, the protocol engine prevents new communication sessions from starting for a period of 600 seconds after execution of a termination or lockout usage.

It is to be appreciated that some embodiments dynamically allocate memory to store data according to the data structures described herein. Other embodiments pre-allocate memory (at compile time) to store these data structures. Thus embodiments are not limited to a particular approach to memory allocation and various approaches may be used without departing from the scope of the embodiments disclosed herein.

Usage Scenarios

Figure 25:
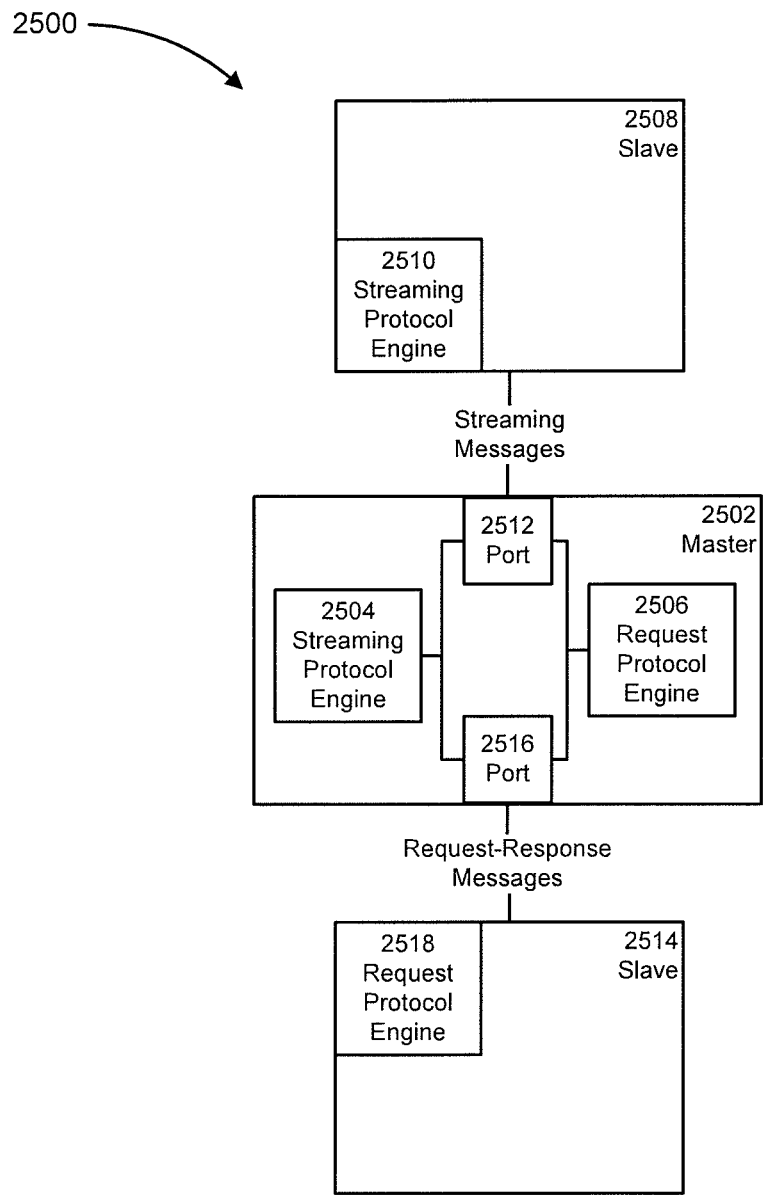
FIG. 25 is a block diagram of an embodiment of communication systems consistent with various aspects.

FIG. 25 illustrates an example configuration 2500 that includes master 2502 and slaves 2508 and 2514. As shown in FIG. 25, the master 2502 includes communication ports 2512 and 2516, a streaming protocol engine 2504 and a request protocol engine 2506. Both the streaming protocol engine 2504 and the request protocol engine 2506 are in data communication with both the ports 2512 and 2516. The slave 2508 includes a streaming protocol engine 2510. The slave 2514 includes a request protocol engine 2518.

According to one example illustrated by FIG. 25, a session between the streaming protocol engines 2504 and 2510 is implemented via the port 2512 using a streaming serial link protocol in accord with the protocol described above with reference to FIGS. 4-22B. Further, according to this example, a session between the request protocol engines 2506 and 2512 is implemented via the port 2516 using a request-response protocol in accord with the request-response protocol described herein with reference to FIGS. 23, 24 and 26. Although FIG. 25 illustrates two communication ports and two protocol engines, other embodiments may include a different number of ports or engines. Thus embodiments are not limited to a particular number of communication ports or protocol engines.

In one example in accord with FIG. 25, the slave 2508 is coupled to the master 2502 via a serial link and executes the streaming protocol engine 2510 to communicate with the streaming protocol engine 2504 executing on the master 2502. The slave 2514 is coupled to the master via a USB link and executes the request protocol engine 2518 to communicate with the request protocol engine 2506 executing on the master 2502. In this example, the request protocol engine 2518 transmits and receives request-response messages encapsulated in USB usage. Further, according to this example, the master 2502 includes a memory map that is updated by both the streaming protocol engine 2504 and the request protocol engine 2506 as warranted by activity occurring on the master 2502 and the slaves 2508 and 2514.

In this example, the master 2502 is a UPS and the slaves 2508 and 2514 are general purpose computers. In one specific usage scenario utilizing this example configuration, a user of the slave 2514 requests, via a software application, an alteration of the configuration of the master 2502, such as, for example, an alteration of the power quality parameter of the master 2502. Responsive to receipt of a request to change the configuration of the master 2502 from the software application, the request protocol engine 2518 allocates a Discovery data structure of sufficient size to request information relevant to the usages supported by the master 2502. Next, the request protocol engine 2518, populates the SOF field with 0xEF, populates the FrameLength field and the DataLength field according to the size of the data structure allocated, sets the value of the DiscoveryGUID field to indicate a request for usage information, sets the value of the RequestedGUID field to the value of the GUID that identifies the first usage (e.g. 0x0000 0000) and stores, within the Checksum field, a checksum value calculated using the content of the message. Next the request protocol engine 2518 transmits the Discovery message to the request protocol engine 2506.

Responsive to receiving the Discovery message, the request protocol engine 2506 processes the Discovery message and generates and transmits, to the request protocol engine 2518, a Discovery Response message that includes the usage information requested in the Discovery message.

Response to receipt of the Discovery Response message, the request protocol engine 2518 will use another Discovery message to request information describing the next supported usage identified by the value of the NextGUID field. Further, the request protocol engine 2518 will continue to iteratively request usage information to build an interface that reflects the usages supported by the master 2502.

After the interface is complete, the request protocol engine 2518 will issue a Request message to alter the configuration of the master 2052.

Next, the request protocol engine 2518 generates a Request message including a write instruction to implement the change to the power quality parameter. More particularly, the request protocol engine 2518 allocates a Request message data structure of sufficient size to hold the power quality configuration information within the Index field and/or the Data field, populates the SOF field with 0xEF, populates the FrameLength field and the DataLength field according to the size of the data structure allocated, sets the value of the GUID field to the value that identifies the power quality setting usage, populates the Index field and/or the Data field with the power quality configuration information and stores, within the Checksum field, a checksum value calculated using the content of the message. Next the request protocol engine 2518 transmits the Discovery message to the request protocol engine 2506.

Responsive to receiving the Request message, the request protocol engine 2506 processes the Request message and generates and transmits, to the request protocol engine 2518, a Response message that includes the power quality configuration information written. Further, in response to processing the Request message, the streaming protocol engine 2504 notifies the streaming protocol engine 2510 of the change to the power quality configuration information.

While in this example, the slaves 2508 and 2514 are general purpose computers, embodiments are not limited utilizing slaves that are general purpose computers. For example, in another embodiment, the slaves 2508 and 2514 are embedded computer systems, such as a network management card embedded within a UPS. Thus embodiments are not limited to a particular type of slave or master device.

In another usage scenario utilizing this example configuration, a user makes several changes to the configuration of the master 2502 via a software application executing on the slave 2508. These configuration changes substantially alter the performance of the master 2502. Both the configuration changes and the altered performance of the master result in updates to the memory map of the master 2502. In this example, the master 2502 notifies the slave 2514 of the updates by issuing several Asynch messages to the slave 2514.

More specifically, the request protocol engine 2506 detects the updates within the memory map of the master 2502. Responsive to detecting the updates, the request protocol engine 2506 determines a set of usages that utilize the data updated in the memory map. Next, for each member of the set of usages, the request protocol engine 2506 generates an Asynch message for transmission to the request protocol engine 2518. For each Asynch message, the request protocol engine 2506 allocates an Asynch message data structure of sufficient size to hold an update within the Index field and/or the Data field, populates the SOF field with 0xEC, populates the FrameLength field and the DataLength field according to the size of the data structure allocated, sets the value of the GUID field to the value that identifies a member of the set of usages that corresponds to the update, populates the Index field and/or the Data field with the update and stores, within the Checksum field, a checksum value calculated using the content of the message. Next request protocol engine 2506 transmits each Asynch message to the request protocol engine 2518.

Responsive to receipt of the each Asynch message, the request protocol engine 2518 processes each Asynch message.

In another example in accord with FIG. 25, the slave 2508 is coupled to the master 2502 via a serial link supported by the port 2512 and executes the streaming protocol engine 2510 to communicate with the streaming protocol engine 2504 executing on the master 2502. The slave 2514 is coupled to the master via an Ethernet link supported by the port 2516 and executes the request protocol engine 2518 to communicate with the request protocol engine 2506 executing on the master 2502. In this example, the request protocol engine 2518 transmits and receives request-response messages wrapped in UDP packets, as is explained further below. Further, according to this example, the master 2502 includes a memory map that is updated by both the streaming protocol engine 2504 and the request protocol engine 2506 as warranted by activity occurring on the master 2502 and the slaves 2508 and 2514.

In this example, the master 2502 is a UPS and the slaves 2508 and 2514 are general purpose computers or embedded computer systems. In one specific usage scenario utilizing this example configuration, a user of the slave 2514 requests, via a software application, changes to several operational parameters of the master 2502. The software application, in turn, instructs the request protocol engine 2518 to change the operational parameters of the master 2502 by updating the memory map of the master 2502. Further, in this example, the master 2502 notifies the slave 2514 of the updates by issuing Asynch messages to the slave 2514.

More specifically, the request protocol engine 2506 detects the updates within the memory map of the master 2502. Responsive to detecting the updates, the request protocol engine 2506 determines a set of usages that utilize the data updated in the memory map. Next, for each member of the set of usages, the request protocol engine 2506 generates an Asynch message that indicates the usage and the value or values included in the update. Next, the request protocol engine 2506 bundles the generated Asynch messages into a single UDP broadcast message and transmits the broadcast message on the local segment. In this example, the request protocol engine 2506 does not allocate or populate the Checksum field because, as explained above, the request protocol engine 2506 transmits and receives messages using UDP, which guarantees accurate data communication.

Responsive to receipt of the UDP broadcast, the request protocol engine 2518 unbundles and processes each Asynch message.

Figure 26:
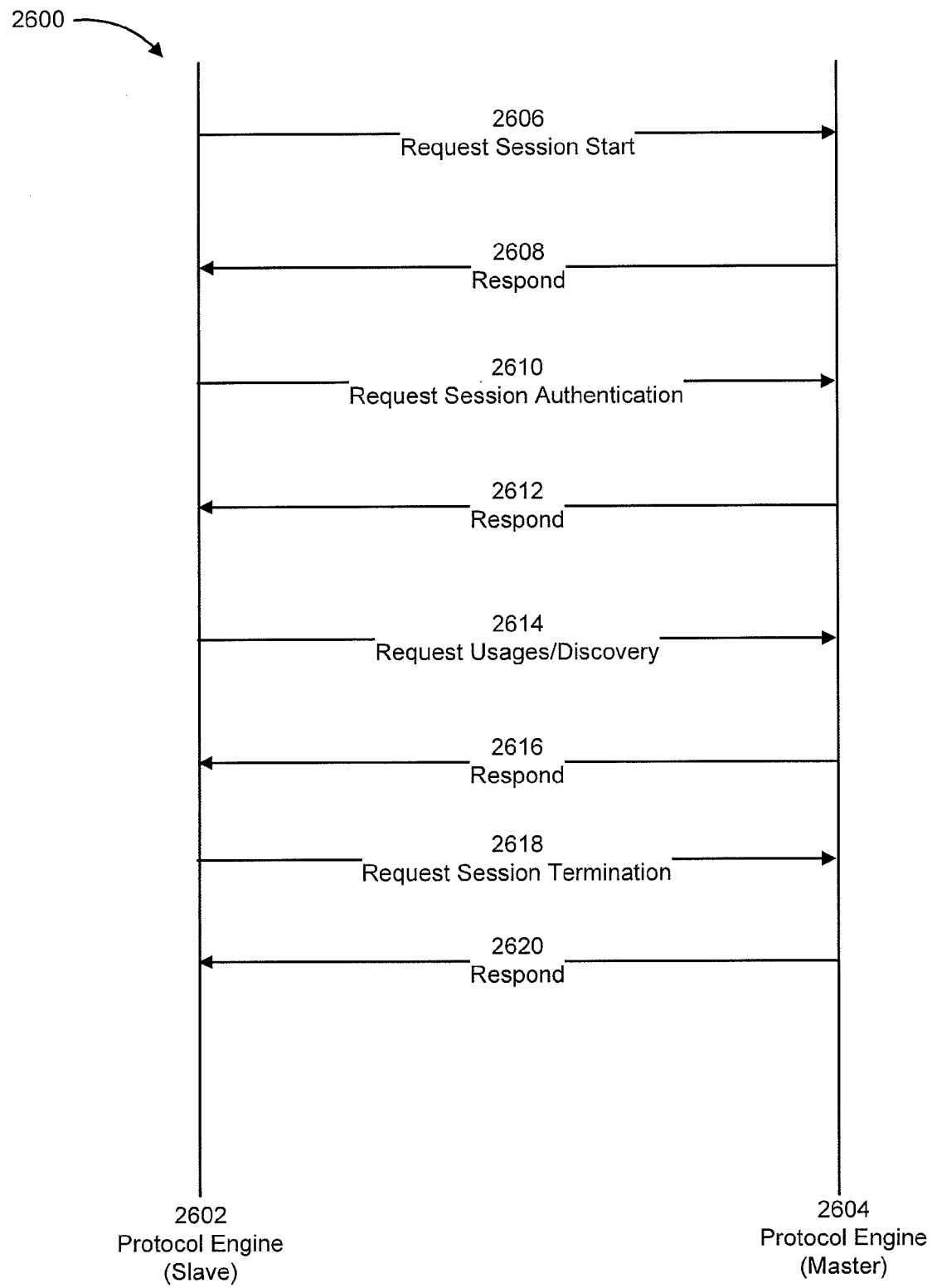
FIG. 26 is a process schematic illustrating a process for conducting communications according to one embodiment.

FIG. 26 illustrates an exemplary communication session 2600 conducted between a request-response protocol engine executing on a slave 2602 and a request-response protocol engine executing on a master 2604. As shown in FIG. 26, the protocol engine 2602 initiates the communication session by transmitting a Request message 2606 including a GUID that identifies a start session usage. The protocol engine 2604 responds with a Response message 2608 that includes the start session GUID. The protocol engine 2602 transmits, optionally depending on the requirements of the master 2604, a Request message 2610 including a GUID that identifies the authentication usage. The protocol engine 2604 responds with a Response message 2612 that includes the authentication GUID. To exchange data in a normal mode of operation, the protocol engine 2602 transmits a plurality of Request messages 2614 that each include a GUID that identifies a usage supported by the protocol engine 2602. The protocol engine 2604 responds with a plurality of Response messages 2616 that each include the GUID of a corresponding Request message of the plurality of Request messages 2614. In addition, some of the plurality of Response message 2616 may include unsolicited, Asynch messages, should the master receive data from another slave that warrants reporting to all slaves. To end the communication session, the protocol engine 2602 transmits a Request message 2618 including a GUID that identifies the stop session usage. The protocol engine 2604 responds with a Response message 2612 that includes the stop session GUID.

It should be appreciated that the invention is not limited to each of embodiments listed above and described herein, but rather, various embodiments of the invention may be practiced alone or in combination with other embodiments.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

The invention claimed is:

1. A system for exchanging information comprising:
a memory;
a first communication link;
at least one processor implementing a first protocol, the at least one processor being coupled to the memory and the first communication link and being configured to:
receive, via the first communication link, a first request message including a first globally unique identifier (GUID);
start, responsive to receipt of the first request message, a communication session over the first communication link;
provide a first response message including the first GUID;
receive, via the first communication link, a second request message including a start of frame field storing a value that indicates a type of the second request message, a framelength field storing a value that indicates a length of the second request message, a data field storing data, a datalength field storing a value that indicates a length of the data field, and a GUID field storing a value of a second GUID that identifies a second usage;
write the data to a location indicated by the second GUID;
read information stored at the indicated location; and
provide a second response message including the second GUID and the information.

2. The system according to claim 1, wherein the first request message includes:
a start of frame field storing a value that indicates a type of the first request message;
a framelength field storing a value that indicates a length of the first request message;
a datalength field storing a value that indicates a length of a data field; and
a GUID field storing a value that identifies a first usage that when executed by the at least one processor will start a communication session.

3. The system according to claim 1, wherein the data includes an array index and other data and the second request message includes:

a start of frame field storing a value that indicates a type of the second request message;
a framelength field storing a value that indicates a length of the second request message;
a datalength field storing a value that indicates a length of a data field;
a GUID field storing a value that identifies a second usage;
an index field storing the array index; and
the data field storing the other data.

4. The system according to claim 1, wherein the at least one processor is further configured to:
receive, via the first communication link, a third request message including a third GUID and a fourth GUID;
determine whether the first protocol supports a fourth usage identified by the fourth GUID; and
provide a third response message including the third GUID, the fourth GUID, information describing the fourth usage and a fifth GUID that identifies another usage supported by the first protocol.

5. The system according to claim 4, wherein the third request message includes:
a start of frame field storing a value that indicates a type of the third request message;
a framelength field storing a value that indicates a length of the third request message;
a DiscoveryGUID field storing a value that identifies the third usage; and
a RequestedGUID field storing a value that identifies the fourth usage.

6. The system according to claim 1, further comprising:
a memory map disposed within the memory, the memory map storing operational and configuration information;
a second communication link coupled to the at least one processor, wherein the at least one processor further implements a second protocol different from the first protocol and is further configured to:
receive a message, via the second communication link, including an update to a location of the memory map;
store the update at the location; and
provide a third response message including the update and a third GUID that identifies a usage that utilizes data stored at the location.

7. The system according to claim 6, wherein the first communication link includes a universal serial bus (USB) link and the second communication link includes a serial link.

8. The system according to claim 6, wherein the first protocol is a request-response protocol and the second protocol is a streaming protocol.

9. A system for exchanging information comprising:
a memory;
a first communication link;
at least one first processor coupled to the memory and the first communication link and configured to:
generate a first request message including a first globally unique identifier (GUID) that identifies a first usage that when executed by at least one second processor will start a communication session;
transmit the first request message on the first communication link;
receive a first response message including the first GUID;
generate a second request message including a start of frame field storing a value that indicates a type of the second request message, a framelength field storing a value that indicates a length of the second request message, a data field storing data, a datalength field storing a value that indicates a length of the data field, and a GUID field storing a value of a second GUID that identifies a second usage supported by a protocol implemented by the at least one second processor;

transmit the second request message on the first communication link; and receive a second response message including the second GUID and information having the same value as the data.

10. The system according to claim 9, wherein the first request message includes:

a start of frame field storing a value that indicates a type of the first request message;

a framelength field storing a value that indicates a length of the first request message;

a datalength field storing a value that indicates a length of a data field; and a GUID field storing a value that identifies the first usage.

11. The system according to claim 9, wherein the data includes an array index and other data and the second request message includes:

a start of frame field storing a value that indicates a type of the second request message;

a framelength field storing a value that indicates a length of the second request message;

a datalength field storing a value that indicates a length of a data field;

a GUID field storing a value that identifies the second usage;

an index field storing the array index; and the data field storing the other data.

12. A method for exchanging information using a first computer, the method comprising:

generating, by the first computer, a first request message including a first globally unique identifier (GUID) that identifies a first usage that when executed by a second computer will start a communication session on a link shared by the first computer and the second computer;

transmitting the first request message on the link;

receiving a first response message including the first GUID;

generating a second request message including data and a second GUID that identifies a second usage supported by the second computer, wherein generating the second request message includes storing a value that indicates a type of the second request message within a start of frame field, storing a value that indicates a length of the second request message within a framelength field, storing a value that indicates a length of a data field within a datalength field, storing a value of the second GUI within a GUID field, and storing the data within the data field;

transmitting the second request message on the link; and receiving a second response message including the second GUID and information having the same value as the data.

13. The method according to claim 12, wherein generating the first request message includes:

storing a value that indicates a type of the first request message within a start of frame field;

storing a value that indicates a length of the first request message within a framelength field;

storing a value that indicates a length of a data field within a datalength field; and storing a value that identifies the first usage within a GUID field.

14. The method according to claim 12, wherein the data includes an array index and other data and generating the second request message includes:

storing a value that indicates a type of the second request message within a start of frame field;

storing a value that indicates a length of the second request message within a framelength field;

storing a value that indicates a length of a data field within a datalength field;

storing a value that identifies the second usage within a GUID field;

storing the array index within a index field; and storing the other data within a data field.

15. The method according to claim 12, further comprising:

generating a third request message including a third GUID that identifies a third usage that when executed by the second computer will determine whether the second computer supports a fourth usage identified by a fourth GUID;

transmitting the third request message on the link; and receiving a third response message including the third GUID, the fourth GUID, information describing the fourth usage and a fifth GUID that identifies another usage supported by the second computer.

16. The method according to claim 15, wherein generating the third request message includes:

storing a value that indicates a type of the third request message within a start of frame field;

storing a value that indicates a length of the third request message within a framelength field;

storing a value that identifies the third usage within a DiscoveryGUID field; and storing a value that identifies the fourth usage within a RequestedGUID field.

17. The method according to claim 12, further comprising receiving, via the link, the first request message;

starting, responsive to receipt of the first request message, the communication session;

providing, responsive to receipt of the first request message, the first response message;

receiving, via the link, the second request message;

writing, responsive to receipt of the second request message including the data, the data to a location indicated by the second GUID;

reading, responsive to receipt of the second message, information stored at the location;

and providing, responsive to receipt of the second request message, the second response message.

* * * * *

UNITED STATES PATENT AND TRADEMARK OFFICE
CERTIFICATE OF CORRECTION

PATENT NO. : 8,819,170 B2  
APPLICATION NO. : 13/182723  
DATED : August 26, 2014  
INVENTOR(S) : Daniel C. Cohen et al.

Page 1 of 1

It is certified that error appears in the above-identified patent and that said Letters Patent is hereby corrected as shown below:

In the Claims:

At column 54, claim number 5, line number 26, delete "the" and insert --a--.

At column 56, claim number 17, line number 53, insert --request-- between "second" and "message".

Signed and Sealed this
Seventeenth Day of February, 2015

Michelle K. Lee
*Deputy Director of the United States Patent and Trademark Office*